(12) United States Patent
Oda et al.

(10) Patent No.: US 8,749,501 B2
(45) Date of Patent: Jun. 10, 2014

(54) POINTER DETECTION APPARATUS AND DETECTION SENSOR

(75) Inventors: Yasuo Oda, Saitama (JP); Sadao Yamamoto, Tokyo (JP); Yoshihisa Sugiyama, Saitama (JP)

(73) Assignee: Wacom Co., Ltd., Saitama (JP)

( * ) Notice: Subject to any disclaimer, the term of this patent is extended or adjusted under 35 U.S.C. 154(b) by 249 days.

(21) Appl. No.: 12/909,730

(22) Filed: Oct. 21, 2010

(65) Prior Publication Data
US 2011/0234508 A1    Sep. 29, 2011

(30) Foreign Application Priority Data
Mar. 29, 2010  (JP) .................................. 2010-074112

(51) Int. Cl.
*G06F 3/041* (2006.01)
(52) U.S. Cl.
USPC .......................... 345/173; 345/174; 178/18.03
(58) Field of Classification Search
USPC ...................... 345/173–178; 178/18.01–20.04
See application file for complete search history.

(56) References Cited

U.S. PATENT DOCUMENTS

| | | | |
|---|---|---|---|
| 4,798,919 A * | 1/1989 | Miessler et al. ............ | 178/18.05 |
| 5,905,489 A | 5/1999 | Takahama et al. .............. | 345/174 |
| 6,498,590 B1 | 12/2002 | Dietz et al. ..................... | 343/893 |
| 6,597,347 B1 * | 7/2003 | Yasutake ........................ | 345/173 |
| 7,116,844 B2 * | 10/2006 | Kawakami et al. ........... | 382/314 |
| RE41,731 E | 9/2010 | Dietz et al. ..................... | 343/893 |
| 2004/0021643 A1 * | 2/2004 | Hoshino et al. ................ | 345/173 |
| 2005/0162402 A1 * | 7/2005 | Watanachote ................ | 345/173 |
| 2006/0161871 A1 * | 7/2006 | Hotelling et al. .............. | 715/863 |
| 2006/0244733 A1 * | 11/2006 | Geaghan ........................ | 345/173 |
| 2007/0109274 A1 * | 5/2007 | Reynolds ........................ | 345/173 |
| 2007/0235231 A1 * | 10/2007 | Loomis et al. ............. | 178/18.06 |
| 2008/0012835 A1 * | 1/2008 | Rimon et al. .................. | 345/173 |
| 2008/0093687 A1 * | 4/2008 | Antaki ........................... | 257/415 |
| 2009/0078476 A1 * | 3/2009 | Rimon et al. ............... | 178/18.03 |

(Continued)

FOREIGN PATENT DOCUMENTS

| | | |
|---|---|---|
| JP | 6-192485 | 7/1994 |
| JP | 9-222947 | 8/1997 |

(Continued)

OTHER PUBLICATIONS

Korean Office Action dated Feb. 27, 2014, for corresponding KR Application No. 10-2011-0026480, 5 pages.

*Primary Examiner* — Alexander Eisen
*Assistant Examiner* — Sanjiv D Patel
(74) *Attorney, Agent, or Firm* — Seed IP Law Group PLLC

(57) ABSTRACT

A pointer detection apparatus is provided, which is capable of detecting a pointed position and a pressure applied by a pointer on a detection sensor. The detection sensor includes a plurality of first conductors disposed in a first direction, a plurality of second conductors disposed in a second direction crossing with the first direction, and a pressure sensitive material disposed between the first and second conductors and having a variable resistance characteristic. When a pointer is positioned in the proximity of (but not in contact with) the detection sensor or when a pressure applied to the detection sensor by the pointer in contact with the detection sensor is equal to or lower than a threshold, detection signals corresponding to variation in electrostatic capacity between the first and second conductors are supplied. When the pressure applied to the detection sensor is higher than the threshold, detection signals corresponding to variation in resistance characteristic of the pressure sensitive material are supplied.

20 Claims, 48 Drawing Sheets

(56) References Cited

U.S. PATENT DOCUMENTS

| | | |
|---|---|---|
| 2009/0244029 A1* | 10/2009 | Huang et al. .................. 345/174 |
| 2009/0256817 A1* | 10/2009 | Perlin et al. ................... 345/174 |
| 2010/0128002 A1* | 5/2010 | Stacy et al. ................... 345/174 |
| 2010/0149127 A1* | 6/2010 | Fisher et al. .................. 345/174 |
| 2010/0245246 A1* | 9/2010 | Rosenfeld et al. ............ 345/163 |
| 2011/0227836 A1* | 9/2011 | Li et al. ........................ 345/173 |
| 2012/0038583 A1* | 2/2012 | Westhues et al. ............. 345/174 |

FOREIGN PATENT DOCUMENTS

| | | |
|---|---|---|
| JP | 10-161795 | 6/1998 |
| JP | 2003-22158 | 1/2003 |
| KR | 20090087351 A | 8/2009 |
| KR | 20100009020 A | 1/2010 |

* cited by examiner

EXAMPLE OF HADAMARD MATRIX (16 CHIPS)

|  | PN$_1$ | PN$_2$ | | | | | | | | | | | | | | PN$_{16}$ |
|---|---|---|---|---|---|---|---|---|---|---|---|---|---|---|---|---|
| C$_1$ | 1 | 1 | 1 | 1 | 1 | 1 | 1 | 1 | 1 | 1 | 1 | 1 | 1 | 1 | 1 | 1 |
| C$_2$ | 1 | -1 | 1 | -1 | 1 | -1 | 1 | -1 | 1 | -1 | 1 | -1 | 1 | -1 | 1 | -1 |
| C$_3$ | 1 | 1 | -1 | -1 | 1 | 1 | -1 | -1 | 1 | 1 | -1 | -1 | 1 | 1 | -1 | -1 |
| C$_4$ | 1 | -1 | -1 | 1 | 1 | -1 | -1 | 1 | 1 | -1 | -1 | 1 | 1 | -1 | -1 | 1 |
| C$_5$ | 1 | 1 | 1 | 1 | -1 | -1 | -1 | -1 | 1 | 1 | 1 | 1 | -1 | -1 | -1 | -1 |
| C$_6$ | 1 | -1 | 1 | -1 | -1 | 1 | -1 | 1 | 1 | -1 | 1 | -1 | -1 | 1 | -1 | 1 |
| C$_7$ | 1 | 1 | -1 | -1 | -1 | -1 | 1 | 1 | 1 | 1 | -1 | -1 | -1 | -1 | 1 | 1 |
| C$_8$ | 1 | -1 | -1 | 1 | -1 | 1 | 1 | -1 | 1 | -1 | -1 | 1 | -1 | 1 | 1 | -1 |
| C$_9$ | 1 | 1 | 1 | 1 | 1 | 1 | 1 | 1 | -1 | -1 | -1 | -1 | -1 | -1 | -1 | -1 |
| C$_{10}$ | 1 | -1 | 1 | -1 | 1 | -1 | 1 | -1 | -1 | 1 | -1 | 1 | -1 | 1 | -1 | 1 |
| C$_{11}$ | 1 | 1 | -1 | -1 | 1 | 1 | -1 | -1 | -1 | -1 | 1 | 1 | -1 | -1 | 1 | 1 |
| C$_{12}$ | 1 | -1 | -1 | 1 | 1 | -1 | -1 | 1 | -1 | 1 | 1 | -1 | -1 | 1 | 1 | -1 |
| C$_{13}$ | 1 | 1 | 1 | 1 | -1 | -1 | -1 | -1 | -1 | -1 | -1 | -1 | 1 | 1 | 1 | 1 |
| C$_{14}$ | 1 | -1 | 1 | -1 | -1 | 1 | -1 | 1 | -1 | 1 | -1 | 1 | 1 | -1 | 1 | -1 |
| C$_{15}$ | 1 | 1 | -1 | -1 | -1 | -1 | 1 | 1 | -1 | -1 | 1 | 1 | 1 | 1 | -1 | -1 |
| C$_{16}$ | 1 | -1 | -1 | 1 | -1 | 1 | 1 | -1 | -1 | 1 | 1 | -1 | 1 | -1 | -1 | 1 |

| TRANSMISSION CONDUCTOR | CHANGEOVER OPERATION |
|---|---|
| TB$_{16}$ ~ 11Y$_{64}$<br>11Y$_{63}$<br>11Y$_{62}$<br>11Y$_{61}$ | ← C$_{16}$ ← ┐<br>        ├~2216 |
| TB$_{15}$ ~ 11Y$_{60}$<br>11Y$_{59}$<br>11Y$_{58}$<br>11Y$_{57}$ | ← C$_{15}$ ← ┐<br>        ├~2215 |
| ⋮ | ⋮ |
| TB$_1$ ~ 11Y$_4$<br>11Y$_3$<br>11Y$_2$<br>11Y$_1$ | ← C$_1$ ← ┐<br>       ├~2201 |

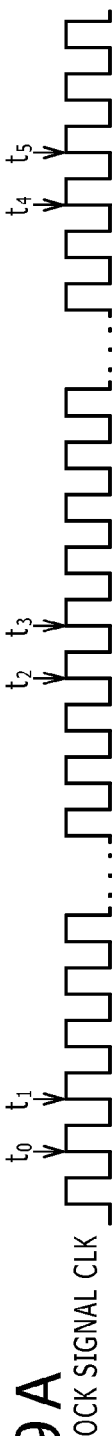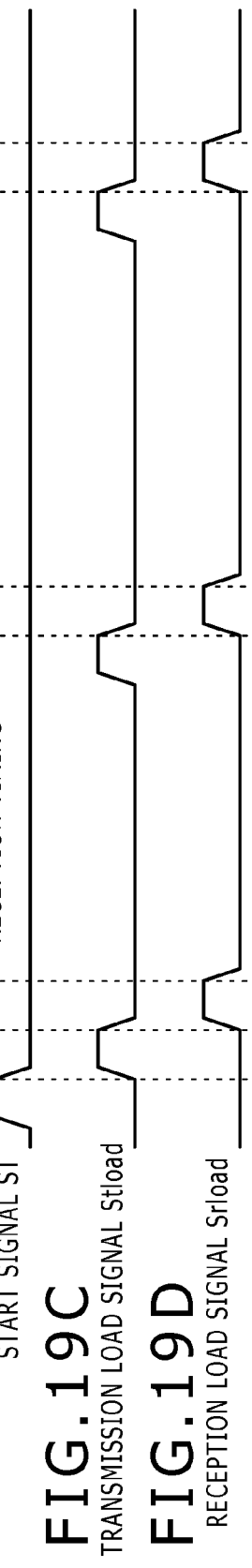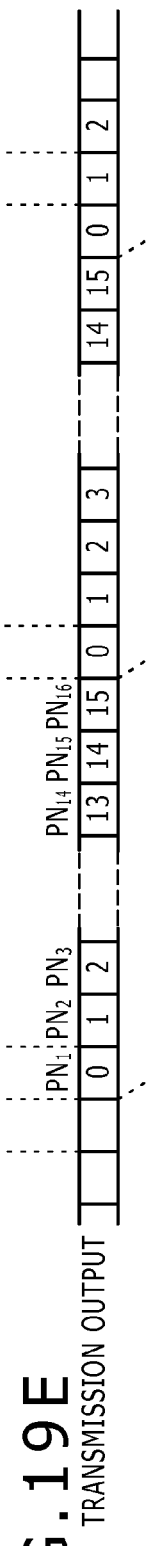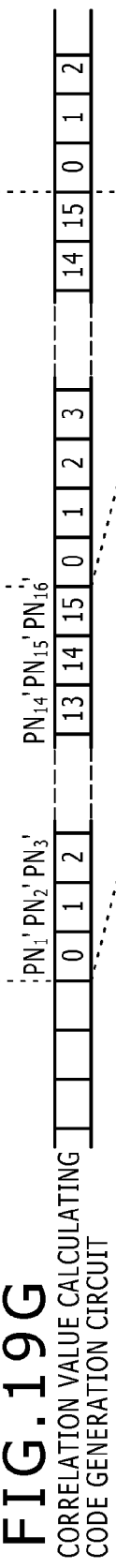
FIG. 19A CLOCK SIGNAL CLK
FIG. 19B START SIGNAL ST
FIG. 19C TRANSMISSION LOAD SIGNAL Stload
FIG. 19D RECEPTION LOAD SIGNAL Srload
FIG. 19E TRANSMISSION OUTPUT
FIG. 19F SERIAL INPUT SHIFT RESISTER
FIG. 19G CORRELATION VALUE CALCULATING CODE GENERATION CIRCUIT
FIG. 19H CORRELATION VALUE OUTPUT

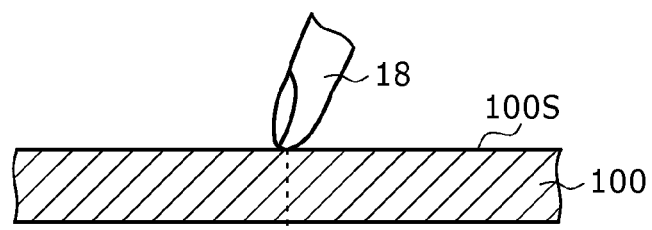
FIG.25A
FIG.25B
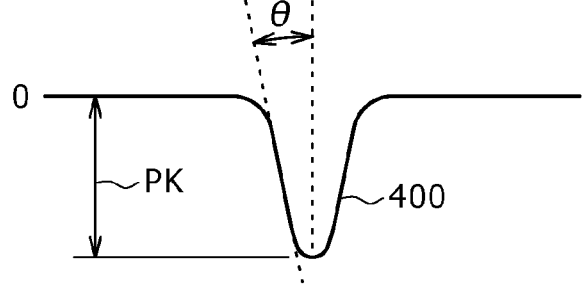
FIG.26A
FIG.26B
FIG.27
| 20 | 50 | 20 |
|----|-----|----|
| 50 | 100 | 50 |
| 20 | 50 | 20 |

FIG.34A

EXAMPLE OF HADAMARD MATRIX (16 CHIPS)

|  | $PN_1$ | $PN_2$ | | | | | | | | | | | | | | $PN_{16}$ |
|---|---|---|---|---|---|---|---|---|---|---|---|---|---|---|---|---|
| $C_1$    | 1 | 1 | 1 | 1 | 1 | 1 | 1 | 1 | 1 | 1 | 1 | 1 | 1 | 1 | 1 | 1 |
| $C_2$    | 1 | -1 | 1 | -1 | 1 | -1 | 1 | -1 | 1 | -1 | 1 | -1 | 1 | -1 | 1 | -1 |
| $C_3$    | 1 | 1 | -1 | -1 | 1 | 1 | -1 | -1 | 1 | 1 | -1 | -1 | 1 | 1 | -1 | -1 |
| $C_4$    | 1 | -1 | -1 | 1 | 1 | -1 | -1 | 1 | 1 | -1 | -1 | 1 | 1 | -1 | -1 | 1 |
| $C_5$    | 1 | 1 | 1 | 1 | -1 | -1 | -1 | -1 | 1 | 1 | 1 | 1 | -1 | -1 | -1 | -1 |
| $C_6$    | 1 | -1 | 1 | -1 | -1 | 1 | -1 | 1 | 1 | -1 | 1 | -1 | -1 | 1 | -1 | 1 |
| $C_7$    | 1 | 1 | -1 | -1 | -1 | -1 | 1 | 1 | 1 | 1 | -1 | -1 | -1 | -1 | 1 | 1 |
| $C_8$    | 1 | -1 | -1 | 1 | -1 | 1 | 1 | -1 | 1 | -1 | -1 | 1 | -1 | 1 | 1 | -1 |
| $C_9$    | 1 | 1 | 1 | 1 | 1 | 1 | 1 | 1 | -1 | -1 | -1 | -1 | -1 | -1 | -1 | -1 |
| $C_{10}$ | 1 | -1 | 1 | -1 | 1 | -1 | 1 | -1 | -1 | 1 | -1 | 1 | -1 | 1 | -1 | 1 |
| $C_{11}$ | 1 | 1 | -1 | -1 | 1 | 1 | -1 | -1 | -1 | -1 | 1 | 1 | -1 | -1 | 1 | 1 |
| $C_{12}$ | 1 | -1 | -1 | 1 | 1 | -1 | -1 | 1 | -1 | 1 | 1 | -1 | -1 | 1 | 1 | -1 |
| $C_{13}$ | 1 | 1 | 1 | 1 | -1 | -1 | -1 | -1 | -1 | -1 | -1 | -1 | 1 | 1 | 1 | 1 |
| $C_{14}$ | 1 | -1 | 1 | -1 | -1 | 1 | -1 | 1 | -1 | 1 | -1 | 1 | 1 | -1 | 1 | -1 |
| $C_{15}$ | 1 | 1 | -1 | -1 | -1 | -1 | 1 | 1 | -1 | -1 | 1 | 1 | 1 | 1 | -1 | -1 |
| $C_{16}$ | 1 | -1 | -1 | 1 | -1 | 1 | 1 | -1 | -1 | 1 | 1 | -1 | 1 | -1 | -1 | 1 |

FIG.34B

EXAMPLE OF HADAMARD MATRIX (15 CHIPS)

|  | $PN_1$ | $PN_2$ | | | | | | | | | | | | | $PN_{15}$ |
|---|---|---|---|---|---|---|---|---|---|---|---|---|---|---|---|
| $MC_1$    | 1 | 1 | 1 | 1 | 1 | 1 | 1 | 1 | 1 | 1 | 1 | 1 | 1 | 1 | 1 |
| $MC_2$    | -1 | 1 | -1 | 1 | -1 | 1 | -1 | 1 | -1 | 1 | -1 | 1 | -1 | 1 | -1 |
| $MC_3$    | 1 | -1 | -1 | 1 | 1 | -1 | -1 | 1 | 1 | -1 | -1 | 1 | 1 | -1 | -1 |
| $MC_4$    | -1 | -1 | 1 | 1 | -1 | -1 | 1 | 1 | -1 | -1 | 1 | 1 | -1 | -1 | 1 |
| $MC_5$    | 1 | 1 | 1 | -1 | -1 | -1 | -1 | 1 | 1 | 1 | 1 | -1 | -1 | -1 | -1 |
| $MC_6$    | -1 | 1 | -1 | -1 | 1 | -1 | 1 | 1 | -1 | 1 | -1 | -1 | 1 | -1 | 1 |
| $MC_7$    | 1 | -1 | -1 | -1 | -1 | 1 | 1 | 1 | 1 | -1 | -1 | -1 | -1 | 1 | 1 |
| $MC_8$    | -1 | -1 | 1 | -1 | 1 | 1 | -1 | 1 | -1 | -1 | 1 | -1 | 1 | 1 | -1 |
| $MC_9$    | 1 | 1 | 1 | 1 | 1 | 1 | 1 | -1 | -1 | -1 | -1 | -1 | -1 | -1 | -1 |
| $MC_{10}$ | -1 | 1 | -1 | 1 | -1 | 1 | -1 | -1 | 1 | -1 | 1 | -1 | 1 | -1 | 1 |
| $MC_{11}$ | 1 | -1 | -1 | 1 | 1 | -1 | -1 | -1 | -1 | 1 | 1 | -1 | -1 | 1 | 1 |
| $MC_{12}$ | -1 | -1 | 1 | 1 | -1 | -1 | 1 | -1 | 1 | 1 | -1 | -1 | 1 | 1 | -1 |
| $MC_{13}$ | 1 | 1 | 1 | -1 | -1 | -1 | -1 | -1 | -1 | -1 | -1 | 1 | 1 | 1 | 1 |
| $MC_{14}$ | -1 | 1 | -1 | -1 | 1 | -1 | 1 | -1 | 1 | -1 | 1 | 1 | -1 | 1 | -1 |
| $MC_{15}$ | 1 | -1 | -1 | -1 | -1 | 1 | 1 | -1 | -1 | 1 | 1 | 1 | 1 | -1 | -1 |
| $MC_{16}$ | -1 | -1 | 1 | -1 | 1 | 1 | -1 | -1 | 1 | 1 | -1 | 1 | -1 | -1 | 1 |

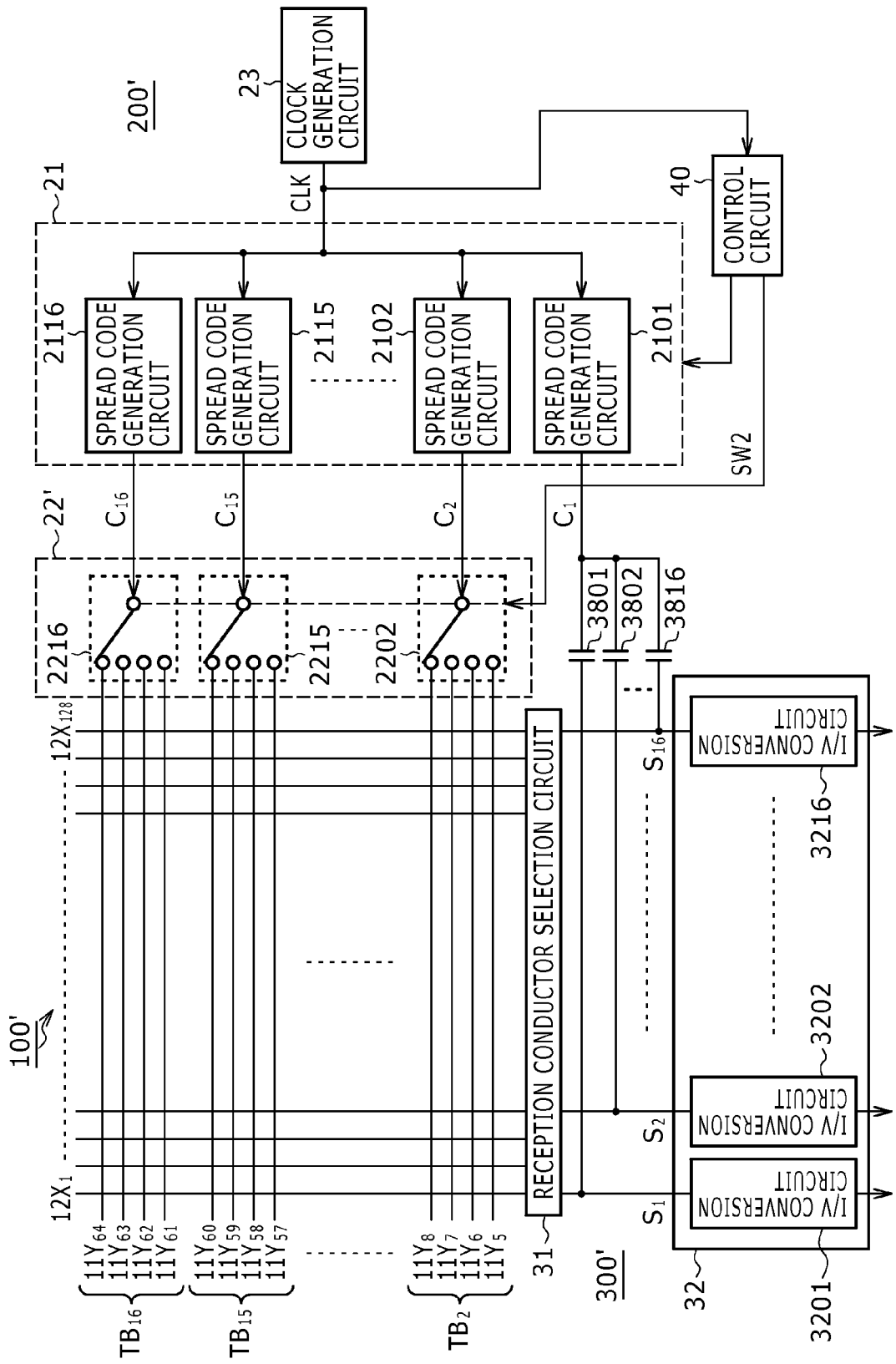
F I G. 39

POINTER DETECTION APPARATUS AND DETECTION SENSOR

CROSS REFERENCE TO RELATED APPLICATIONS

The present application claims the benefit under 35 U.S.C. 119 of Japanese Patent Application No. 2010-074112, filed Mar. 29, 2010, the entire content of which is being incorporated herein by reference.

TECHNICAL FIELD

This invention relates to a pointer detection apparatus for use, for example, with a touch panel. More particularly, the present invention relates to a pointer detection apparatus and a detection sensor, wherein when a pointer such as a finger or an electrostatic pen moves in a direction crossing with a surface, to which pointing operation performed by the pointer is input (i.e., a surface which the pointer can touch during inputting of pointing operation: hereinafter referred to as pointing input surface), a spaced position of the pointer from the pointing input surface and the pointer's pressing force to the pointing input surface can be detected in response to the movement of the pointer.

BACKGROUND

Conventionally, as a detection method for a pointer such as a finger of a user or a pen for exclusive use with a touch panel or the like, various sensor methods have been proposed such as, for example, an electrostatic coupling method (capacitance method), a resistive film method, and an electromagnetic induction method.

In a pointer detection apparatus of the electrostatic coupling method, as shown in FIG. 59, a plurality of upper electrodes Ex and a plurality of lower electrodes Ey are juxtaposed, for example, in an X-axis direction (lateral direction) and a Y-axis direction (longitudinal direction) of the pointing input surface and are arrayed orthogonally to each other and in a spaced relationship from each other with a small gap left therebetween. Consequently, a predetermined capacitor Co is formed at an overlapping location of each upper electrode Ex and each lower electrode Ey.

In the pointer detection apparatus of the electrostatic coupling method of FIG. 59, if a pointer such as a finger of a user approaches or touches the pointing input surface, then a capacitor Cf is formed between the pointer and the upper electrode Ex at the location. As a result, the amount of movement of charge between the upper electrode Ex and the lower electrode Ey at the location varies. In the pointer detection apparatus of the electrostatic coupling method, the variation of the amount of movement of charge is detected to specify the position in the pointing input surface pointed to by the pointer.

A pointer detection apparatus of the electrostatic coupling method of the type described above is disclosed, for example, in Patent Documents 1 to 3 listed below. In Patent Document 1, a technique of applying a code division multiplexing method which uses orthogonal spread codes to a multi-user touch system is disclosed. In Patent Document 2, a coordinate inputting apparatus which uses a pseudorandom signal is disclosed. Further, in Patent Document 3, an electrostatic pen used with a capacitive type coordinate apparatus is disclosed.

Meanwhile, in regard to pointer detection using the resistive film method, particularly a technique for detecting a plurality of pointing inputs is disclosed, for example, in Patent Document 4. The pointer detection technique using the resistive film method disclosed in Patent Document 4 is described with reference to FIG. 60.

In particular, the pointer detection apparatus of Patent Document 4 includes an electrode sheet 1001 on which a plurality of upper electrodes Ex similar to those of the example of FIG. 59 are formed, a first resistive element layer 1002, a second resistive element layer 1003, and an electrode sheet 1004 on which a plurality of lower electrodes Ey similar to those of the example of FIG. 59, which are arrayed in a laminated relationship in a z-axis direction orthogonal to an x axis and a y axis.

In this instance, as shown in FIG. 60(B) which is a sectional view of FIG. 60(A), the first resistive element layer 1002 is formed on the upper electrodes Ex formed on the electrode sheet 1001 such that the upper electrodes Ex and the first resistive element layer 1002 are electrically connected to each other. Further, the second resistive element layer 1003 is formed on the lower electrodes Ey formed on the electrode sheet 1004 such that the lower electrodes Ey and the second resistive element layer 1003 are electrically connected to each other. A very small air gap AG is formed between the first resistive element layer 1002 and the second resistive element layer 1003.

In the pointer detection apparatus of this case, if a pointing input surface, that is, the electrode sheet 1001 in the example shown, is pressed in the Z-axis direction by a pointer such as a finger, then the electrode sheet 1001 is elastically displaced at the pressed portion thereof until the first resistive element layer 1002 and the second resistive element layer 1003 are brought into contact with each other as shown in a sectional view of FIG. 60(C). Then, as the pressing force from the pointer to the pointing input surface increases, the contact area between the first resistive element layer 1002 and the second resistive element layer 1003 increases.

Consequently, a variable resistor in accordance with the contact area between the first resistive element layer 1002 and the second resistive element layer 1003 is interposed between the upper electrode Ex and the lower electrode Ey at the pressed portion. In this instance, the resistance of the variable resistor decreases as the contact area between the first resistive element layer 1002 and the second resistive element layer 1003 increases. It is to be noted that, when the pointing input surface is not pressed by a pointer as in FIG. 60(B), the first resistive element layer 1002 and the second resistive element layer 1003 are almost in a non-contacting state with each other, and therefore, the resistance of the variable resistor is almost infinite.

Accordingly, even if a voltage is applied through one of the upper electrode Ex and the lower electrode Ey in the state of FIG. 60(B), signal current of the voltage is not transmitted to the other electrode. Then, if the first resistive element layer 1002 and the second resistive element layer 1003 are brought into contact with each other, signal current from one of the electrodes begins to flow to the other electrode through the variable resistor. Then, if the contact area between the first resistive element layer 1002 and the second resistive element layer 1003 increases as the pressing force increases, then the signal current flowing from the one electrode to the other electrode increases in response to the contact area.

From the foregoing, in the pointer detection apparatus of the resistive film method, if the variation in resistance value between the upper electrode Ex and the lower electrode Ey is detected, then the position pointed to by the pointer can be specified and the pressing force is detected from the resistance value of the resistor.

PRIOR ART DOCUMENT

[Patent Document 1]
Japanese Patent Laid-Open No. 2003-22158
[Patent Document 2]
Japanese Patent Laid-Open No. Hei 9-222947
[Patent Document 3]
Japanese Patent Laid-Open No. Hei 10-161795
[Patent Document 4]
U.S. Patent Publication No. 2009/0256817 A1

SUMMARY OF THE INVENTION

The pointer detection apparatus of the electrostatic coupling method described above has a problem that, although it is possible to detect a position of the pointing input surface toward which the pointer moves or touches or a spaced position of the pointer from the pointing input surface, the pressing force against the pointing input surface cannot be detected.

On the other hand, the pointer detection apparatus which uses the resistance film method has a problem that the detection sensitivity (initial pressure sensitivity) at a contacting (touching) position of the pointer with the pointing input surface is low and that it is utterly impossible to detect a spaced position of the pointer from the pointing input surface.

In view of the foregoing consideration, according to one aspect of the present invention, a pointer detection apparatus is provided, which can detect a position of a pointer spaced from, or touching, a pointing input surface and can obtain a detection output in accordance with a pressing force of a pointer that presses the pointing input surface.

According to another aspect of the present invention, it is possible to implement the pointer detection apparatus described above in a comparatively simple configuration.

In order to solve the problem described above, the present invention provides a pointer detection apparatus capable of detecting a pointed position and pressure by a pointer, including:

a detection sensor including a plurality of first conductors disposed in a first direction, a plurality of second conductors disposed in a second direction crossing with the first direction, and a pressure sensitive member disposed between the plural first conductors and the plural second conductors and having a predetermined resistance characteristic;

a signal supplying circuit configured to supply predetermined signals to the plural first conductors; and a signal detection circuit configured to carry out signal detection from the plural second conductors;

wherein, where a pointer is positioned in the proximity of (but without touching) the detection sensor or where pressure applied to the detection sensor when the pointer touches the detection sensor is lower than predetermined pressure, the detection sensor supplies signals corresponding to variation in electrostatic capacity between the plural first conductors and the plural second conductors to the signal detection circuit, whereas where the pointer applies pressure higher than the predetermined pressure to the detection sensor, the detection sensor supplies signals corresponding to variation in resistance characteristic between the plural first conductors and the plural second conductors, due to the application of the pressure from the pointer to the pressure sensitive member, to the signal detection circuit.

With the pointer detection apparatus of the present invention having the configuration described above, the signal detection circuit detects a signal corresponding to variation in electrostatic capacity between the plural first conductors and the plural second conductors, and from the detection output, for example, whether the pointer is touching the detection sensor and the position of the touching can be detected.

Further, the signal detection circuit detects a signal corresponding to variation in resistance characteristic between the plural first conductors and the plural second conductors, and can detect, from the detection output, a pointed position at which pressure is applied from the pointer to the detection sensor and also the pressure.

In particular, with the pointer detection apparatus of the present invention, a pointed position and pressure by a pointer can be detected by a comparatively simple configuration, wherein the signal detection circuit detects a signal corresponding to variation in electrostatic capacity between the plural first conductors and the plural second conductors and a signal corresponding to variation in resistance characteristic between the plural first conductors and the plural second conductors.

According to the present invention, a pointer detection apparatus which has a high detection sensitivity of a touched position of a pointer with the pointing input surface and from which a detection output corresponding to pressing force of a pointer that presses the pointing input surface can be obtained with a comparatively simple configuration.

BRIEF DESCRIPTION OF THE DRAWINGS

FIGS. 19A-19H are timing charts illustrating operation of the example of the detailed configuration of part of the reception section of FIG. 18.

FIGS. 25A and 25B are views illustrating a detection operation principle of a hovering state of a pointer in accordance with the electrostatic coupling method by the pointer detection apparatus of the first embodiment.

FIGS. 26A and 26B are views illustrating a detection operation principle of a hovering state of a pointer in accordance with the electrostatic coupling method by the pointer detection apparatus of the first embodiment.

FIG. 27 is a view illustrating a detection operation principle of a hovering state of a pointer in accordance with the electrostatic coupling method by the pointer detection apparatus of the first embodiment.

FIGS. 34A and 34B are views illustrating a fourth embodiment of a pointer detection apparatus according to the present invention.

FIG. 39 is a block diagram showing an example of a configuration of main part of the pointer detection apparatus according to the fourth embodiment of the present invention.

DESCRIPTION OF THE INVENTION

Figure 1:
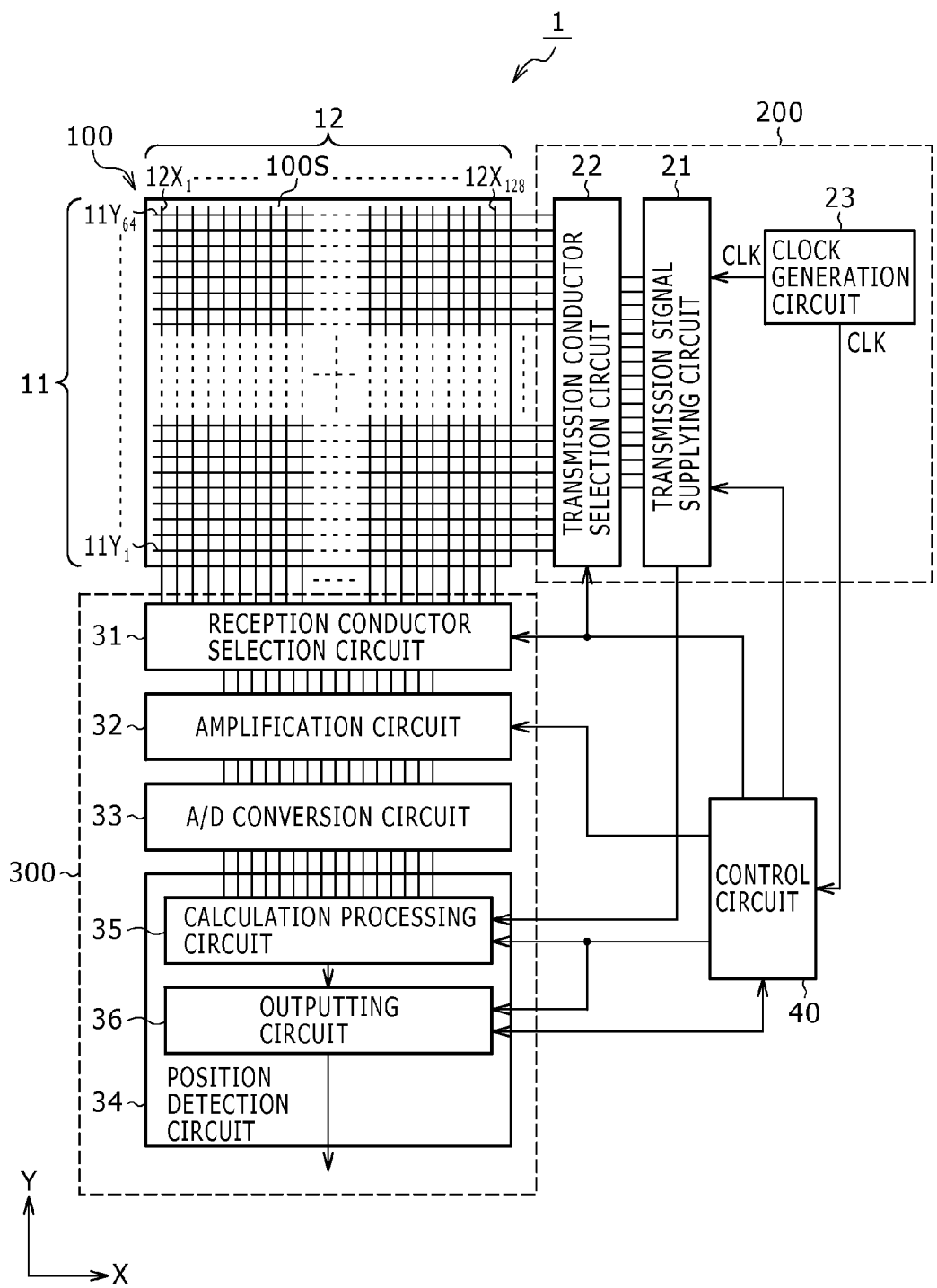
FIG. 1 is a block diagram showing an example of a general configuration of a first embodiment of a pointer detection apparatus according to the present invention.

In the following, embodiments of a pointer detection apparatus according to the present invention are described in the following order with reference to the accompanying drawings.
1. First Embodiment: example of a basic configuration.
2. Second Embodiment: example wherein switching of the detection modes is not carried out.
3. Third Embodiment: example wherein two detection modes are executed concurrently.
4. Fourth Embodiment: example of an improved configuration where an Hadamard code is used as a spread code.
5. Fifth Embodiment: example wherein detection non-uniformity is removed.
6. Sixth Embodiment: automatic gain control of an amplification circuit.
7. Seventh Embodiment: example in the case of a large-sized sensor section.
8. Eighth Embodiment: example of a configuration wherein a modulated spread code is used.
9. Ninth Embodiment: different supplying method of a spread code.
10. Tenth Embodiment: selection method of a reception conductor.
11. Eleventh Embodiment: different example of a configuration of a sensor section.

[First Embodiment: Example of a Basic Configuration]

A pointer detection apparatus of this embodiment not only detects a touch of a pointer with a pointing input surface and the pressure applied to the pointing input surface by the pointer, but also detects the position of a pointer in a space above the pointing input surface and a touching and pressing position of the pointer with the pointing input surface (i.e., pointer coordinate position). In the present example, the position of a pointer in a space above the pointing input surface is the position of a pointer which is spaced away from the pointing input surface without touching the pointing input surface, and is specified by the coordinate position on the pointing input surface, onto which a perpendicular line is drawn from the pointer and a spatial distance of the pointer from the pointing input surface.

It is to be noted that a state in which a pointer is positioned at a spatial position spaced from the pointing input surface is hereinafter referred to as a hovering state. Further, in the present specification, a direction in which a perpendicular line is drawn from a pointer to the pointing input surface is hereinafter referred to as the Z-axis direction, and a coordinate position on the pointing input surface is defined by a position in the X-axis direction and the Y-axis direction that are perpendicular to each other.

Further, in the following description, as a pointer, principally a finger of a user is used. However, an electrostatic pen described hereinabove or a like element may be used instead as the pointer.

Further, the embodiments of the present invention described below are examples wherein a plurality of pointers may exist on the pointing input surface at the same time such that, for example, a plurality of fingers can be detected.

Furthermore, the embodiments described below have a configuration devised such that position detection of a pointer on the pointing input surface can be carried out at a high speed.

<Example of a General Configuration of the Pointer Detection Apparatus of the First Embodiment: FIG. 1>

FIG. 1 is a block diagram showing an example of a general configuration of a pointer detection apparatus 1 of the first embodiment of the present invention. The pointer detection apparatus 1 of the present embodiment includes a sensor section 100 which is an example of a detection sensor, a transmission section 200, a reception section 300, and a control circuit 40 for controlling operation of the transmission section 200 and the reception section 300. In the following, the configuration of the components is described.

The control circuit 40 is a circuit for controlling the components of the pointer detection apparatus 1 of the present embodiment and is configured of, for example, a microcomputer. The control circuit 40 is connected to a transmission signal supplying circuit 21, a transmission conductor selection circuit 22, and a clock generation circuit 23 of the transmission section 200 hereinafter described. Further, the control circuit 40 is connected to a reception conductor selection circuit 31, an amplification circuit 32, and a position detection circuit 34 of the reception section 300 hereinafter described.

Further, as hereinafter described, the control circuit 40 suitably generates and outputs a start signal ST, a transmission load signal $St_{load}$ and a reception load signal $Sr_{load}$ based on a clock signal CLK outputted from the clock generation circuit 23 to control operation timings of the components.

Figure 2A:
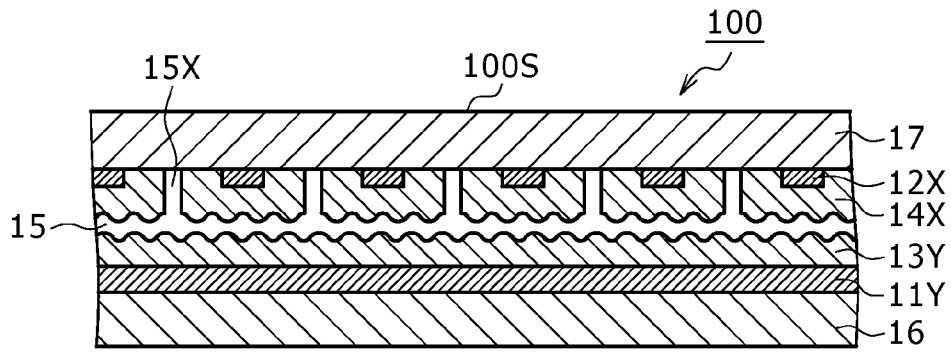
FIGS. 2A and 2B are cross-sectional views showing a configuration of a sensor section of the pointer detection apparatus of the first embodiment.
Figure 2B:
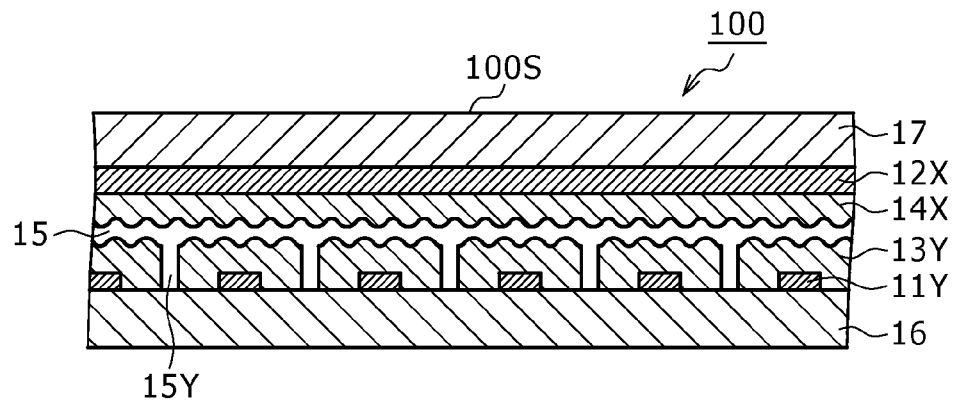

<Description of the Sensor Section 100>
[Example of the Configuration of the Sensor Section 100: FIGS. 1, 2A, and 2B]

The sensor section 100 is described with reference to FIGS. 1, 2A, and 2B. It is to be noted that FIG. 2(A) is a sectional view of the sensor section 100 of FIG. 1 in the X-axis direction, and FIG. 2(B) is a sectional view of the sensor section 100 of FIG. 1 in the Y-axis direction.

The sensor section 100 includes a plurality of first electrodes connected to the transmission section 200 and a plurality of second electrodes connected to the reception section 300, and further includes a pressure sensitive member hereinafter described. In the following description, a first electrode is referred to as a transmission conductor, and a group including a plurality of first conductors is referred to as a transmission conductor group 11. In the present embodiment, the transmission conductor group 11 includes, for example, 64 transmission conductors $11Y_1$ to $11Y_{64}$. Further, in the present embodiment, a second electrode is referred to as a reception conductor, and a group including a plurality of second electrodes is referred to as a reception conductor group 12. The reception conductor group 12 includes, for example, 128 reception conductors $12X_1$ to $12X_{128}$.

It is to be noted that, in the description of transmission conductors in the present specification, where there is no necessity to specify a particular transmission conductor among the 64 transmission conductors $11Y_1$ to $11Y_{64}$ in the transmission conductor group 11, the transmission conductor is referred to as transmission conductor 11Y. Similarly, where there is no necessity to specify a particular reception conductor among the 128 reception conductors $12X_1$ to $12X_{128}$ in the reception conductor group 12, the reception conductor is referred to as reception conductor 12X.

The transmission conductor 11Y is a linear (plate-like) conductor extending in a lateral direction (X-axis direction) of a pointing input surface 100S. In this example, 64 transmission conductors 11Y are arrayed in an equally spaced relationship from each other in a longitudinal direction (Y-axis direction) of the sensor section 100 as shown in FIG. 1 on a lower side substrate 16 shown in FIG. 2 to form the transmission conductor group 11.

Meanwhile, the reception conductor 12X is a linear (plate-like) conductor extending in the longitudinal direction (Y-axis direction) of the pointing input surface 100S. In this example, 128 reception conductors 12X are arrayed in an equally spaced relationship from each other in the lateral direction (X-axis direction) of the sensor section 100 as shown in FIG. 1 on the lower face of an upper side substrate 17 shown in FIG. 2 to form the reception conductor group 12.

An upper face of the upper side substrate 17 forms the pointing input surface 100S on which inputting of pointing operation is carried out by a pointer such as a finger or an electrostatic pen.

The lower side substrate 16 and the upper side substrate 17 are spaced from each other by a predetermined distance in the Z-axis direction. Also the transmission conductors 11Y and the reception conductors 12X are opposed to each other in a spaced relationship by the predetermined distance in the Z-axis direction, and the transmission conductors 11Y and the reception conductors 12X are disposed such that the extension directions thereof are perpendicular to each other.

Since the sensor section 100 is configured in such a manner as described above, the plural transmission conductors 11Y and the plural reception conductors 12X cross with each other in orthogonal directions to each other, and are also in a spaced relationship by a predetermined distance from each other in the Z-axis direction in the present example. In the present specification, the point at which a transmission conductor 11Y and a reception conductor 12X cross with each other is referred to as a cross point. The coordinate position of a cross point on the pointing input surface 100S is a detection coordinate position of a pointing input by a pointer.

It is to be noted that, while the foregoing description is given with regard to a case wherein the transmission conductors 11Y and the reception conductors 12X, all formed linearly, are disposed orthogonally to each other, the shape of the transmission conductors 11Y and the reception conductors 12X may be set suitably in each embodiment. Further, the transmission conductors 11Y and the reception conductors 12X may cross with each other at an angle other than the orthogonal crossing angle. For example, the transmission conductors 11Y and the reception conductors 12X may cross obliquely with each other. Further, at least the transmission conductors 11Y and/or the reception conductors 12X may be formed from conductors formed in a curved shape or in a concentric relationship. For example, the plural transmission conductors 11Y may be formed in circles having different diameters from each other and disposed concentrically while the plural reception conductors 12X are formed from plural conductors of a linear shape extending radially from the center of the concentric circles and are disposed at equal angular intervals in a circumferential direction of the conductors of the linear shape.

Further, for an improved electric characteristic, the reception conductors 12X should be formed with a width smaller than the width of the transmission conductors 11Y. This is because, since the floating capacitance decreases, noise that enters the reception conductors 12X can be reduced.

Further, the transmission conductors 11Y and the reception conductors 12X are formed such that both of the array distances (pitches) thereof are, for example, 3.2 mm. It is to be noted that the number and the pitch of the transmission conductors 11Y and the reception conductors 12X are not limited to these examples, but are set suitably according to the size of the sensor section 100, a required detection resolution, and so forth.

For the lower side substrate 16 and the upper side substrate 17, a substrate in the form of a sheet (in the form of a film) made of, for example, a transparent synthetic resin or the like is used. The upper side substrate 17 is configured from a material which is elastically displaceable in a pressed direction when it is pressed by a pointer. Since the lower side substrate 16 need not be displaced elastically, it may be configured from a glass substrate or a copper foil pattern substrate.

The transmission conductors 11Y and the reception conductors 12X are formed from a transparent electrode film formed from, for example, a silver pattern or an ITO (Indium Tin Oxide: indium tin oxide) film, or copper foil or the like. The electrode patterns of the transmission conductor group 11 and the reception conductor group 12 can be formed, for example, in the following manner. First, an electrode film formed from any of the materials described hereinabove is formed on the lower side substrate 16 and the upper side substrate 17, for example, by a sputtering method, a vapor deposition method, an application method or the like. Then, the formed electrode film is etched to form the transmission conductor group 11 and the reception conductor group 12 of individually predetermined patterns. It is to be noted that, where the transmission conductors 11Y and the reception conductors 12X are formed from copper foil, not copper foil edging but, for example, an inkjet printer may be used to blow out ink containing copper particles to a glass plate or the like to form a predetermined electrode pattern.

Further, the pressure sensitive member is configured from a first resistive element and a second resistive element. In particular, as shown in FIG. 2, first resistive elements (hereinafter referred to as transmission resistive elements) 13Y are formed in a laminated relationship on the transmission conductors 11Y on the lower side substrate 16. Meanwhile, second resistive elements (hereinafter referred to as reception resistive elements) 14X are formed in a laminated relationship on the lower side reception conductors 12X of the upper side substrate 17. The transmission resistive elements 13Y and the reception resistive elements 14X are provided in a spaced relationship by a distance of a small air gap 15 in a direction perpendicular to the pointing input surface 100S.

In the present example, fine convexes and concaves are formed on each of opposing faces of the transmission resistive elements 13Y and the reception resistive elements 14X with the air gap 15 interposed therebetween as shown in FIG. 2. As hereinafter described, the resistance value between a transmission conductor 11Y and a reception conductor 12X in a state wherein a transmission resistive element 13Y and a reception resistive element 14X contact with each other exhibits a value corresponding to the contact area of the opposing faces on which the convexes and the concaves of the transmission resistive element 13Y and the reception resistive element 14X are formed.

It is to be noted that, though not shown, a spacer member for maintaining the air gap 15 is provided between the lower side substrate 16 and the upper side substrate 17 at peripheral edge portions of the sensor section 100. In sort, the lower side substrate 16 and the upper side substrate 17 are joined together with the spacer member interposed therebetween.

The transmission resistive elements 13Y and the reception resistive elements 14X are formed as transmission resistive elements and reception elements formed as a plurality of separate pieces corresponding to the transmission conductors 11Y and the reception conductors 12X, respectively, in order to raise the detection sensitivity of the pressed position (X-Y coordinate position) and the detection sensitivity of the pressing force by a pointer.

In particular, the transmission resistive elements 13Y are formed such that, as shown in FIG. 2(B), they individually cover the transmission conductors 11Y and adjacent ones of them are isolated by an air gap 15Y so that they are electrically independent of each other. Since the transmission resistive elements 13Y are provided so as to cover the transmission conductors 11Y, the transmission conductors 11Y and the transmission resistive elements 13Y are respectively electrically connected to each other.

Similarly, the reception resistive elements 14X are formed such that, as shown in FIG. 2(A), they individually cover the reception conductors 12X and adjacent ones of them are isolated by an air gap 15X so that they are electrically independent of each other. Since the reception resistive elements 14X are provided so as to cover the reception conductors 12X, the reception conductors 12X and the reception resistive elements 14X are respectively electrically connected to each other.

Figure 60A:
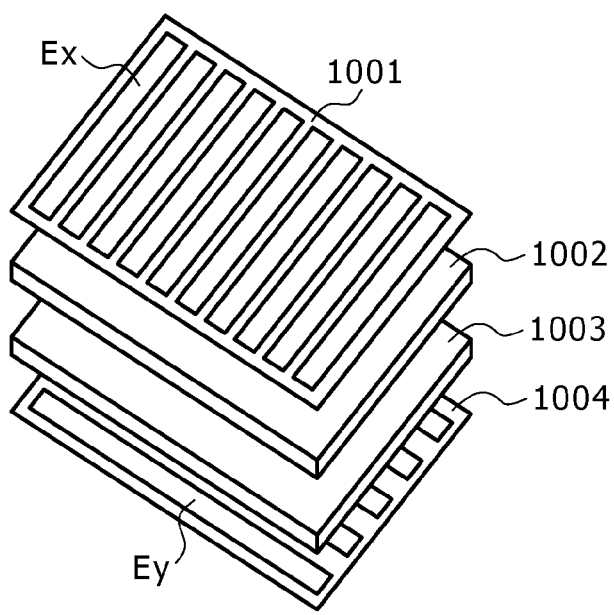
FIGS. 60A-60C are views showing a sensor section of a pointer detection apparatus of the resistive film method.
Figure 60B:
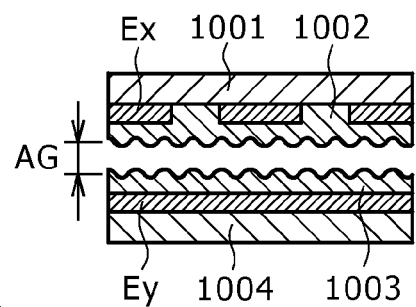
Figure 60C:
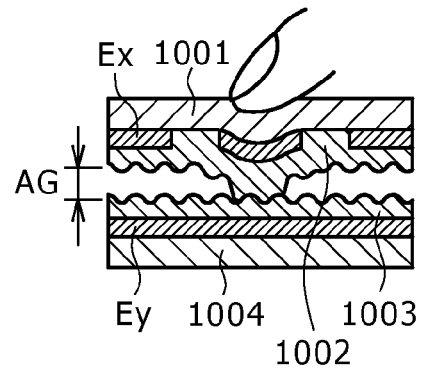

It is to be noted that the transmission resistive elements 13Y and the reception resistive elements 14X may be provided as a single resistive element over an overall area of one face of the lower side substrate 16 and the upper side substrate 17 as shown in FIG. 60A. However, if both of the transmission resistive elements 13Y and the reception resistive elements 14X are formed as a single resistive element over an overall area on one face of the lower side substrate 16 and the upper side substrate 17, then the resolution of pointer detection drops. Therefore, one of the transmission resistive elements 13Y and the reception resistive elements 14X should be configured as a plurality of resistive elements separated from each other as in the example described above.

The transmission resistive elements 13Y and the reception resistive elements 14X are formed from a transparent resistance film of, for example, ITO (Indium Tin Oxide: indium tin oxide), ATO (antimony-doped tin oxide) or the like. It is to be noted that, where the pointer detection apparatus 1 is used in an application where it is not necessary to dispose the apparatus 1 on a front face of a pointing screen, of course the material for configuring the transmission resistive elements 13Y and the reception resistive elements 14X is not limited to a transparent resistance film material.

Although the pointer detection apparatus of the present invention can be configured integrally with a display apparatus such as a liquid crystal panel, in this instance, the sensor section 100 is provided such that it is placed on the liquid crystal panel.

[Description of the Principle of Pointer Detection by the Sensor Section 100: FIGS. 3 to 10]

In the present embodiment, a transmission signal hereinafter described is supplied from the transmission section 200 to the transmission conductors 11Y of the sensor section 100. This transmission signal is supplied as a voltage signal to the transmission conductors 11Y. This transmission signal (voltage signal) is supplied to a capacitor Co between a transmission conductor 11Y and a reception conductor 12X. Electric current which varies in response to the presence or absence of a pointer flows through the capacitor Co, and this current flows to the reception conductor 12X.

Further, as hereinafter described, when pressing force is applied by a pointer to the pointing input surface 100S to thereby place a transmission resistive element 13Y and a reception resistive element 14X into a mutually contacting state, then the contact area between the transmission resistive element 13Y and the reception resistive element 14X varies in response to the pressing force. Then, electric current in accordance with the contact area between the transmission resistive element 13Y and the reception resistive element 14X flows to the reception conductor 12X in response to the transmission signal (voltage signal) supplied to the transmission conductor 11Y.

The electric current flowing to the reception conductor 12X is supplied as a reception signal to the reception section 300. The reception section 300 forms a signal detection circuit, and converts a reception signal received as a current signal into a voltage signal and obtains a pointer detection result in such a manner as hereinafter described. It is to be noted that, in the description of the principle hereinafter given, it is assumed for simplified description that the same transmission signal is supplied to the 64 transmission conductors $11Y_1$ to $11Y_{64}$ with the transmission timing thereof displaced successively.

<Detection in a State in which a Pointer is Spaced from the Pointing Input Surface and is Touching: Electrostatic Coupling Method, FIGS. 3 to 5>

In this instance, when a pointer such as a finger does not exist on or above the pointing input surface 100S which is the surface of the upper side substrate 17 of the sensor section 100, a current flows to the capacitor Co at a cross point between a reception conductor 12X and a transmission conductor 11Y in response to a transmission signal (voltage signal) supplied to the transmission conductor 11Y. This current flows to the reception conductor 12X and is supplied as a reception signal (current signal) to the reception section 300. Since this similarly applies to all cross points of the pointing input surface 100S, when a pointer such as a finger does not exist on the pointing input surface 100S, a reception signal of the same level (of the same current value) is supplied from all of the reception conductors $12X_1$ to $12X_{128}$ to the reception section 300 as shown in FIG. 4(A).

Figure 4A:
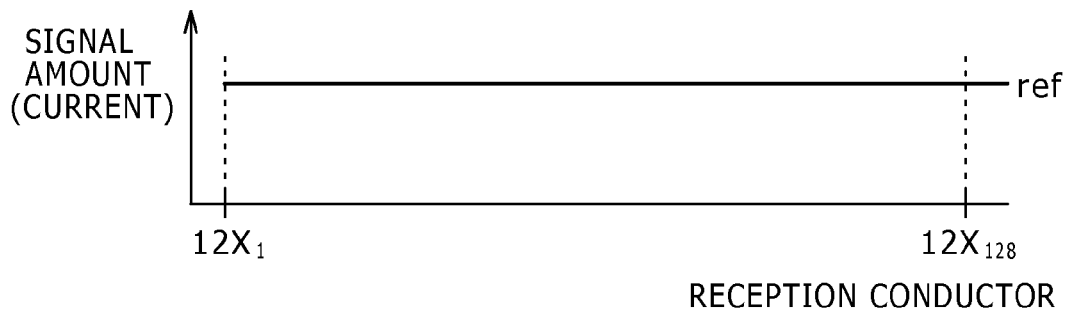
FIGS. 4A and 4B are views illustrating an operation principle of pointer detection by an electrostatic coupling method by the pointer detection apparatus of the first embodiment.

It is to be noted that FIG. 4(A) illustrates current flowing through 128 cross points of the 128 reception conductors $12X_1$ to $12X_{128}$ which cross with an arbitrary transmission conductor 11Y, that is, a reception signal obtained from the reception conductors $12X_1$ to $12X_{128}$. The same is true with the cross points of all of the other transmission conductors 11Y and the 128 reception conductors $12X_1$ to $12X_{128}$ when a pointer such as a finger does not exist on or above the pointing input surface 100S, and thus the reception signals supplied from the reception conductors 12X to the reception section 300 have the same level similarly as shown in FIG. 4(A).

Figure 3:
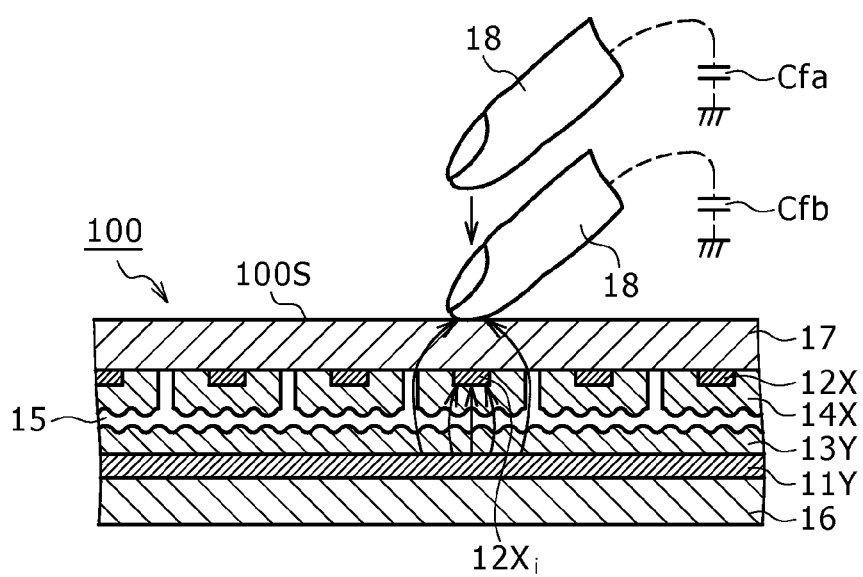
FIG. 3 is a view showing an operation principle of pointer detection by an electrostatic coupling method by the pointer detection apparatus of the first embodiment.

On the other hand, as shown in FIG. 3, if a finger as an example of the pointer 18 is placed at a proximity position spaced from the pointing input surface 100S above the pointing input surface 100S or placed at a position touching with the pointing input surface 100S to carry out a pointing input operation, then at the pointing input position, capacitors Cfa or Cfb are formed by coupling between the pointer 18 and the reception conductor 12X. Consequently, at a cross point corresponding to the pointing input position of the pointer 18, the current flowing to the capacitor Co in response to the transmission signal (voltage signal) partly disappears through the capacitors Cfa or Cfb.

Figure 4B:
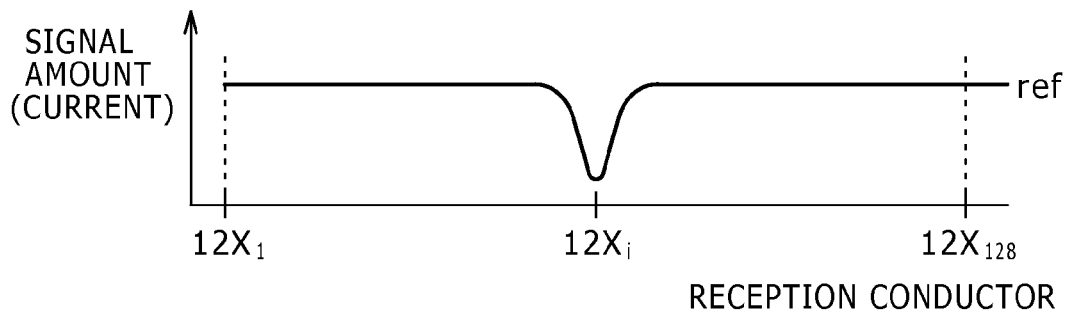

In particular, where the pointer 18 exists above the pointing input surface 100S of the sensor section 100, the transmission conductor 11Y at the pointing input position by the pointer 18 is placed into an electrostatically coupled state not only with the reception conductor 12X but also with the ground through the pointer 18 as shown in FIG. 3. In this state, electric lines of force emerging from the transmission resistive element 13Y connected to the transmission conductor 11Y in response to the transmission signal not only converge to the reception conductor 12X through the reception resistive element 14X but also partly converge to the pointer 18 as indicated by arrow marks in FIG. 3. Therefore, part of current flowing to the reception conductor group 12 in response to the transmission signal is shunted to the ground through the pointer 18. As a result, the current flowing to the reception conductor 12X at the pointing input position of the pointer 18 decreases to a value lower than a value ref (hereinafter used as a reference value) when the pointer 18 does not exist, as shown in FIG. 4(B).

By detecting this current variation by which the current decreases to a value lower than the reference value ref, the pointing input position on the pointing input surface 100S by the pointer 18, which is moving from the position spaced from the pointing input surface 100S to the contacting position with the pointing input surface 100S, is detected. Then, by detecting the position of the cross point at which the decreasing current variation is exhibited, the pointing input position of the pointer 18 is detected. The detection of the pointing input position of the pointer 18 is hereinafter described in detail.

In this manner, where the pointer 18 exists in a hovering state in which it is spaced from the pointing input surface 100S and in another state in which the pointer 18 contacts the pointing input surface 100S, in the present embodiment, pointer detection is carried out by an electrostatic coupling method.

Figure 5:
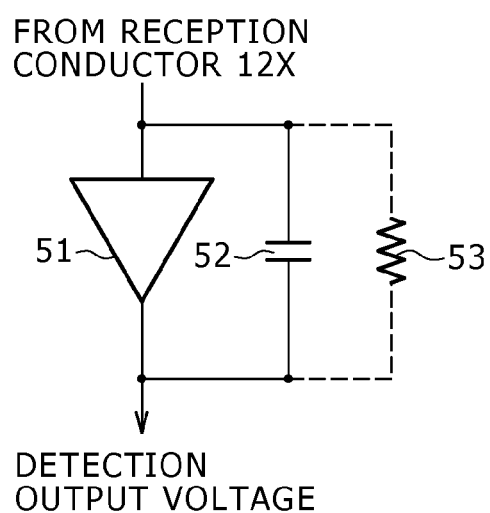
FIG. 5 is a view showing a circuit of main part of the pointer detection apparatus of the first embodiment for pointer detection by the electrostatic coupling method.

In this electrostatic coupling method, a reception signal as a current signal obtained from a reception conductor 12X is converted into a voltage signal by the reception section 300. FIG. 5 is a view showing an example of a basic configuration of a current-voltage conversion circuit (hereinafter referred to as I/V conversion circuit) in the electrostatic coupling method.

In particular, an I/V conversion circuit provided for a reception signal (current signal) from a reception conductor 12X in the electrostatic coupling method is configured by connecting a detecting capacitor 52 across an operational amplifier 51 as shown in FIG. 5. It is to be noted that actually a direct current bias resistor 53 is connected in parallel to the detecting capacitor 52.

<Detection of Pressing Force Applied to the Pointing Input Surface by a Pointer: Resistive Film Method, FIGS. 6 to 8>

Figure 7A:
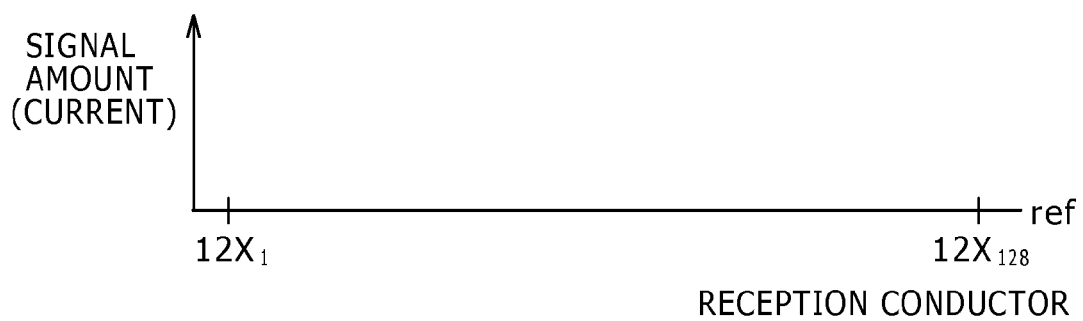
FIGS. 7A and 7B are views illustrating an operation principle of pointer detection by the resistive film method by the pointer detection apparatus of the first embodiment.
Figure 7B:
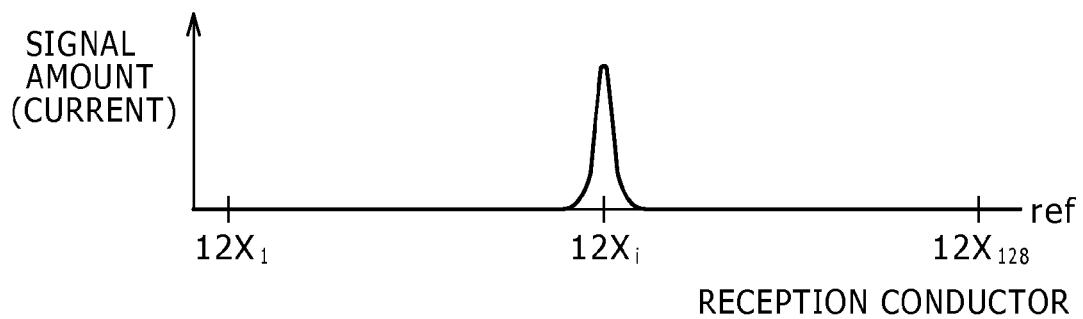

In the state described hereinabove in which no pressing force is applied to the pointing input surface, when a pointer is spaced from or is about to touch the pointing input surface, a transmission resistive element 13 and a reception resistive element 14 are in a state in which they are spaced from each other with the air gap 15 interposed therebetween, and no current flows through the transmission resistive element 13 and the reception resistive element 14. Accordingly, in the state in which pressing force from the pointer 18 is not applied to the pointing input surface 100S, no current flows through the transmission resistive element 13 and the reception resistive element 14 and the current flowing to the reception conductor group 12 is fixed (=reference value ref) as shown in FIG. 7(A).

Figure 6:
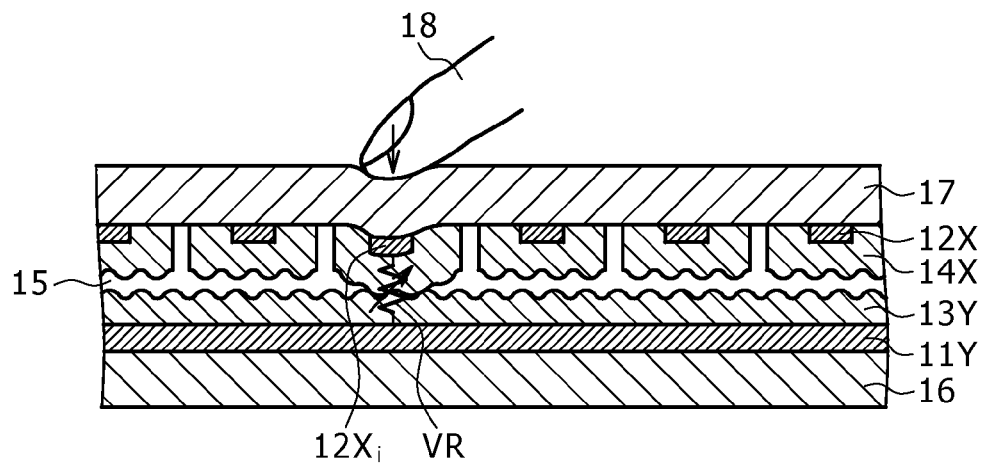
FIG. 6 is a view illustrating an operation principle of pointer detection by a resistive film method by the pointer detection apparatus of the first embodiment.

If pressing force is applied from the pointer 18 to the pointing input surface 100S, in a state in which the pointer 18 touches the pointing input surface 100S as shown in FIG. 6, then the upper side substrate 17 is displaced at a portion thereof to which the pressing force is applied, and the opposing faces of the reception resistive element 14X and the transmission resistive element 13Y at the location are placed into a contacting state with each other.

Consequently, current flows to the reception conductor 12X at the position at which the pressing force is applied, based on a transmission signal (voltage signal) supplied to the transmission conductors 11Y and through a resistance value of the variable resistor VR formed by the reception resistive element 14X and the transmission resistive element 13Y contacting with each other. In particular, at the position at which the pressing force is applied, current defined by the resistance value of the variable resistor VR at the contacting portion of the reception resistive element 14X and the transmission resistive element 13Y at the location at which the pressing force is applied flows from the transmission conductor 11Y to the reception conductor 12 (refer to FIG. 7(B)).

The resistance value of the variable resistor VR at the contacting location of the reception resistive element 14X and the transmission resistive element 13Y decreases as the contact area between them increases, and the current flowing through the variable resistor VR increases as the contact area increases. As described above, the faces at which the transmission resistive element 13Y and the reception resistive element 14X contact with each other have very small convexes and concaves formed thereon, and as the pressing force of the pointer 18 to the pointing input surface 100S increases, the air gap between the convexes and the concaves disappears and the contact area between the reception resistive element 14X and the transmission resistive element 13Y increases.

Accordingly, when pressing force is applied from the pointer 18 to the pointing input surface 100S, at the location at which the pressing force is applied, current flows from the transmission conductor 11Y to the reception conductor 12X through the variable resistor VR, and consequently, the current value increases in response to the pressing force. In short, when no pressing force is applied, since the transmission resistive element 13 and the reception resistive element 14 do not contact with each other, no current flows through the variable resistor VR and the current obtained from the reception conductor group 12 exhibits the reference value ref. However, when pressing force is applied to place the transmission resistive element 13 and the reception resistive element 14 into a mutually contacting state, then current flows through the variable resistor VR, and the current flowing from the reception conductor 12X varies in a direction in which it increases from the reference value ref.

The current variation in the direction in which the current increases from the reference value ref is detected to detect the pressing force applied to the pointing input surface 100S by the pointer 18. Then, the position at a cross point at which the current variation in the increasing direction from the reference value ref is detected to detect the pointing input position at which the pressing force is applied by the pointer 18 to the pointing input surface 100S.

As described above, detection of a pointing input operation that entails application of the pressing force by the pointer 18 to the pointing input surface 100S is carried out in accordance with a resistive film method.

In this resistive film method also, current obtained from the reception conductor 12X is converted into a voltage by the reception section 300 similarly as in the case of the electrostatic coupling method. However, the resistive film method is different from the electrostatic coupling method in that the element for current detection is not a capacitor but a resistor.

Figure 8:
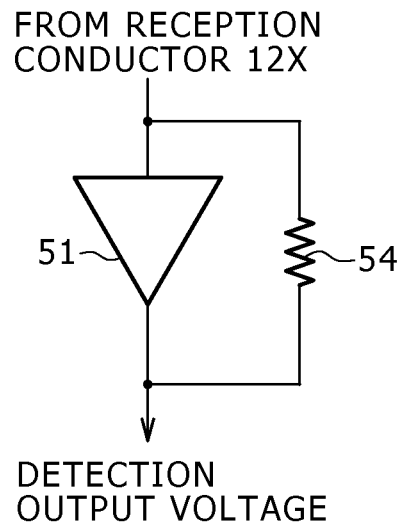
FIG. 8 is a view showing a circuit of main part for pointer detection by the resistive film method in the pointer detection apparatus of the first embodiment.

FIG. 8 is a view showing an example of a basic configuration of an I/V conversion circuit according to the resistive film method. An I/V conversion circuit provided for a reception signal (current signal) supplied from a reception conductor 12X to the reception section 300 in the resistive film method is configured by connecting a detecting resistor 54 across an operational amplifier 51 as shown in FIG. 8.

As described above, in the present embodiment, the sensor section 100 can carry out both the pointer detection (including hovering detection) based on the electrostatic coupling method and the pointer detection (including pointing pressure detection) based on the resistive film method.

The control circuit 40 determines, based on the variation of the reception signal (current signal) supplied to the reception section 300, which one of the electrostatic coupling method and the resistive film method should be used to execute the detection process of a pointer to be executed by the reception section 300. In particular, when a current variation of the reception signal supplied from a reception conductor 12X to the reception section 300 occurs in a direction in which the current decreases from the reference value ref, the control circuit 40 controls the reception section 300 to carry out pointer detection using the electrostatic coupling method. However, if a current variation occurs in a direction in which the current increases from the reference value ref, then the control d 40 controls the reception section 300 to carry out detection of a pointer using the resistive film method. Instead of the control circuit 40, it is also possible to provide a determination section within the reception section 300 for determining which one of the pointer detection methods should be used to execute detection of a pointer so as to control the reception section 300 in regard to which one of the pointer detection methods should be used.

It is to be noted that, in the following description of the present specification, the pointer detection mode based on the electrostatic coupling method is referred to as capacitive touch detection mode, and the pointer detection mode based on the resistive film method is referred to as resistive touch detection mode.

<Examples of the Configuration of an I/V Conversion Circuit Used in the Present Embodiment>

In the present embodiment, it is necessary for the I/V conversion circuit to have a configuration which allows use of both pointer detection methods including the electrostatic coupling method and the resistive film method described hereinabove. Examples of a configuration of an I/V conversion circuit which can carry out both pointer detection methods including the electrostatic coupling method and the resistive film method are described below.

Figure 9:
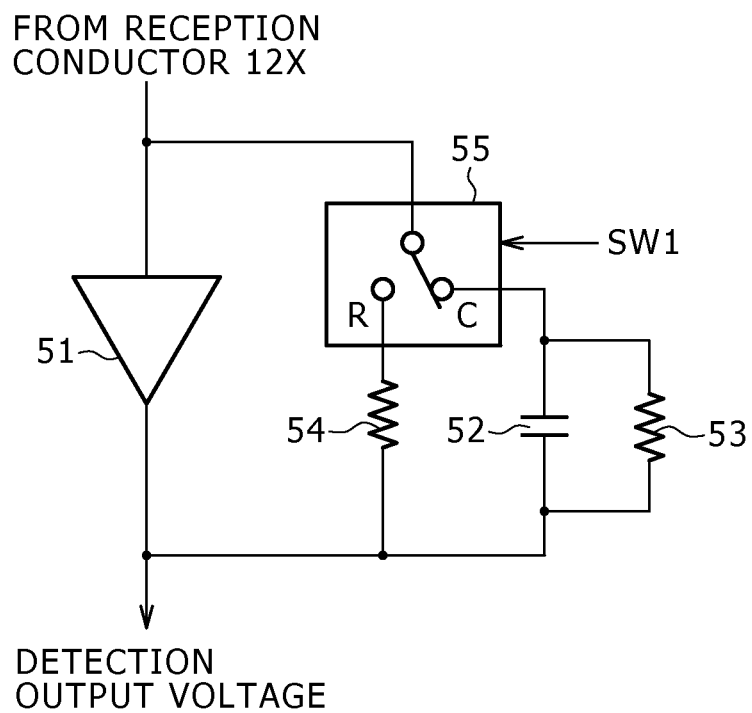
FIG. 9 is a view showing a circuit of part of the pointer detection apparatus of the first embodiment for pointer detection by both of the electrostatic coupling method and the resistance film method.

[First Configuration Example: FIG. 9]

FIG. 9 shows a first example of a configuration of an I/V conversion circuit used in the present embodiment. In the first configuration example of the I/V conversion circuit, the electrostatic coupling method and the resistive film method are changed over (switched) by a switch circuit 55.

In particular, in this first configuration example, the switch circuit 55 which can be switched between a terminal C and a terminal R in response to a switch control signal SW1 from the outside, a detecting capacitor 52 according to the electrostatic coupling method, and a detecting resistor 54 according to the resistive film method are provided across the operational amplifier 51.

Between the terminal C side of the switch circuit 55 and the output side of the operational amplifier 51, the detecting capacitor 52 for the electrostatic coupling method is connected. It is to be noted that the direct current bias resistor 53 is connected to the detecting capacitor 52. Further, between the terminal R side of the switch circuit 55 and the output of the operational amplifier 51, the detecting resistor 54 according to the resistive film method is connected.

In this first configuration example, the pointer detection apparatus 1 includes two pointer detection modes including a capacitive touch detection mode and a resistive touch detection mode. The switch control signal SW1 is generated in the control circuit 300 or the reception section 300 based on a result of the determination made by a determination section for determining which one of the electrostatic coupling method and the resistive film method described above should be used as the pointer detection method to execute the pointer detection process, and is supplied to the switch circuit 55. In other words, the control circuit 40 or the reception section 300 generates the switch control signal SW1 based on a current signal inputted from the sensor section 100.

In the capacitive touch detection mode, the switch circuit 55 is changed over to the terminal C side in accordance with the switch control signal SW1 to connect the detecting capacitor 52 across the operational amplifier 51.

Meanwhile, in the resistive touch detection mode, the switch circuit 55 is changed over to the terminal R side in accordance with the switch control signal SW1 to connect the detecting resistor 54 across the operational amplifier 51.

It is to be noted that, while, in the example of FIG. 9, the switch circuit 55 is provided on the input end side of the operational amplifier 51, of course the switch circuit 55 may otherwise be provided on the output end side of the operational amplifier 51.

Figure 10:
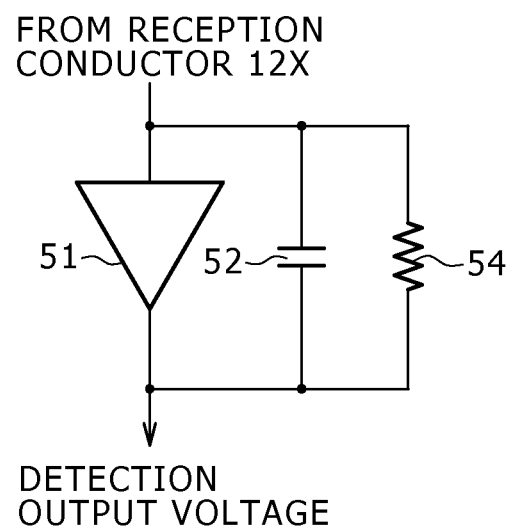
FIG. 10 is a view showing another example of the circuit of part of the pointer detection apparatus of the first embodiment for pointer detection by both of the electrostatic coupling method and the resistance film method.

[Second Example of the Configuration: FIG. 10]

The second configuration example is an example of an I/V conversion circuit which can be used commonly in the two modes including the capacitive touch detection mode and the resistive touch detection mode. In other words, the second configuration example is an example which eliminates the necessity for changeover (switching) based on the capacitive touch detection mode and the resistive touch detection mode.

FIG. 10 shows the second configuration example of an I/V conversion circuit used in the present embodiment. In this second configuration example of the I/V conversion circuit, a detecting capacitor 52 for the electrostatic coupling method and a detecting resistor 54 for the resistive film method are connected in parallel across the operational amplifier 51.

In this instance, a direct current bias resistor 53 is connected to the detecting capacitor 52, as shown in FIG. 5. Accordingly, if the detecting resistor 54 of the resistive film method has an inductance value equal to that of the direct current bias resistor 53 of the detecting capacitor 52, then a mode switch circuit 55 as in the first configuration example is not required. In particular, in this instance, where the capacitance of the detecting capacitor 52 is represented by C, if the resistance R of the detecting resistor 54 satisfies $$R \approx 1/j\omega C$$

then the I/V conversion circuit can be configured so as to have the second configuration example.

In the present second configuration example, switching between the capacitive touch detection mode and the resistive touch detection mode is basically unnecessary. It is to be noted that, where it is to be detected which detection mode has been used to carry out pointer detection and a result of the mode detection is to be outputted, similarly to the first configuration example described above, the control circuit 40 or the reception section 300 is configured to determine which one of the detection methods should be used to carry out position detection and a result of the determination is outputted.

<Description of a Configuration for Detecting a Pointing Input Position (Cross Point Position) of a Pointer>

In the present embodiment, regarding the manner of detection of a pointing input position of a pointer, the same detection processing operation is carried out in both a case of pointer detection by the electrostatic coupling method and another case of pointer detection by the resistive film method.

If pointer detection by the electrostatic coupling method and pointer detection by the resistive film method are executed with regard to all cross points between the transmission conductors 11Y and the reception conductors 12X, then position detection is possible regarding at which cross point a pointing input operation is carried out by a pointer.

In this instance, if one (one kind of) transmission signal is successively supplied to the transmission conductors at all cross points and the reception section 300 carries out pointer detection regarding a reception signal from a reception conductor at a cross point at which the transmission signal is supplied to a transmission conductor, then detection of the pointing input position of the pointer is possible. However, since this results in execution of pointer detection for each one of a large number of cross points, a long time is required before a result of pointer detection is obtained with regard to all cross points of the pointing input surface 100S, which is not preferable in practical use.

On the other hand, it is also possible to prepare a plurality of transmission signals equal to the number of the transmission conductors 11Y and provide an I/V conversion circuit for each of the reception conductors 12X in the reception section 300 to carry out pointer detection. In this instance, transmission signals different from each other and capable of being discriminated by the reception section 300 are supplied at the same time to all transmission conductors 11Y, and the reception section 300 converts reception signals from all reception conductors at the same time into voltage signals by respective I/V conversion circuits to carry out pointer detection. Since the reception section 300 can obtain a result of pointer detection with regard to all cross points of the pointing input surface 100S by processing the reception signals from the plural I/V conversion circuits at the same time, a processing result can be obtained at a very high speed.

However, where this measure is taken, there is a problem that the hardware configuration becomes very large and the cost becomes high and additionally the pointer detection apparatus becomes large in size.

Taking this problem into consideration, in the present embodiment, the transmission section 200 and the reception section 300 are configured so that a pointer detection result can be obtained at a high speed while ensuring that the hardware configuration does not become very large.

In particular, in the present embodiment, a plurality of transmission conductors 11Y of the transmission conductor group 11 are divided into a plurality of groups each including an equal plural number of transmission conductors 11Y, and different transmission signals are allocated to the different groups. In the following description, a group of a plural number of transmission conductors 11Y is referred to as a transmission block. As the different transmission signals, different spread codes of different codes are used as hereinafter described, in the present embodiment.

In the present embodiment, to those transmission conductors 11Y selected in each of the plural transmission blocks each including plural transmission conductors 11Y, the transmission signals different from each other are supplied at the same time in a synchronized relationship. Then, in each of the transmission blocks, the one transmission conductor to be selected is switched from the one to the other, and then different transmission signals are again supplied to the newly selected transmission conductors 11Y in the different transmission blocks, respectively, simultaneously in synchronism with each other. If supply of transmission signals to all transmission conductors 11Y in the transmission blocks is completed, then the transmission conductors 11Y that were selected first in the individual transmission blocks are to be selected again, and the processes described are repeated.

Consequently, to each of the reception conductors 12X, a current in accordance with different transmission signals (voltage signals) from a plurality of transmission blocks flows in a multiplexed state. Further, as hereinafter described, the reception section 300 is configured such that it can detect the current signals from the reception conductors 12X in synchronism with the transmission timing of the transmission signals.

In particular, since, in the present embodiment, spread codes of different codes are used as the transmission signals, correlation values of the different spread codes are detected simultaneously and concurrently. Then, a variation of the current flowing to the reception conductors 12X is detected based on the detected correlation values to obtain a detection output regarding which cross point on the pointing input surface 100S is pointed to (and inputted) by a pointer.

In order to implement such operation of the transmission section 200 and the reception section 300 as described above, the control circuit 40 controls the changeover (switching) timing of the reception conductors 12X of the reception section 300 in synchronism with the changeover (switching) timing described hereinabove with regard to a plurality of transmission conductors 11Y in the transmission blocks.

By such a configuration as described above, if the number of transmission blocks is represented by N(N is an integer equal to or higher than 2), then the pointer detection process can be carried out at a speed as high as N times that of the case where all cross points are searched sequentially (i.e., in a processing time equal to 1/N).

Figure 11:
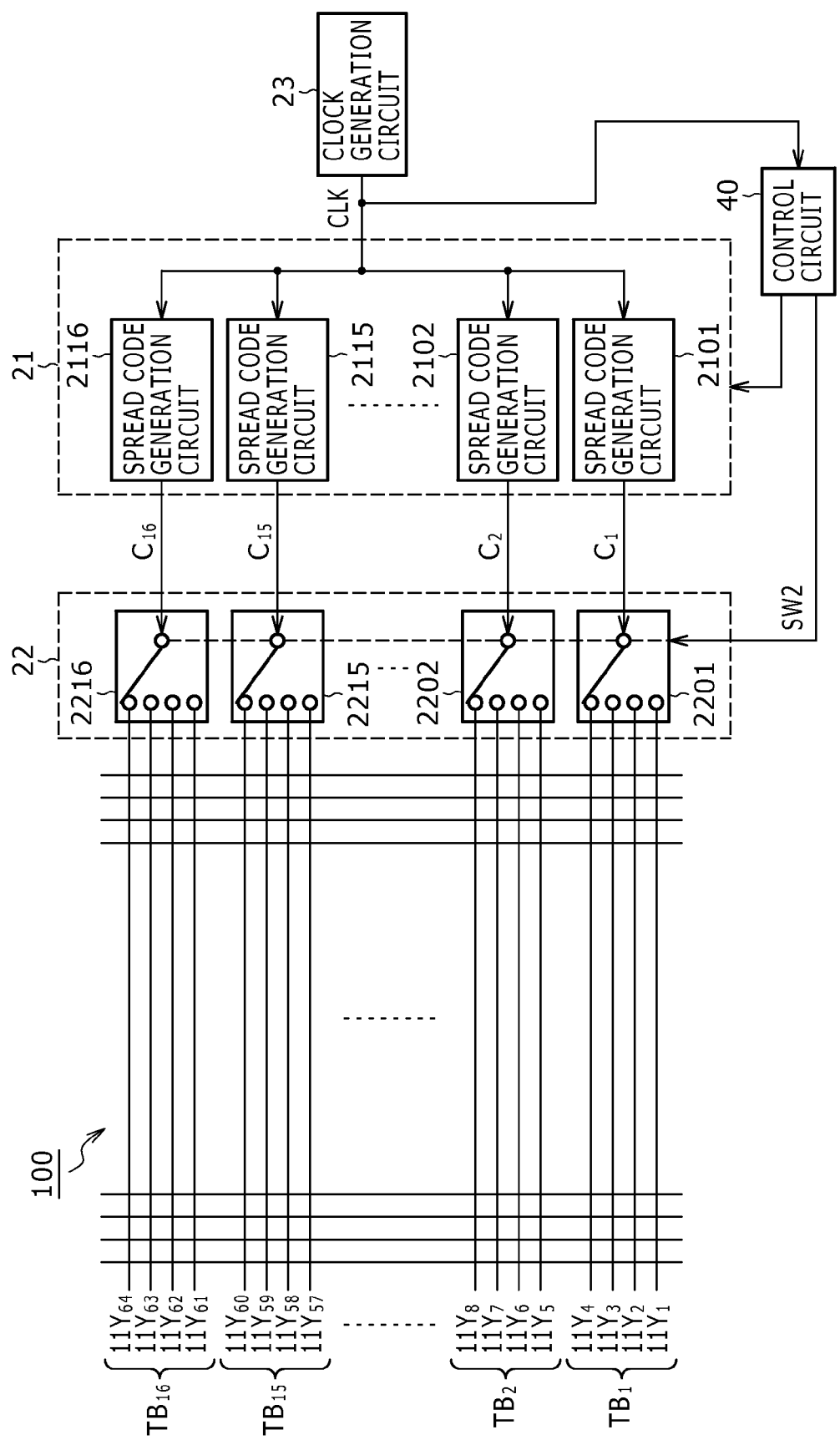
FIG. 11 is a view showing a transmission section of the pointer detection apparatus of the first embodiment.
Figures 12, 13:
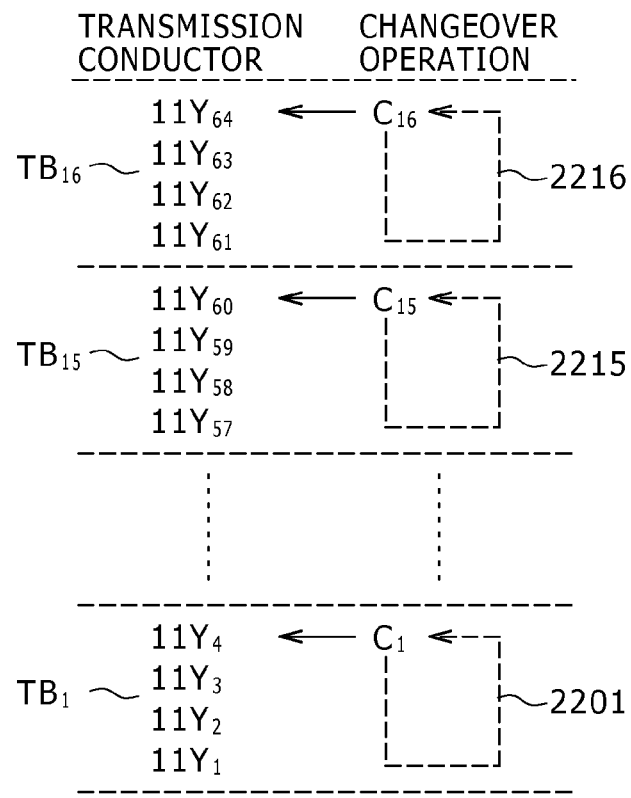
FIG. 12 is a view illustrating spread codes as an example of a transmission signal used in the pointer detection apparatus of the first embodiment.
FIG. 13 is a view illustrating operation of the transmission section of the pointer detection apparatus of the first embodiment.

[Example of the Configuration of the Transmission Section 200: FIGS. 11 to 13]

In order to satisfy the function described above, the transmission section 200 in the present embodiment is configured including a transmission signal supplying circuit 21, a transmission conductor selection circuit 22, and a clock generation circuit 23.

In the present embodiment, the 64 transmission conductors $11Y_1$ to $11Y_{64}$ are divided, for example, into 16 transmission blocks $TB_1$ to $TB_{16}$ each including four transmission conductors. Accordingly, while it is necessary for the transmission signal supplying circuit 21 to generate 16 different transmission signals, in the present example, 16 different spread codes are used as the transmission signals.

It is to be noted that, as different spread codes, for example, spread codes obtained by successively shifting the phase of one spread code by one chip or by a plurality of chips can be used.

Particularly in the present example, the Hadamard matrix of 16 rows×16 columns as shown in FIG. 12 in conformity with the number of transmission blocks is assumed, and Hadamard codes of 16 chips of individual rows (or similarly of individual columns) which form the Hadamard matrix are used as 16 spread codes $C_1$ to $C_{16}$. The 16 Hadamard codes are code strings having an orthogonal relationship to each other.

The transmission signal supplying circuit 21 of the present example is formed from 16 spread code generation circuits 2101, 2102, ..., 2116 as shown in FIG. 11. The spread code generation circuits 2101, 2102, ..., 2116 generate spread codes $C_1, C_2, ..., C_{16}$ formed from Hadamard codes orthogonal to each other.

To the spread code generation circuits 2101, 2102, ..., 2116, the clock signal CLK is inputted from the clock generation circuit 23. It is to be noted that the clock signal CLK outputted from the clock generation circuit 23 is inputted as a timing signal also to the control circuit 40.

The spread code generation circuits 2101, 2102, ..., 2116 output spread codes $C_1, C_2, ..., C_{16}$, respectively, for each one chip in synchronism with the clock signal CLK supplied thereto from the clock generation circuit 23 under the control of the control circuit 40. In the present example, the spread code generation circuits 2101, 2102, ..., 2116 generate data of one chip of spread codes for each one cycle of the clock signal CLK to generate the spread codes $C_1, C_2, ..., C_{16}$ individually formed from 16 chips $PN_1, PN_2, ..., PN_{16}$ within 16 cycles of the clock signal CLK. In particular, the spread code generation circuits 2101, 2102, ..., 2116 generate spread codes $C_1, C_2, ..., C_{16}$ formed from 16 chips $PN_1, PN_2, ..., PN_{16}$ cyclically and repetitively for each 16 cycles of the clock signal CLK.

It is to be noted that, in the following description, 16 cycles of the clock signal CLK for the 16 chips $PN_1, PN_2, ..., PN_{16}$ are referred to as one cycle for the spread codes $C_1, C_2, ..., C_{16}$ for the convenience of description.

The spread code generation circuits 2101, 2102, ..., 2116 supply the generated spread codes $C_1, C_2, ..., C_{16}$ to the transmission conductor selection circuit 22.

It is to be noted that the transmission signal supplying circuit 21 may be configured otherwise such that data of the spread codes $C_1, C_2, ..., C_{16}$ are retained in advance in a nonvolatile memory formed from a ROM or the like and the read address of the nonvolatile memory is controlled so as to output the plural spread codes $C_1, C_2, ..., C_{16}$.

As shown in FIG. 11, the transmission conductor selection circuit 22 includes 16 switch circuits 2201 to 2216 individually corresponding to the 16 transmission blocks $TB_1$ to $TB_{16}$. Each of the switch circuits 2201 to 2216 is a 1-input 4-output switch circuit. To the switch circuits 2201 to 2216, the spread codes $C_1, C_2, ..., C_{16}$ from the individually corresponding spread code generation circuits 2101 to 2116 are inputted, respectively. Then, each of the switch circuits 2201 to 2216 selectively connects one of the four transmission conductors 11Y which configure a corresponding one of the transmission blocks $TB_1$ to $TB_{16}$ to a corresponding one of the spread code generation circuits 2101 to 2116 at the preceding stage and supplies a spread code.

The switch circuit 2201 corresponds to the transmission block $TB_1$ and successively switches the transmission conductor, to which the spread code $C_1$ inputted to the switch circuit 2201 is to be supplied, one by one among the four transmission conductors $11Y_1, 11Y_2, 11Y_3$ and $11Y_4$ of the transmission block $TB_1$. Meanwhile, the switch circuit 2202 corresponds to the transmission block $TB_2$ and successively switches the transmission conductor, to which the spread code $C_2$ inputted to the switch circuit 2202 is to be supplied, one by one among the four transmission conductors $11Y_5$, $11Y_6, 11Y_7$ and $11Y_8$ of the transmission block $TB_2$. This similarly applies also to the other switch circuits 2203 to 2216, and the transmission conductor to which an inputted spread code is to be supplied is successively switched one by one among the four transmission conductors of the corresponding one of the transmission blocks $TB_3$ to $TB_{16}$.

To the switch circuits 2201 to 2216, a switch control signal SW2 is supplied from the control circuit 40. The control circuit 40 generates this switch control signal SW2 from the clock signal CLK. The control circuit 40 generates the switch control signal SW2 as a pulse signal whose one cycle corresponds to 16 cycles of the clock signal CLK which correspond to one cycle of the spread codes.

The switch circuits 2201 to 2216 switches a transmission conductor 11Y to which a spread code is to be supplied for each 16 cycles of the clock signal CLK in accordance with the switch control signal SW2. In particular, the switch circuits 2201 to 2216 switch, in accordance with the switch control signal SW2, from the transmission conductor 11Y to a next transmission conductor 11Y after they complete supply for one cycle of the spread codes formed from 16 chips to a transmission conductor 11Y which is currently selected.

An example of changeover (switching) operation of the switch circuits 2201 to 2216 at this time is illustrated in FIG. 13. In the example of FIG. 13, the switch circuits 2201 to 2216 first select the 16 transmission conductors $11Y_4, 11Y_8, ..., 11Y_{60}$ and $11Y_{64}$. Then, the spread codes $C_1, C_2, ..., C_{15}, C_{16}$ are supplied to the transmission conductors $11Y_4$, $11Y_8, ..., 11Y_{60}$ and $11Y_{64}$ selected by the switch circuits 2201 to 2216, respectively.

If a period for 16 cycles of the clock signal CLK elapses in this state, then the spread codes $C_1, C_2, ..., C_{15}, C_{16}$ for one cycle are fully supplied to the 16 transmission conductors $11Y_4, 11Y_8, ..., 11Y_{60}$ and $11Y_{64}$, respectively. Then, at this point of time, the switch circuits 2201 to 2216 switch the transmission conductors 11Y to be selected to the next transmission conductors, which have, in the present example, smaller index numbers, in accordance with the switch control signal SW2.

Then, after the transmission conductors $11Y_1, 11Y_5, ..., 11Y_{57}$ and $11Y_{61}$ of the lowest index numbers in the transmission blocks $TB_1$ to $TB_{16}$ are selected by the switch circuits 2201 to 2216 and supply of the spread codes $C_1$ to $C_{16}$ is carried out, the transmission conductors $11Y_4, 11Y_8, ..., 11Y_{60}$ and $11Y_{64}$ having the highest index numbers in the individual transmission blocks are selected again by the switch circuits 2201 to 2216, respectively. As the changeover operation described above is repeated in the individual transmission blocks, the spread codes $C_1$ to $C_{16}$ are supplied to all transmission conductors 11Y.

Since, in the transmission section 200, changeover of the transmission conductors 11Y is carried out in a plurality of transmission blocks in synchronism in such a manner as described above, a plurality of spread codes different among different transmission blocks are supplied at the same time to a plurality of transmission conductors 11Y. Accordingly, the time required to supply the transmission signals to all of the transmission conductors of the sensor section 100 can be reduced to one to the number of transmission blocks where a transmission signal is supplied to each of the plural transmission conductors sequentially. Therefore, the time required to supply the transmission signals to all transmission conductors of the sensor section 100 can be reduced.

Further, in comparison with the case in which transmission signals different from each other are prepared for all transmission conductors 11Y, although the time required to supply the transmission signals to all transmission conductors of the sensor section 100 becomes long, since a plurality of spread codes to be supplied as transmission signals can be reduced to one to the number of transmission blocks, the circuit scale can be reduced as much and can be made a comparatively small scale.

It is to be noted that the procedure of the changeover operation of the switch circuits 2201 to 2216 is not limited to the example described above. For example, although changeover of the transmission conductors 11Y in each transmission block is carried out for each one cycle of the spread codes, it may be carried out otherwise for each plural number of cycles of the spread codes. Further, the spread codes may be generated such that one chip thereof is generated for each number of cycles of the clock signal CLK equal to the number of transmission conductors in each transmission block whereas changeover of the transmission conductor 11Y in each transmission block is carried out for each one cycle of the clock signal CLK.

[Example of the Configuration of the Reception Section 300: FIGS. 14 to 22]

The reception section 300 carries out the signal processing for amplifying reception signals (currents) obtained from the reception conductors 12X and detecting the current variation described hereinabove to carry out detection of a pointer.

Here, if the signal processing is carried out successively for the reception signals obtained from the reception conductors 12X, then a long time is required before completion of the signal processing. Therefore, it is possible to provide a processing circuit for exclusive use in carrying out the signal processing for each of the reception conductors 12X such that the signal processing is carried out simultaneously for all reception signals to implement high speed processing. However, this is not realistic in view of the large circuit scale and the high cost.

Therefore, in the present embodiment, the reception section 300 is configured such that a processing circuit is used commonly for a plurality of reception conductors 12X to reduce the circuit scale. In particular, the plural reception conductors 12X of the reception conductor group 12 are divided into a plurality of groups each including an equal plural number of reception conductors 12X, and an amplifier, an I/V conversion circuit and so forth are provided for each of the groups. In the following description, a group including a plurality of reception conductors 12X is referred to as a detection block.

Figure 14:
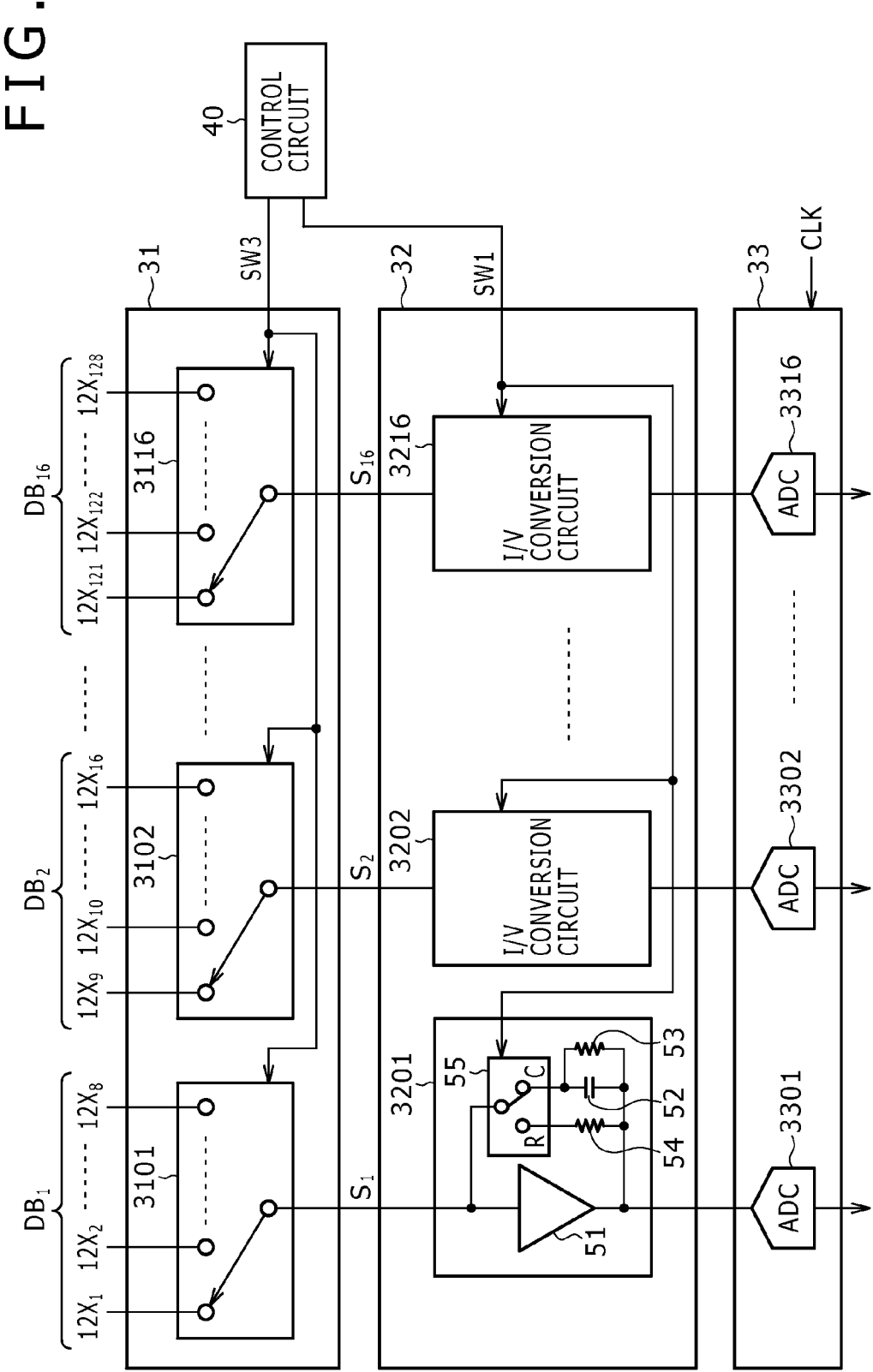
FIG. 14 is a view showing part of a reception section of the pointer detection apparatus of the first embodiment.

In the present example, the plural reception conductors $12X_1$ to $12X_{128}$ which form the reception conductor group 12 are divided into 16 detection blocks $DB_1$ to $DB_{16}$ each including eight reception conductors as shown in FIG. 14. Then, from among the eight reception conductors 12X included in each of the 16 detection blocks $DB_1$ to $DB_{16}$, one reception conductor 12X is successively and switchably selected to execute the processing of the reception section 300. By this configuration, the processing for all reception conductors 12X can be carried out in a period of processing time equal to one to the number of detection blocks in comparison with the case wherein the reception signals from all of the reception conductors 12X are successively processed one by one. Consequently, a higher processing speed can be achieved.

As shown in FIG. 1, the reception section 300 is configured including a reception conductor selection circuit 31, an amplification circuit 32, an A/D (Analog to Digital) conversion circuit 33, and a position detection circuit 34. The position detection circuit 34 forms detection means for obtaining a pointer detection output based on an output of the A/D conversion circuit 33. In the present embodiment, since a plurality of spread codes having different codes from each other are used for the transmission signals, the position detection circuit 34 includes a calculation processing circuit 35 for detecting a plurality of spread codes having different codes from each other and an outputting circuit 36 for outputting a pointer detection output.

The calculation processing circuit 35 will be hereinafter described in detail. The outputting circuit 36 obtains an output corresponding to the pointing input position, a hovering state, or a pressing force of the pointer based on a correlation value output detected by the calculation processing circuit 35, and signals the output as an output signal of the pointer detection apparatus 1.

Figure 15:
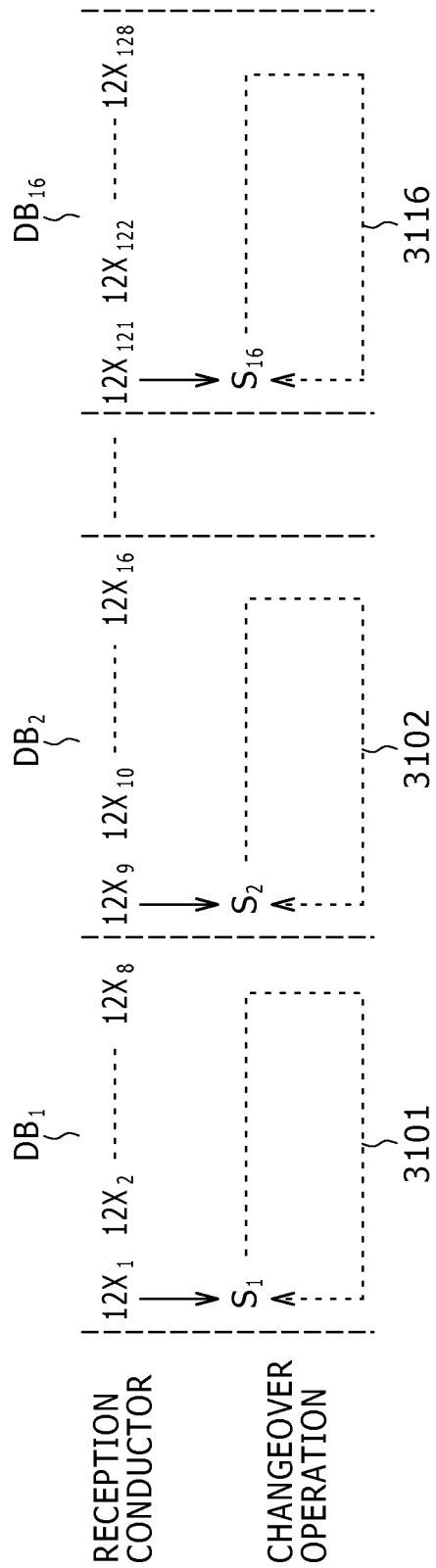
FIG. 15 is a view illustrating operation of part of the reception section of FIG. 14.

[Example of the Configuration of the Reception Conductor Selection Circuit 31: FIGS. 14 and 15]

In the present embodiment, the plural reception conductors $12X_1$ to $12X_{128}$ which form the reception conductor group 12 are divided into 16 detection blocks $DB_1$ to $DB_{16}$ each including eight reception conductors as described hereinabove.

Further, as shown in FIG. 14, the reception conductor selection circuit 31 is configured including 16 switch circuits 3101 to 3116 corresponding to the detection blocks $DB_1$ to $DB_{16}$. Each of the switch circuits 3101 to 3116 is an 8-input 1-output switch circuit. To the switch circuits 3101 to 3116, reception signals from the eight reception conductors 12X of corresponding ones of the detection blocks $DB_1$ to $DB_{16}$ are inputted, respectively. Then, each of the switch circuits 3101 to 3116 selects and connects one of the eight reception conductors 12X of a corresponding one of the detection blocks $DB_1$ to $DB_{16}$ to a corresponding one of I/V conversion circuits 3201 to 3216 of the amplification circuit 32 at the succeeding stage to supply the corresponding reception signal.

In particular, the switch circuit 3101 corresponds to the detection block $DB_1$ and changes over (switches between) the eight reception conductors $12X_1, 12X_2, \ldots, 12X_8$ of the detection block $DB_1$ successively one by one. Meanwhile, the switch circuit 3102 corresponds to the detection block $DB_2$ and changes over the eight reception conductors $12X_9, 12X_{10}, \ldots, 12X_{16}$ of the detection block $DB_2$ successively one by one. This similarly applies also to the other switch circuits 3103 to 3116, and the eight reception conductors in corresponding ones of the detection blocks $DB_3$ to $DB_{16}$ are changed over (switched) successively one by one.

To the switch circuits 3101 to 3116, a switch control signal SW3 is supplied from the control circuit 40. The control circuit 40 generates the switch control signal SW3 from the clock signal CLK. The control circuit 40 generates the switch control signal SW3 as a pulse signal having one cycle equal to 16×4 cycles of the clock signal CLK (equal to four cycles of the spread codes).

The switch circuits 3101 to 3116 change the reception conductor 12X to be selected for every 16×4 cycles of the clock signal CLK in accordance with the switch control signal SW3. In particular, each of the switch circuits 3101 to 3116 changes the reception conductor of a corresponding one of the detection blocks $DB_1$ to $DB_{16}$ to the next reception conductor 12X every time the supply of the 16 types of spread codes to all of the transmission conductors 11Y is completed.

Then, output signals $S_1$ to $S_{16}$ from the switch circuits 3101 to 3116 are supplied to the amplification circuit 32.

An example of changeover (switching) operation of the switch circuits 3101 to 3116 at this time is illustrated in FIG. 15. In the example of FIG. 15, the switch circuits 3101, 3102, ..., 3116 first select the 16 reception conductors $12X_1, 12X_9, \ldots, 12X_{121}$ and output reception signals obtained from the reception conductors $12X_1, 12X_9, \ldots, 12X_{121}$ as output signals $S_1, S, \ldots, S_{16}$ to the amplification circuit 32.

If a time period corresponding to 16×4 cycles of the clock signal CLK elapses in this state, then the supply of the spread codes $C_1, C_2, \ldots, C_{15}, C_{16}$ for one cycle to all of the transmission conductors 11Y is completed. Then at this point of time, the switch circuits 3101 to 3116 are switched in accordance with the switch control signal SW3 into a state in which those adjacent reception conductors individually having a greater index number are selected as the reception conductors 11X to be selected.

Then, after the reception conductors $12X_8$, $12X_{16}$, ..., $12X_{120}$ and $12X_{128}$ having the highest index numbers in the detection blocks $DB_1$ to $DB_{16}$ are selected by the switch circuits 2201 to 2216 and supply of the spread codes $C_1$ to $C_{16}$ is carried out, the reception conductors $12X_1$, $12X_9$, ..., $12X_{121}$ having the lowest index numbers in the detection blocks are again selected by the switch circuits 3101 to 3116, respectively. As the changeover operation described above is repeated in the detection blocks, reception signals from all of the reception conductors 12X can be obtained.

Reception signals (current signals) each from one of the reception conductors 12X in the detection blocks $DB_1$ to $DB_{16}$ obtained from the switch circuits 3101 to 3116 of the reception conductor selection circuit 31 in such a manner as described above are outputted as the output signals $S_1$, $S_2$, ..., $S_{16}$.

It is to be noted that, in the switch circuits 3101 to 3116, those reception conductors 12X which are not selected are preferably connected to an arbitrary reference potential or the ground. By connecting the reception conductors 12X which are not selected to an arbitrary reference potential or the ground in the switch circuits 3101 to 3116 in this manner, noise can be led to the reception conductors 12X which are not selected, and consequently, the noise resisting property can be improved. Also it is possible to reduce wraparound of a transmission signal. Furthermore, the procedure of the changeover operation of the reception conductors 12X is not limited to the example described above. Modifications are hereinafter described in detail.

[Example of the Configuration of the Amplification Circuit 32: FIG. 14]

The amplification circuit 32 includes 16 I/V conversion circuits 3201, 3202, ..., 3216 corresponding to the detection blocks $DB_1$ to $DB_{16}$, respectively.

In the present embodiment, an example is shown wherein each of the I/V conversion circuits 3201 to 3216 is configured such that the detecting capacitor 52 and the detecting resistor 54 are switched therebetween by the switch circuit 55 depending upon the capacitive touch detection mode and the resistive touch detection mode, as illustrated in FIG. 9. It is to be noted that, while, in FIG. 14, an internal circuit only of the I/V conversion circuit 3201 is shown, internal circuits of the other I/V conversion circuits 3202 to 3216 are the same as the internal circuit of the I/V conversion circuit 3201, and therefore, illustration of them is omitted.

The output signals $S_1$, $S_2$, ..., $S_{16}$ from the reception conductor selection circuit 31 are supplied to the I/V conversion circuits 3201, 3202, ..., 3216 for corresponding blocks of the amplification circuit 32, respectively.

The I/V conversion circuits 3201 to 3216 convert the output signals (current signals) $S_1$, $S_2$, ..., $S_{16}$ of the detection blocks $DB_1$ to $DB_{16}$ from the switch circuits 3101 to 3116 of the reception conductor selection circuit 31 into voltage signals and amplify and output the voltage signals. The output signals $S_1$, $S_2$, ..., $S_{16}$ converted into the voltage signals by the I/V conversion circuits 3201 to 3216 are inputted to the A/D conversion circuit 33.

The pointer detection apparatus 1 of the present embodiment has the capacitive touch detection mode and the resistive touch detection mode, and the control circuit 40 carries out mode management and mode switching control.

As hereinafter described, the control circuit 40 determines based on information from the reception section 300 which one of the capacitive touch detection mode and the resistive mode detection mode should be used as the detection mode to detect a pointer, and generates a mode switching control signal SW1 in response to a result of the determination. Then, the control circuit 40 supplies the generated mode switching control signal SW1 to the switch circuits 55 of the I/V conversion circuits 3201 to 3216 to carry out mode switching.

Figure 16:
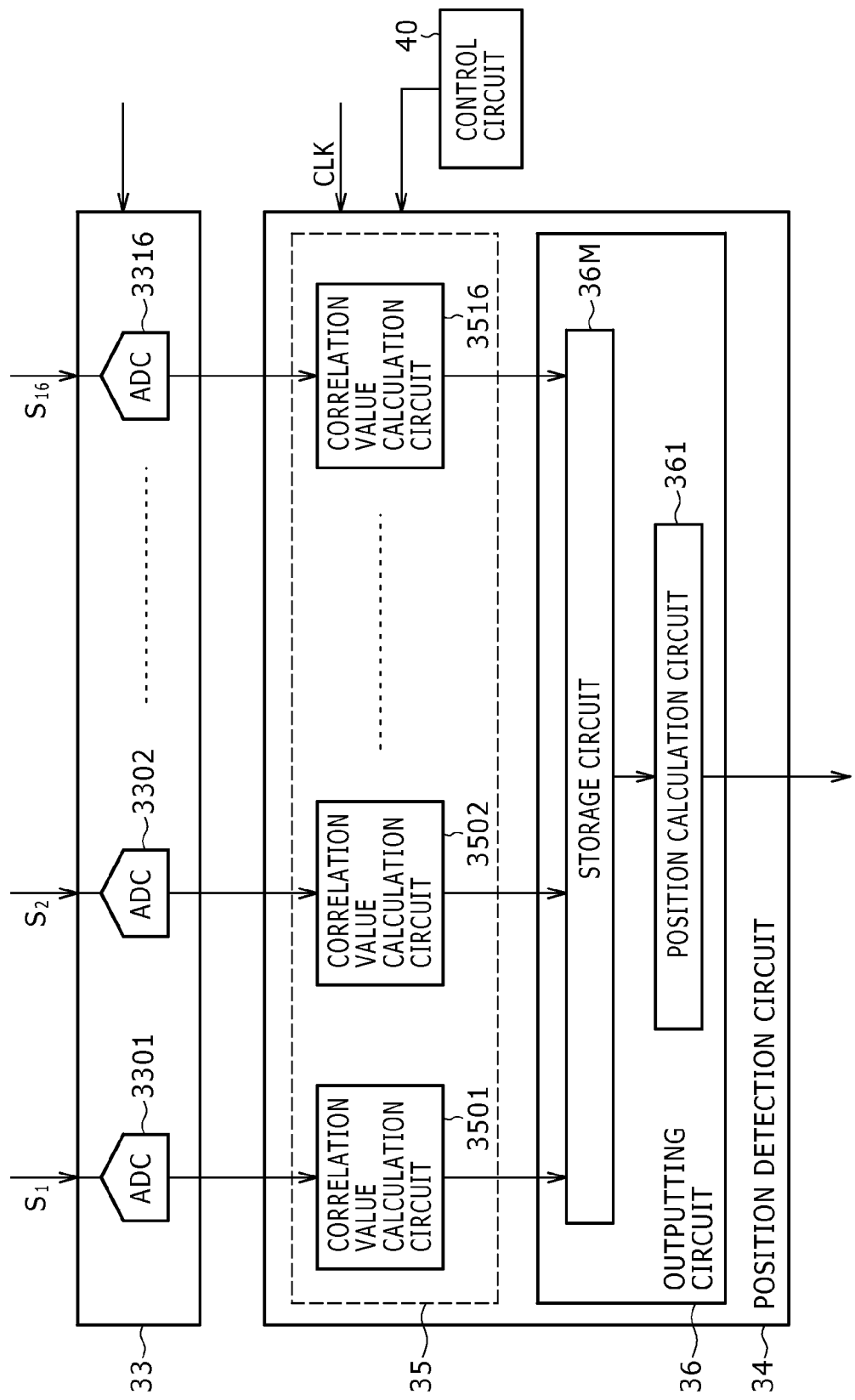
FIG. 16 is a view showing the remaining part of the reception section of the pointer detection apparatus of the first embodiment.

[Example of the Configuration of the A/D Conversion Circuit 33: FIG. 16]

The A/D conversion circuit 33 includes a number of A/D converters equal to the number of detection blocks, that is, 16 A/D converters 3301 to 3316. The output signals $S_1$, $S_2$, ..., $S_{16}$ converted into voltage signals by the I/V conversion circuits 3201 to 3216 are supplied to the A/D converters 3301, 3302, ..., 3316, by which they are sampled at a timing of the clock signal CLK. Then, the A/D converters 3301, 3302, ..., 3316 convert the respective sample values into digital sample data of n bits (n is an integer equal to or greater than 2), for example, of 8 bits, and outputs the digital sample data.

The digital sample data of the output signals $S_1$, $S_2$, ..., $S_{16}$ outputted from the A/D conversion circuit 33 are supplied to the calculation processing circuit 35 of the position detection circuit 34. Accordingly, the digital sample data are signals corresponding to chips of the spread codes supplied to the transmission conductors 11Y of the sensor section 100. However, since a current obtained by simultaneous and synchronized supply of the 16 kinds of spread codes to the 16 transmission conductors 11Y flows in an multiplexed state in each of the reception conductors 12X from which the output signals $S_1$, $S_2$, ..., $S_{16}$ are obtained, the digital sample data of the output signals $S_1$, $S_2$, ..., $S_{16}$ corresponding to the chips of the spread codes are synthesized (added) values of the chips of the 16 kinds of spread codes.

It is to be noted that the A/D conversion circuit 33 may not necessarily be formed from the 16 A/D converters 3301 to 3316 but be formed from a single A/D converter or a plural number of A/D converters other than 16.

[Example of the Configuration of the Position Detection Circuit 34: FIG. 16]

The position detection circuit 34 forms detection means for carrying out pointer detection from digital sample data supplied from the A/D conversion circuit 33. Since a plurality of spread codes having codes different from each other are used as transmission signals, the position detection circuit 34 includes a calculation processing circuit 35 for detecting the plural spread codes of the different codes, and an outputting circuit 36 for outputting a result of the pointer detection.

The calculation processing circuit 35 is hereinafter described in detail. The outputting circuit 36 obtains an output corresponding to the pointing input position, a hovering state, or a pressing force of a pointer based on correlation values detected by correlation value calculation circuits 3501 to 3516 of the calculation processing circuit 35 and signals the obtained output as an output signal of the pointer detection apparatus 1.

The calculation processing circuit 35 includes a number of correlation value calculation circuits equal to the number of detection blocks, that is, 16 correlation value calculation circuits 3501, 3502, ..., 3516. The digital sample data of the output signals $S_1$, $S_2$, ..., $S_{16}$ are supplied to the correlation value calculation circuits 3501, 3502, ..., 3516, respectively.

Although details are hereinafter described, the correlation value calculation circuits 3501, 3502, ..., 3516 include shift registers for retaining the digital sample data of the output signals $S_1$, $S_2$, ..., $S_{16}$ corresponding to one cycle of the spread codes. Further, the digital sample data of the output signals $S_1$, $S_2$, ..., $S_{16}$ are retained for one cycle of the spread codes into the shift registers of the correlation value calculation circuits 3501, 3502, ..., 3516 in synchronism with the clock signal CLK.

Then, the correlation value calculation circuits 3501, 3502, ..., 3516 carry out correlation calculation between the digital sample data of the output signals $S_1, S_2, \ldots, S_{16}$ retained in the shift registers and a code for correlation value calculation and outputs correlation values of them.

Then, the correlation values calculated by the correlation value calculation circuits 3501, 3502, ..., 3516 are supplied to the outputting circuit 36.

This outputting circuit 36 includes a storage circuit 36M and a position calculation circuit 361. The outputting circuit 36 writes and temporarily retains the correlation values calculated by the correlation value calculation circuits 3501, 3502, ..., 3516 in the storage circuit 36M. Then, the correlation values stored in the storage circuit 36M are supplied to the position calculation circuit 361. The position calculation circuit 361 generates output data of a predetermined output format from the correlation value data of the storage circuit 36M and outputs the generated output data. The processing and the output data of the outputting circuit 36 are hereinafter described.

<Example of the Position Calculation Circuit 361>

The position calculation circuit 361 compares all of the correlation values stored in the storage circuit 36M and a reference value ref with each other and detects a cross point at which a correlation value different from the reference value ref is obtained.

In particular, if the position calculation circuit 361 detects a cross point at which a correlation value different from the reference value ref is obtained, then it detects a corresponding coordinate position of the cross point from the address position of the storage circuit 36M at which the correlation value is stored. By comparing the correlation values and the reference value ref with each other in this manner, the position calculation circuit 361 can carry out pointer detection independently for each cross point. Therefore, also when pointing input is carried out by a plurality of pointers at the same time on the pointing input surface 100S, the plural pointers can be detected simultaneously. For example, where the pointing input surface 100S is touched simultaneously by 10 fingers, the position calculation circuit 361 can detect all inputting pointed positions by the 10 fingers.

Further, in such a case that, for example, a finger is brought into contact with the pointing input surface in a horizontally lying state so as to cover a plurality of cross points, a correlation value indicative of detection of a pointer is obtained at each of the plural cross points. Accordingly, the position calculation circuit 361 can obtain a pointer detection result corresponding to the pointing input state of the finger.

It is to be noted that, where a correlation value different from the reference value ref is obtained from among a plurality of cross points and the cross points are positioned adjacent to each other, the area occupied by the plural cross points may be calculated as a pointer detection output.

Further, the position calculation circuit 361 decides, depending upon whether a correlation value which exceeds the reference value ref exists among the correlation values stored in the storage circuit 36M, whether the correlation values stored in the storage circuit 36M indicate a detection result of a pointer by the capacitive touch detection mode or a detection result of a pointer by the resistive touch detection mode, and outputs a result of the detection, for example, as a flag. Accordingly, if the outputted flag indicates the capacitive touch detection mode, then this represents that a pointer is in a state in which it is spaced from or is in contact with the pointing input surface 100S. On the other hand, if the outputted flag indicates the resistive touch detection mode, then this represents that a pointer is in a state in which it is pressing the pointing input surface 100S.

Then, when the correlation values stored in the storage circuit 36M are the reference value ref or lower, that is, when it is decided that the correlation values stored in the storage circuit 36M indicate a detection result of a pointer by the capacitive touch detection mode, the position calculation circuit 361 in the present embodiment additionally carries out detection of a hovering state. On the other hand, where the correlation values stored in the storage circuit 36M are higher than the reference value, that is, where the correlation values stored in the storage circuit 36M indicate a detection result of a pointer in the resistive touch detection mode, then the position calculation circuit 361 additionally carries out detection of a pressing force by the pointer.

Figure 17:
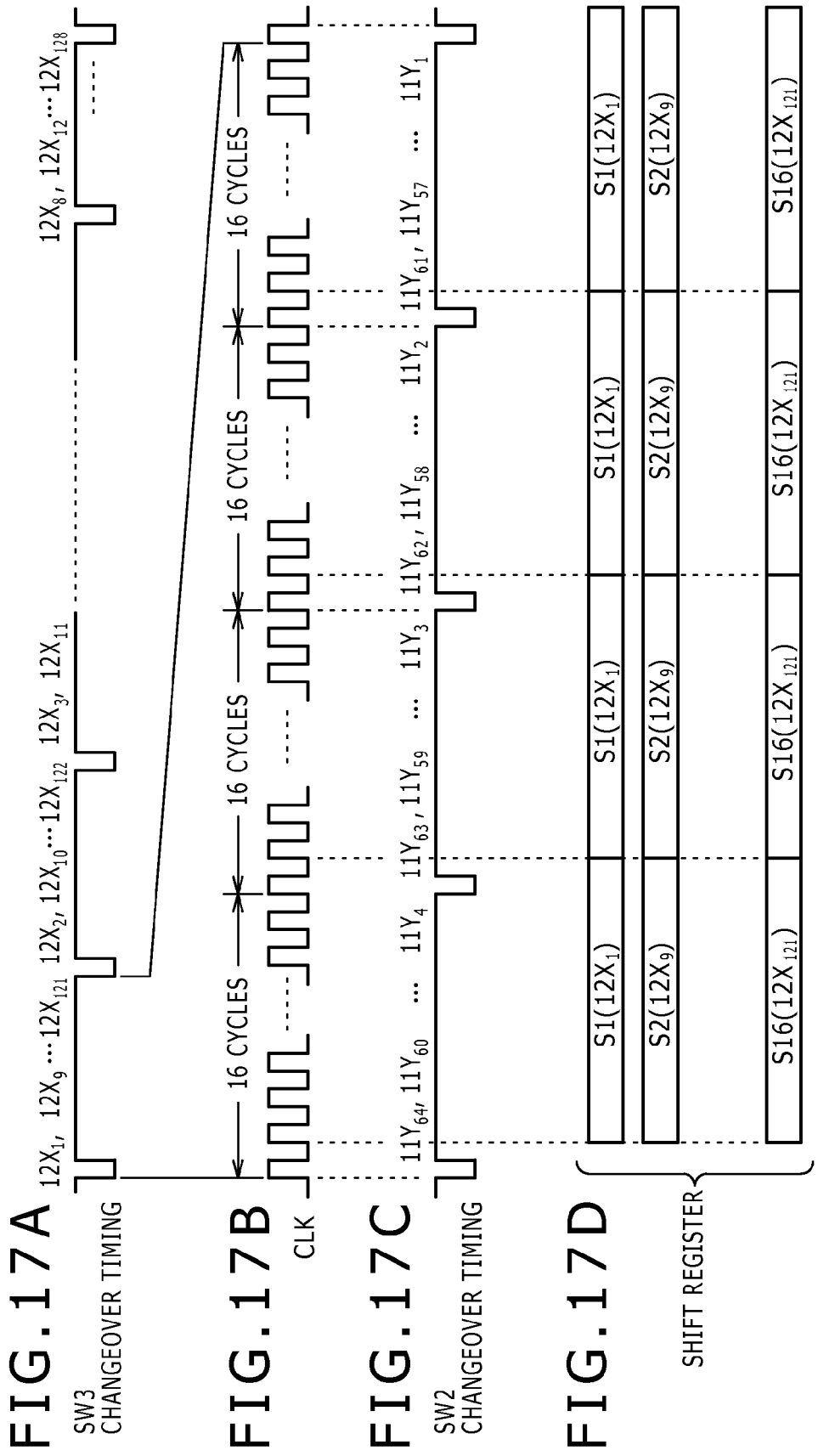
FIGS. 17A-17D are timing charts illustrating operation of the transmission section and the reception section of the pointer detection apparatus of the first embodiment.

[Description of an Example of the Switching Timing of the Transmission Conductors and the Reception Conductors: FIG. 17]

Now, a switching timing of the transmission conductors 11Y and a switching timing of the reception conductors 12X are described with reference to FIG. 17.

As described hereinabove, the 16 kinds of spread codes $C_1$ to $C_{16}$ individually formed from 16 chips are generated in synchronism with each other for a period of 16 cycles of the clock signal CLK (refer to FIG. 17(B)). The switch circuits 2201 to 2216 of the transmission conductor selection circuit 22 are switched every 16 cycles of the clock signal CLK in accordance with the switch control signal SW2 (refer to FIG. 17(C)) from the control circuit 40.

The 16 spread codes $C_1$ to $C_{16}$ are supplied simultaneously in synchronism with each other to one transmission conductor each of the 16 transmission blocks $TB_1$ to $TB_{16}$ in response to the switching of the switch circuits 2201 to 2216. Then, the 16 spread codes $C_1$ to $C_{16}$ are supplied to all of the four transmission conductors 11Y in each of the 16 transmission blocks $TB_1$ to $TB_{16}$ within 16×4 cycles of the clock signal CLK. In other words, the 16 kinds of spread codes $C_1$ to $C_{16}$ are supplied to all transmission conductors 11Y of the sensor section 100 in 16×4 cycles of the clock signal CLK.

In particular, the 16 spread codes $C_1$ to $C_{16}$ are supplied to all of the transmission conductors 11Y within a period of 16×4 cycles of the clock signal CLK within which an output signal is obtained from one reception conductor each of the 16 detection blocks $DB_1$ to $DB_{16}$. Then, since the reception conductor selected in each of the 16 detection blocks $DB_1$ to $DB_{16}$ is changed (switched) for every 16×4 cycles of the clock signal CLK, the spread codes $C_1$ to $C_{16}$ are supplied to all of the transmission conductors 11Y of the sensor section 100. Then, the operation described above is repeated.

On the other hand, in the reception conductor selection circuit 31, the switch circuits 3201 to 3216 are changed (switched) every 16×4 cycles of the clock signal CLK in accordance with the switch control signal SW3 (refer to FIG. 17(A)) from the control circuit 40. As shown in FIG. 17(A), based on the switching of the switch circuits 3201 to 3216, within a period of 16×4 cycles of the clock signal CLK, a reception signal is obtained from one reception conductor each of each of the 16 detection blocks $DB_1$ to $DB_{16}$.

Within a period corresponding to 16 cycles of the clock signal CLK with which the spread codes $C_1$ to $C_{16}$ are supplied simultaneously in synchronism with each other, that is, within a period for one cycle of the spread codes, the 16 output signals $S_1$ to $S_{16}$ from the reception conductors selected by the reception conductor selection circuit 31 are sampled at a timing of the clock signal CLK by the A/D converters 3301 to 3316, respectively, and the sampled values are converted into digital sample data. Then, the digital sample data are written in parallel to each other in the shift registers of the correlation value calculation circuits 3501 to 3516 (refer to FIG. 17(D)).

According to such selection switching control of the transmission conductors 11Y and the reception conductors 12X as described above, the number of times of selection switching control of the reception conductors 12X can be reduced, and noise upon switching which may possibly be superposed on the output signals from the reception conductors 12X can be reduced.

Figure 18:
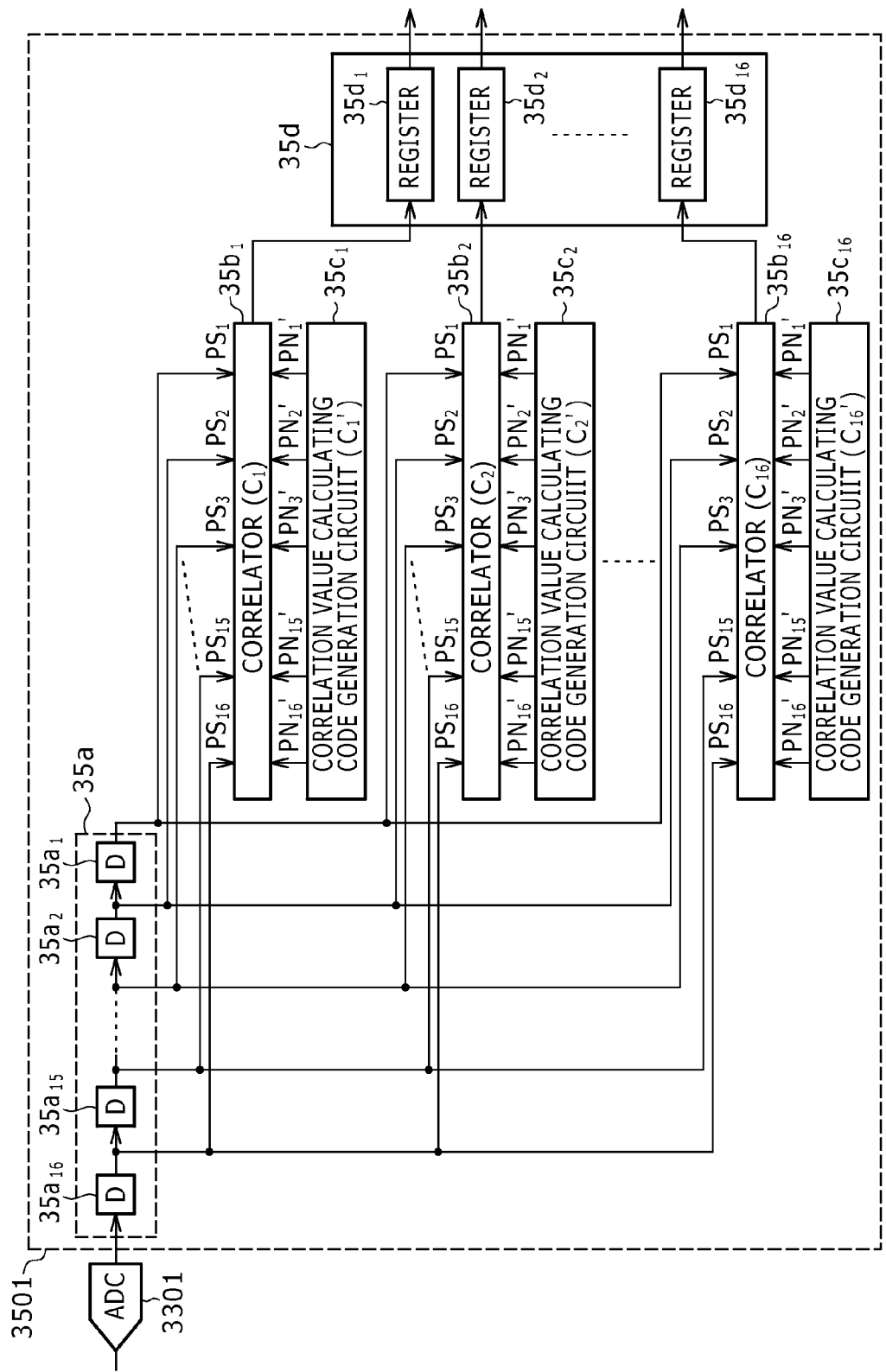
FIG. 18 is a block diagram showing an example of a detailed configuration of part of the reception section of FIG. 16.

[Example of the Configuration of the Correlation Value Calculation Circuits 3501 to 3516: FIGS. 18 and 19]

Now, an example of the configuration of the correlation value calculation circuits 3501 to 3516 is described. Since the 16 correlation value calculation circuits 3501 to 3516 have the same configuration, an example of the configuration of the correlation value calculation circuit 3501 which carries out a correlation value calculation process of the output signal $S_1$ is described with reference to FIG. 18.

The correlation value calculation circuit 3501 is a circuit for calculating a correlation value between the digital sample data of the output signal $S_1$ outputted from the A/D converter 3301 and the 16 spread codes $C_1$ to $C_{16}$ under the control of the control circuit 40. The correlation value calculation circuit 3501 is connected to the A/D conversion circuit 33, the control circuit 40, and the outputting circuit 36, as shown in FIG. 1.

The correlation value calculation circuit 3501 includes a shift register 35a which forms a buffer circuit for delaying a signal, a number (16) of correlators $35b_1, 35b_2, 35b_3, \ldots, 35b_{16}$ equal to the number of correlation value calculating codes $C_k$ (k=1, 2, ..., 16), correlation value calculating code generation circuits $35c_1, 35c_2, 35c_3, \ldots, 35c_{15}, 35c_{16}$ for supplying correlation value calculating codes $C_k'$ (k=1, 2, ..., 16) to the correlators $35b_1$ to $35b_{16}$, respectively, and a correlation value storage circuit 35d.

The shift register 35a is a circuit for temporarily retaining the digital sample data outputted from the A/D converter 3301 and supplying the retained data to the correlators $35b_1$ to $35b_{16}$ simultaneously.

The shift register 35a is configured from a number (16) of D-type flip-flop circuits $35a_1, 35a_2, 35a_3, \ldots, 35a_{15}, 35a_{16}$ equal to the code length (chip number) of the spread codes $C_k$. The D-type flip-flop circuits $35a_{16}, 35a_{15}, 35a_{14}, \ldots, 35a_3, 35a_2, 35a_1$ form data latch circuits at different stages of the shift register 35a and are connected in series in this order from the A/D conversion circuit 33 side. It is to be noted that, while each of the D-type flip-flop circuits $35a_{16}, 35a_{15}, \ldots, 35a_1$ is represented by a single D-type flip-flop circuit for simplified illustration in FIG. 8, actually it is formed from a number of D-type flip-flops equal to the number of bits of the digital sample data from the A/D converter 3301.

Output terminals of each of the D-type flip-flop circuits $35a_{16}$ to $35a_1$ are connected to a D-type flip-flop circuit at an adjacent next stage (for example, an output terminal of the D-type flip-flop circuit $35a_{16}$ is connected to the D-type flip-flop circuit $35a_{15}$) and also to the correlators $35b_1$ to $35b_{16}$. In other words, the output signals from the D-type flip-flop circuits $35a_1$ to $35a_{16}$ are inputted to all of the correlators $35b_1$ to $35b_{16}$.

Outputs of the D-type flip-flop circuits $35a_1$ to $35a_{16}$ which form the individual stages of the shift register 35a are digital sample data of the output signal $S_1$ corresponding to the data of the chips of a spread code as described hereinabove. In the following description, output signals for 16 chips from the 16 D-type flip-flop circuits $35a_1$ to $35a_{16}$ are referred to as output signals $PS_1, PS_2, PS_3, \ldots, PS_{15}, PS_{16}$, respectively.

Each of the correlators $35b_1$ to $35b_{16}$ is a circuit for calculating a correlation value between the output signal $S_1$ and the spread codes $C_k$. In particular, the correlators $35b_1$ to $35b_{16}$ multiply the digital sample data $PS_1$ to $PS_{16}$ of the output signal $S_1$ outputted from the D-type flip-flop circuits $35a_1$ to $35a_{16}$ which form the shift register 35a by the chips of the correlation value calculating codes $C_1'$ to $C_{16}'$ inputted from the correlation value calculating code generation circuits $35c_1$ to $35c_{16}$, respectively, to thereby calculate a correlation value between the output signal $S_1$ and the spread codes $C_k$.

The correlation value calculating code generation circuits $35c_1$ to $35c_{16}$ are circuits for supplying the correlation value calculating codes $C_1'$ to $C_{16}'$ for carrying out correlation calculation to the correlators $35b_1$ to $35b_{16}$, respectively. The correlation value calculating code generation circuits $35c_1$ to $35c_{16}$ are connected to corresponding ones of the correlators $35b_1$ to $35b_{16}$.

The correlation value calculating codes $C_1'$ to $C_{16}'$ are codes corresponding to the spread codes $C_1$ to $C_{16}$ which are transmission signals, and where a special code string, for example, an Hadamard code, is used, the spread codes $C_1$ to $C_{16}$ from the transmission signal supplying circuit 21 can be utilized as the correlation value calculating codes $C_1'$ to $C_{16}'$. In this instance, the correlation value calculating code generation circuits $35c_1$ to $35c_{16}$ are configured as registers for receiving the spread codes $C_1$ to $C_{16}$ from the spread code generation circuits 2101 to 2116 of the transmission signal supplying circuit 21. Then, the spread codes $C_1$ to $C_{16}$ outputted from the spread code generation circuits 2101 to 2116 are written as the correlation value calculating codes $C_1'$ to $C_{16}'$ into the correlation value calculating code generation circuits $35c_1$ to $35c_{16}$ of the register configuration, respectively, at a timing of the clock signal CLK.

It is to be noted that it is otherwise possible to configure, similarly to the spread code generation circuits 2101 to 2116, the correlation value calculating code generation circuits $35c_1$ to $35c_{16}$ from a ROM or the like so as to generate the correlation value calculating codes $C_1'$ to $C_{16}'$ corresponding to the spread codes $C_1$ to $C_{16}$.

In the following description, data of 16 chips of the correlation value calculating codes $C_1'$ to $C_{16}'$ are referred to as generation codes $PN_1', PN_2', PN_3', \ldots, PN_{15}', PN_{16}'$, respectively.

The correlators $35b_1$ to $35b_{16}$ start correlation calculation at a timing at which the digital sample data $PS_1$ to $PS_{16}$ for one cycle of the spread codes are written into the shift register 35a (refer to the reception load signal $Sr_{load}$ hereinafter described).

Then, the correlator $35b_1$ multiplies the same chips of the output signals $PS_1$ to $PS_{16}$ from the D-type flip-flop circuits $35a_1$ to $35a_{16}$ and the generation codes $PN_1'$ to $PN_{16}'$ of the correlation value calculating code $C_1'$, respectively, and sums the resulting values of the multiplication to calculate a correlation value. Similarly, the correlator $35b_2$ multiplies the same chips of the output signals $PS_1$ to $PS_{16}$ from the D-type flip-flop circuits $35a_1$ to $35a_{16}$ and the generation codes $PN_1'$ to $PN_{16}'$ of the correlation value calculating code $C_2'$, respectively, and sums the resulting values of the multiplication to calculate a correlation value. Similarly, the 16 correlators $35b_3$ to $35b_{16}$ multiply the same chips of the digital sample data $PS_1$ to $PS_{16}$ of the output signal $S_1$ and the generation codes $PN_1'$ to $PN_{16}'$ of the correlation value calculating codes $C_{13}'$ to $C_{16}'$, respectively, and sum the resulting values of the multiplication to calculate correlation values. Then, the correlators $35b_1$ to $35b_{16}$ output the calculated correlation values to the correlation value storage circuit $35d$.

Then, when the correlators $35b_1$ to $35b_{16}$ carry out correlation calculation between the digital sample data of the output signal $S_1$ retained in the shift register $35a$ and the correlation value calculating codes $C_1'$ to $C_{16}'$, and if a pointer 18 does not exist above or on the reception conductor from which the output signal $S_1$ is obtained, then the correlation values exhibit a fixed value, but if a pointer exists above or on the reception conductor from which the output signal $S_1$ is obtained, then a correlation value different from the correlation values of the fixed value is obtained.

The correlation value storage circuit $35d$ is a storage section for temporarily storing the correlation values obtained by the correlation calculation by the correlators $35b_1$ to $35b_{16}$. The correlation value storage circuit $35d$ is configured from a plural number of registers $35d_1$ to $35d_{16}$ equal to the number of the correlators $35b_1$ to $35b_{16}$.

As shown in FIG. 11, each of the transmission blocks $TB_1$ to $TB_{16}$ is configured from four transmission conductors 11Y, and one transmission conductor 11Y in each of the transmission blocks $TB_1$ to $TB_{16}$ is selected by a corresponding one of the switch circuits 2201 to 2216. Therefore, the transmission conductor group 11 including 64 transmission conductors 11Y is formed of four groups of 16 transmission conductors 11Y to which the spread codes $C_1$ to $C_{16}$ are supplied simultaneously in synchronism with each other.

Then, as described hereinabove with reference to FIG. 17, the four groups of the transmission conductors 11Y are changed (switched) every one cycle of the spread codes by the switch circuits 2201 to 2216. Accordingly, within a period of four cycles of the spread codes, supply of the spread codes $C_1$ to $C_{16}$ is carried out to all of the four groups of the transmission conductors 11Y.

Therefore, if correlation calculation is carried out for a reception signal from one reception conductor 12X, then four correlation values regarding the four groups of the transmission conductors 11Y, which are formed from 16 transmission conductors 11Y and are different in position from each other, are obtained. Further, corresponding to this, each of the registers $35d_1$ to $35d_{16}$ which form the correlation value storage circuit $35d$ includes four regions. Into the four regions, correlation values obtained from the 16 transmission conductors 11Y of the four groups whose positions are different from each other are stored.

The position calculation circuit 361 of the outputting circuit 36 carries out position detection and/or detection of a pressing force of a pointer, detection of a hovering state, and so forth, from the correlation values stored in the storage circuit 36M to generate output data, and outputs the generated output data.

Now, data processing by the correlation value calculation circuits 3501 to 3516 is described with reference to a timing charts of FIGS. 19A-19H.

Here, FIG. 19(A) illustrates a signal waveform of the clock signal CLK generated from the clock generation circuit 23. One cycle of this clock signal CLK corresponds to a one-chip length of the spread codes $C_k$.

FIG. 19(B) illustrates the start signal ST indicative of a start timing of search for all cross points of the sensor section 100. The control circuit 40 repetitively generates the start signal ST in synchronism with the clock signal CLK in a cycle corresponding to a period it takes to complete pointer detection regarding all cross points of the sensor section 100. In particular, since the time required for the search regarding all cross points corresponds to a value obtained by multiplying the period required to supply a spread code to one transmission conductor 11Y (corresponding to 16 cycles of the clock signal CLK), the number of transmission conductors which form the transmission blocks $TB_1$ to $TB_{16}$, and the number of reception conductors which form the detection blocks $DB_1$ to $DB_{16}$, the control circuit 40 repetitively generates the start signal ST for every 16×4×8 cycles of the clock signal CLK.

FIG. 19(C) illustrates a signal waveform of the transmission load signal $St_{load}$ supplied from the control circuit 40 to the transmission conductor selection circuit 22 and the reception conductor selection circuit 31. This transmission load signal $St_{load}$ is a pulse signal whose cycle is set to the code length of the spread codes $C_k$ (one cycle of the spread codes $C_k$=16 cycles of the clock signal CLK). The control circuit 40 generates the first transmission load signal $St_{load}$ one cycle of the clock signal CLK later than the start signal ST and then repetitively generates the signal $St_{load}$ for every one cycle of the spread codes $C_k$.

FIG. 19(D) illustrates a signal waveform of the reception load signal $Sr_{load}$ supplied from the control circuit 40 to the calculation processing circuit 35. This reception load signal $Sr_{load}$ is a pulse signal having a cycle set to the code length of the spread codes $C_k$ (one cycle of the spread codes $C_k$=16 cycles of the clock signal CLK). The control circuit 40 outputs this reception load signal $Sr_{load}$ one cycle of the clock signal CLK later than the transmission load signal $St_{load}$.

FIG. 19(E) is a timing chart of a transmission output of the spread codes $C_k$ transmitted from the transmission signal supplying circuit 21 to the transmission conductors 11Y.

FIG. 19(F) is a timing chart of output signals ($PS_1$, $PS_2$, ..., $PS_{16}$) for 16 chips set to the shift registers $35a$ of the correlation value calculation circuits 3501 to 3516. Meanwhile, FIG. 19(G) illustrates generation codes ($PN_1'$, $PN_2'$, ..., $PN_{16}'$) of the correlation value calculating codes $C_k'$ to be multiplied with the output signals set to the shift registers $35a$ and summed. Furthermore, FIG. 19(H) is a timing chart of correlation value outputs of the correlation value calculation circuits 3501 to 3516.

When the clock signal CLK (refer to FIG. 19(A)) outputted from the clock generation circuit 23 is inputted, the control circuit 40 generates a start signal ST (refer to FIG. 19(B)) in synchronism with the clock signal CLK and supplies the start signal ST to the outputting circuit 36 of the position detection circuit 34.

Then, the control circuit 40 generates a transmission load signal $St_{load}$ (refer to FIG. 19(C)) at a timing delayed by one cycle of the clock signal CLK from the start signal ST, generates a switch control signal SW2 for each cycle of the spread codes in synchronism with the generation timing of the transmission load signal $St_{load}$ and supplies the generated switch control signal SW2 to the transmission conductor selection circuit 22. Further, the control circuit 40 generates a switch control signal SW3 for each four cycles of the spread codes with reference to the generation timing of the start signal ST in synchronism with the generation timing of the transmission load signal $St_{load}$, and supplies the switch control signal SW3 to the reception conductor selection circuit 31.

Then, the control circuit 40 generates a reception load signal $Sr_{load}$ (refer to FIG. 19(D)) at a timing delayed by one cycle of the clock from the generation of the transmission load signal $St_{load}$ and supplies the reception load signal $Sr_{load}$ to the correlation value calculation circuits 3501 to 3516 of the calculation processing circuit 35 of the position detection circuit 34.

The correlation value calculation circuits 3501 to 3516 execute the correlation calculation based on the timing of the reception load signal $Sr_{load}$ and output correlation values to the outputting circuit 36.

The storage circuit 36M of the outputting circuit 36 stores the correlation values outputted from the correlation value calculation circuits 3501 to 3516 into predetermined addresses of the storage circuit 36M based on the timing of the clock signal CLK and the reception load signal $Sr_{load}$ from the control circuit 40. The predetermined addresses are addresses on the storage circuit 36M determined for the individual cross points.

The transmission conductor selection circuit 22 starts supply of the 16 kinds of spread codes $C_1$ to $C_{16}$ to the 16 transmission conductors 11Y at a timing of a rising edge (time $t_0$ in FIG. 19) when the transmission load signal $St_{load}$ has the high level. Then, the transmission conductor selection circuit 22 changes (switches), in response to switching of the switch circuits 2201 to 2216 in accordance with the switch control signal SW2, the 16 transmission conductors 11Y to which the spread codes $C_1$ to $C_{16}$ are to be supplied. Here, the timing of the switching of the switch circuits 2201 to 2216 in accordance with the switch control signal SW2 is a timing (for example, time $t_2$ or time $t_4$ in FIG. 19) of a rising edge of the clock signal CLK when the transmission load signal $St_{load}$ has the high level.

To the transmission conductors 11Y selected by the transmission conductor selection circuit 22, nth-chip codes of the spread codes $C_1$ to $C_{16}$ are supplied at a timing of a rising edge of the clock signal CLK. In particular, at time $t_1$, first-chip codes of the spread codes $C_1$ to $C_{16}$ are supplied to the transmission conductors 11Y. Thereafter, the nth-chip codes of the spread codes $C_1$ to $C_{16}$ are supplied to the transmission conductors 11Y (refer to FIG. 19(E)), like the second chip, third chip, and so forth, for every one clock of the clock signal CLK.

Then, since, at a timing of the 17th rising edge of the clock signal CLK at a timing at which the transmission load signal $St_{load}$ has the high level, the supply of the spread codes $C_1$ to $C_{16}$ to the 16 selected transmission conductors 11Y has been completed, the transmission conductor selection circuit 22 changes (switches) the transmission conductors 11Y to be selected to the next transmission conductors 11Y at this timing. Thereafter, the transmission conductor selection circuit 22 changes the transmission conductors 11Y at a timing of a rising edge of the transmission load signal $St_{load}$ similarly.

Then, the transmission conductor selection circuit 22 returns its operation to the beginning when the fourth pulse of the transmission load signal $St_{load}$ is inputted thereto, thereby to repeat the switching operation described above.

On the other hand, the reception conductor selection circuit 31 selects 16 reception conductors 12X (state of FIG. 14), which are to carry out reception first, at a timing of a rising edge of the clock signal CLK when the first transmission load signal $St_{load}$ has the high level. Thereafter, the reception conductor selection circuit 31 changes (switches) the 16 reception conductors 12X to be selected by switching the switch circuits 3101 to 3116 in accordance with the switch control signal SW3 every time the pulse of the transmission load signal $St_{load}$ is generated four times.

Then, the reception conductor selection circuit 31 restores the first selection changeover state (state of FIG. 14) at a timing of a rising edge of the clock signal CLK when the 33rd pulse of the transmission load signal $St_{load}$ has the high level, and repeats the switching operation described above.

It is to be noted that, in order to prevent generation of noise by a transition phenomenon by switching carried out by the switch circuits 3101 to 3116 of the reception conductor selection circuit 31, the switching cycle of the switch control signal SW3 may be set to a period of 16×4+m cycles (m: natural number) of the clock signal CLK, thereby to provide an extra period of one clock.

The reception signals obtained from the 16 reception conductors 12X through the reception conductor selection circuit 31 are amplified in signal level by the amplification circuit 32 and converted into and outputted as digital sample data at a timing of a rising edge of the clock signal CLK by and from the A/D converters 3301 to 3316 of the A/D conversion circuit 33.

Then, the digital sample data outputted from the A/D converters 3301 to 3316 are inputted to corresponding ones of the correlation value calculation circuits 3501 to 3516, respectively. The digital sample data are successively inputted from the D-type flip-flop circuit $35a_{16}$ at the first stage of the shift registers 35a of the correlation value calculation circuits 3501 to 3516 as described hereinabove (refer to FIG. 19(F)).

Then, at a timing of a rising edge of the clock signal CLK when the pulse of the reception load signal $Sr_{load}$ has the high level (at time $t_3$ in FIG. 19), the output signals $PS_1$ to $PS_{16}$ (refer to FIG. 18) are set to the shift registers 35a of the correlation value calculation circuits 3501 to 3516. Accordingly, at this timing, the correlators $35b_1$ to $35b_{16}$ have a state in which the output signals $PS_1$ to $PS_{16}$ are supplied thereto.

On the other hand, in the correlation value calculation circuits 3501 to 3516, after a timing (time $t_3$ in FIG. 19) of a rising edge of the clock signal CLK when the pulse of the reception load signal $Sr_{load}$ has the high level, the generation codes $PN_1'$ to $PN_{16}'$ (refer to FIG. 19(G)) of the 16 kinds of correlation value calculating codes $C_1'$ to $C_{16}'$ are supplied from the correlation value calculating code generation circuits $35c_1$ to $35c_{16}$ to the correlators $35b_1$ to $35b_{16}$, respectively The correlators $35b_1$ to $35b_{16}$ execute correlation calculation between the generation codes $PN_1'$ to $PN_{16}'$ of the correlation value calculating codes $C_1'$ to $C_{16}'$ and the output signals $PS_1$ to $PS_{16}$ set to the shift registers 35a at a timing of a rising edge of the pulse of the clock signal CLK when the reception load signal $Sr_{load}$ has the high level.

Then, the correlators $35b_1$ to $35b_{16}$ of the correlation value calculation circuits 3501 to 3516 temporarily store the correlation values of the result of the calculation into the registers $35d_1$ to $35d_{16}$ of the correlation value storage circuit 35d (refer to FIG. 19(H)).

Then, the correlation values temporarily stored in the registers $35d_1$ to $35d_{16}$ of the correlation value storage circuit 35d are stored into the storage circuit 36M of the outputting circuit 36.

Figure 20:
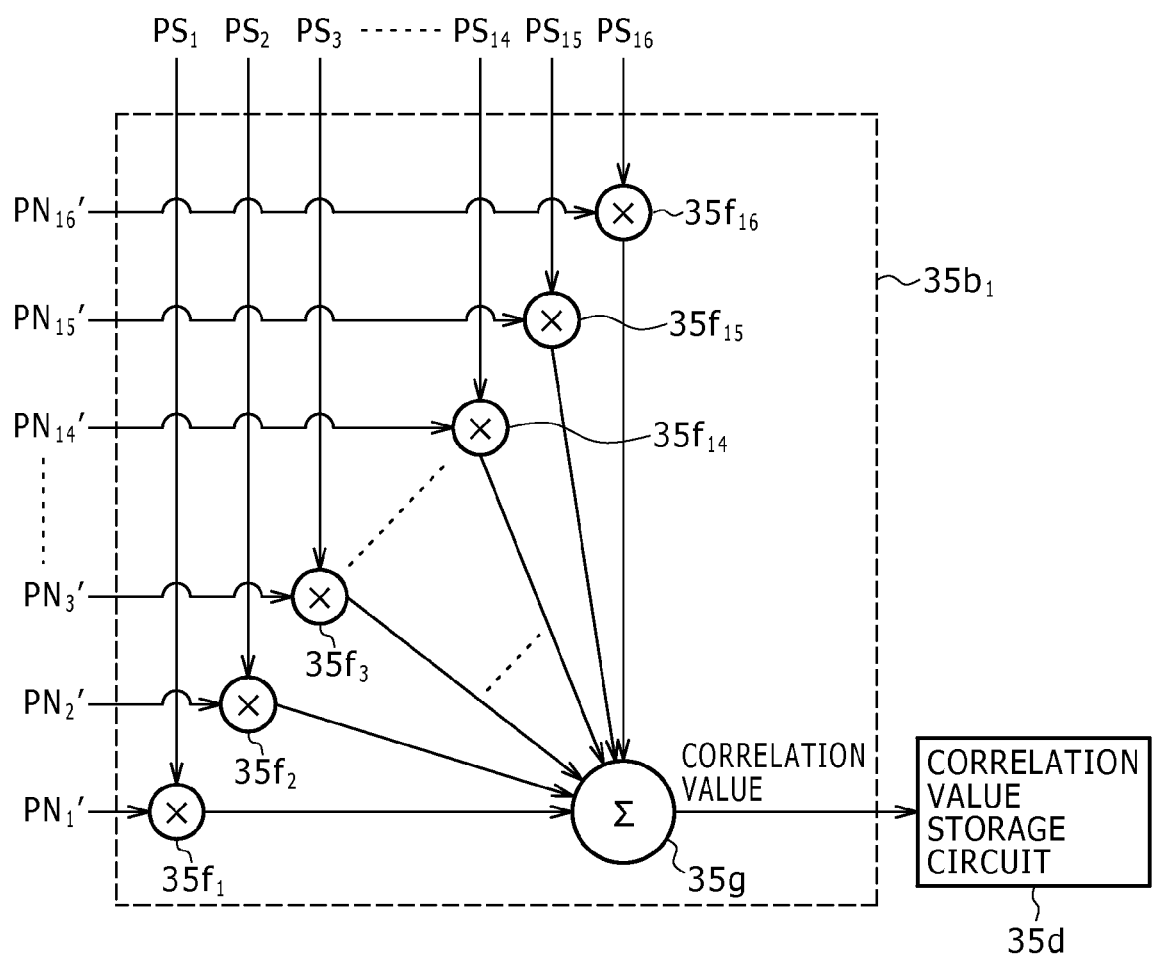
FIG. 20 is a diagram showing an example of a detailed configuration of part of the reception section of FIG. 18.

[Example of the Configuration of the Correlators $35b_1$ to $35b_{16}$: FIG. 20]

An example of the configuration of the correlators $35b_1$ to $35b_{16}$ is described in detail below with reference to FIG. 20. The correlators $35b_1$ to $35b_{16}$ all have the same configuration, and FIG. 20 shows an example of the configuration of the correlator $35b_1$ from among the correlators $35b_1$ to $35b_{16}$.

As shown in FIG. 20, the correlator $35b_1$ is composed of 16 multipliers $35f_1, 35f_2, \ldots, 35f_{16}$ and an adder 35g. The reason why the number of multipliers $35f_1$ to $35f_{16}$ in the present embodiment is 16 is that it is intended to determine a correlation of the spread codes $C_k$ of 16 chips. Accordingly, the number of multipliers to be provided differs depending upon the number of chips of the spread codes $C_k$.

To the multipliers $35f_1$ to $35f_{16}$, the output signals $PS_1$ to $PS_{16}$ from the stages of the shift register 35a and the generation codes $PN_1'$ to $PN_{16}'$ of the correlation calculation codes $C_k'$ are supplied. The multipliers $35f_1$ to $35f_{16}$ multiply signals at the same chip positions to obtain multiplication signals. The multiplication signals calculated by the multipliers $35f_1$ to $35f_{16}$ are supplied to the adder $35g$. The adder $35g$ adds the multiplication signals supplied thereto from the multipliers $35f_1$ to $35f_{16}$ to obtain a correlation value. This correlation value is stored into the register $35d_1$ (refer to FIG. 18) of the correlation value storage circuit $35d$. It is to be noted that, depending upon the code to be used, the multipliers $35f_1$ to $35f_{16}$ may be formed using an adder or a subtractor.

[Detection Mode Control by the Control Circuit 40 and Position Detection Processing of the Outputting Circuit 36]

As correlation values of all cross points of the sensor section 100 are temporarily stored into the storage circuit 36M as described hereinabove, the control circuit 40 determines, based on the correlation values temporarily stored in the storage circuit 36M, whether the detection mode should be set to the capacitive touch detection mode or the resistive touch detection mode. Then, the control circuit 40 switches the switch circuits 55 of the I/V conversion circuits 3201 to 3216 in response to the determined detection mode.

<Detection Mode Switching by the Control Circuit 40: FIGS. 21 to 24>

It is assumed that the pointer 18 moves with respect to the pointing input surface 100S from a state wherein it is not present anywhere near the pointing input surface 100S of the sensor section 100, to a state in which it exists in a spaced relationship from the pointing input surface 100S, to yet another state in which it touches the pointing input surface 100S, to a further state in which it presses the pointing input surface 100S, in this order. Therefore, in the present embodiment, the control circuit 40 switches, in an initial state, the switch circuits 55 of the I/V conversion circuits 3201 to 3216 to the detecting capacitor 52 side using the switch control signal SW1 to establish the capacitive touch detection mode.

Figure 21A:
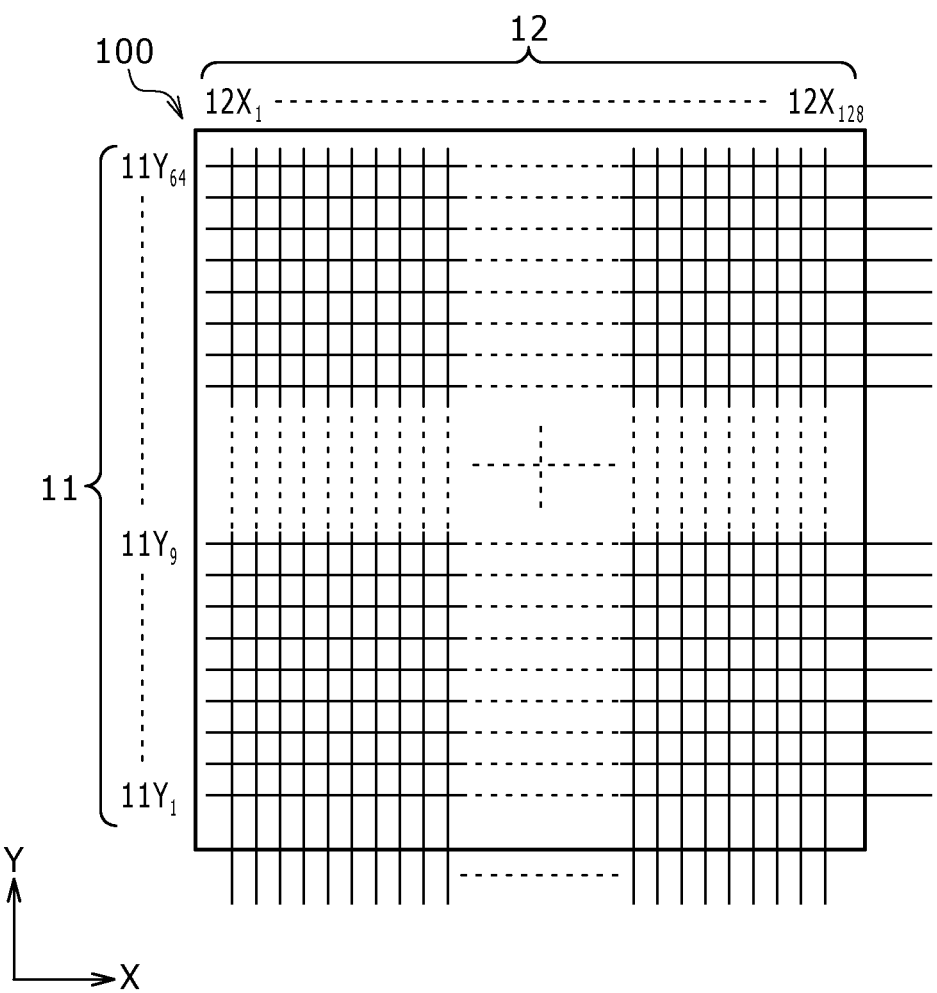
FIGS. 21A and 21B are views illustrating pointer detection operation of the pointer detection apparatus of the first embodiment.

When a pointer is free from (nowhere near) the pointing input surface 100S of the sensor section 100 as shown in FIG. 21(A), the transmission conductors 11Y electrostatically couple only to the reception conductors 12X, and therefore, if a transmission signal is supplied to the transmission conductors 11Y, then similar current signals flow to the reception conductors 12X at the cross points.

Figure 21B:

Accordingly, as shown in FIG. 21(B), a fixed correlation value (reference value ref) is obtained from the correlation value calculation circuits 3501 to 3516 of the calculation processing circuit 35. It is to be noted that FIG. 21(B) indicates a correlation value output of one of the correlation value calculation circuits 3501 to 3516.

Figure 22A:
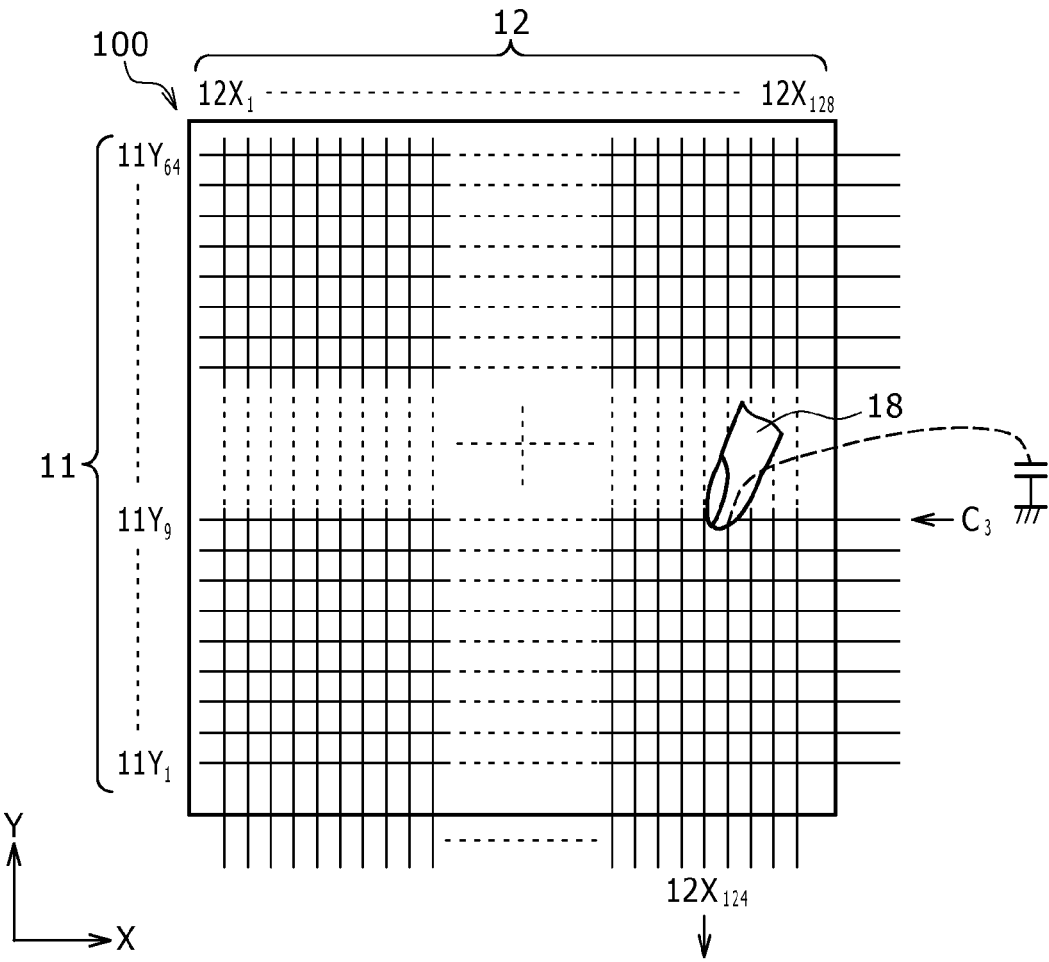
FIGS. 22A-22C are views illustrating pointer detection operation of the pointer detection apparatus of the first embodiment.

Then, if a pointer 18, for example, contacts with a cross point between the transmission conductor $11Y_9$ to which the spread code $C_3$ is supplied and the reception conductor $12X_{124}$ as shown in FIG. 22(A), then the transmission signal is shunted through a capacitance component between the pointer 18 and the reception conductor $12X_{124}$ as described hereinabove and thus the current signal obtained from the reception conductor $12X_{124}$ decreases.

Figure 22B:
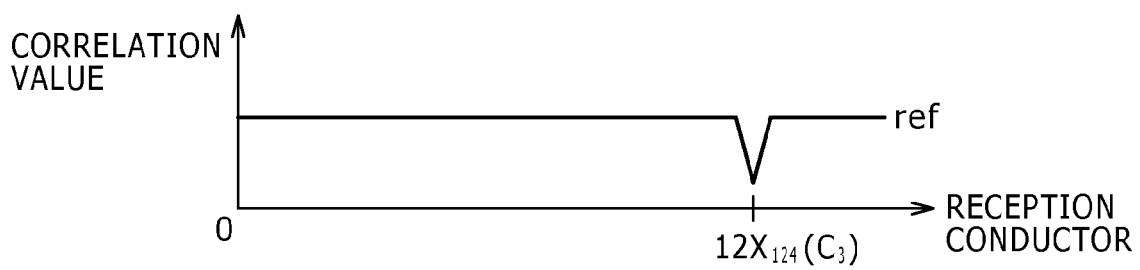

Therefore, the signal level of the current signal from the reception conductor $12X_{124}$ which the pointer 18 contacts decreases at the spread code $C_3$ supplied to the transmission conductor $11Y_9$. In other words, as shown in FIG. 22(B), the correlation value corresponding to the cross point between the transmission conductor $11Y_9$ and the reception conductor $12X_{124}$ varies in a decreasing direction from the correlation value when the pointer 18 does not exist above or on the pointing input surface 100S as shown in FIG. 21, that is, the reference value ref.

On the other hand, if a pressing force is applied by the pointer 18 at the cross point between the transmission conductor $11Y_9$ to which the spread code $C_3$ is supplied and the reception conductor $12X_{124}$ shown in FIG. 22(A), then the transmission resistive element 13Y and the reception resistive element 14X are brought into contact with each other at the cross point, and a current in accordance with the contact area begins to flow. As a result, the current signal of the output signal $S_{16}$ obtained from the reception conductor $12X_{124}$ increases.

Figure 22C:

Therefore, as shown in FIG. 22(C), the signal level of the current signal from the reception conductor $12X_{124}$ which the pointer 18 contacts increases at the spread code $C_3$ supplied to the transmission conductor $11Y_9$. In short, the correlation value corresponding to the cross point between the transmission conductor $11Y_9$ and the reception conductor $12X_{124}$ varies in an increasing direction from the reference value ref.

Accordingly, the position calculation circuit 361 refers to the correlation values at all cross points of the storage circuit 36M of the outputting circuit 36, and when a cross point having a correlation value which exhibits a decrease from the reference value ref is detected, then the control circuit 40 maintains the capacitive touch detection mode.

Then, if the position calculation circuit 361 refers to the correlation values at all cross points of the storage circuit 36M of the outputting circuit 36 and detects a correlation value which indicates an increase from the reference value ref, then the control circuit 40 changes the switch circuits 55 of the I/V conversion circuits 3201 to 3216 to the detecting resistor 54 side using the switch control signal SW1 to switch the detection mode to the resistive touch detection mode.

Accordingly, the control circuit 40 can switch the detection mode depending upon whether or not a correlation value higher than the reference value ref exists from among all correlation values stored in the storage circuit 36M.

However, the reference value ref sometimes varies depending upon a dispersion arising from an individual difference, an environmental factor (temperature or the like) or the like of each pointer detection apparatus 1.

Therefore, in the present embodiment, a correlation value (=ref) obtained from the correlation value calculation circuits 3501 to 3516 when the pointer 18 is free from the pointing input surface 100S of the sensor section 100 is stored in advance. In the following description, this reference value is referred to as an offset value.

Then, when a correlation value is to be stored into the storage circuit 36M, a value obtained by subtracting the offset value (=ref) from the correlation value calculated by any of the correlation value calculation circuits 3501 to 3516 is stored as a correlation value of the cross point.

By using the measure described, the correlation values obtained in the capacitive touch detection mode are all equal to zero when the pointer 18 is free from (nowhere near) the pointing input surface 100S of the sensor section 100. Then, when the pointer 18 is positioned in a hovering state above the pointing input surface 100S of the sensor section 100 or is in contact with the pointing input surface 100S, the correlation value at the cross point at which the pointer 18 is in a hovering state or in contact with the pointing input surface 100S becomes a negative value. On the other hand, if a pressing force is applied to the pointing input surface 100S by the pointer 18 existing on the pointing input surface 100S of the sensor section 100, then the correlation value obtained from the reception conductor 12X which forms the cross point to which the pressing force is applied becomes a positive value.

Then, the position calculation circuit 361 refers to the correlation values stored in the storage circuit 36M to detect whether or not there exists a correlation value which indicates a positive value or indicates a negative value among the correlation values stored in the storage circuit 36M. If the position calculation circuit 361 detects a correlation value indicating a positive value when operating in the capacitive touch detection mode, then the control circuit 40 switches the detection mode to the resistive touch detection mode. On the other hand, if the position calculation circuit 361 fails to detect a correlation value which indicates a positive value when operating in the resistive touch detection mode, then the control circuit 40 switches the detection mode to the capacitive touch detection mode.

Here, if the detection mode when the position calculation circuit 361 detects a correlation value indicating a positive value is the resistive touch mode or if the detection mode when the position calculation circuit 361 detects a correlation value indicating a negative value is the capacitive touch detection mode, then the control circuit 40 maintains the detection mode.

It is to be noted that, when the correlation values calculated in the resistive touch detection mode are written into the storage circuit 36M, the subtraction of a value corresponding to the reference value ref described hereinabove may not necessarily be carried out. This arises from the following reason. The correlation values obtained in the resistive touch detection mode are remarkably higher than the correlation values obtained in the capacitive touch detection mode. Therefore, from the correlation values calculated in the resistive touch detection mode, a correlation value corresponding to a cross point to which a pressing force is applied can be detected even if no subtraction process is carried out.

Whether or not a correlation value stored in the storage circuit 36M is a positive value can be detected by setting a threshold value to zero and comparing the correlation value with the threshold value. However, in order to make a reliable determination, the threshold value to be compared with the correlation values should be set to a value that is a little higher than zero. This is to prevent reaction with a noise component or the like.

Figure 23:
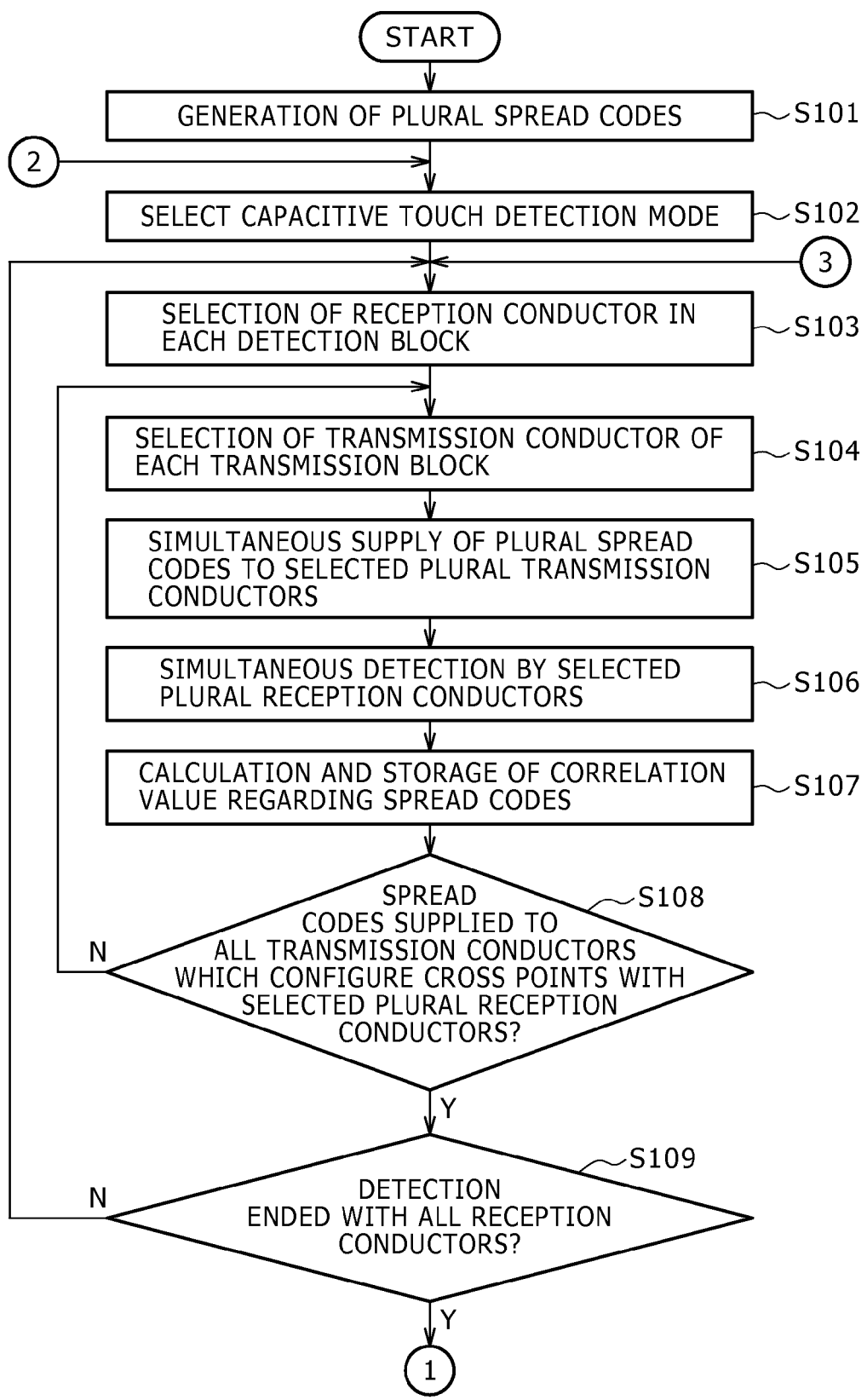
FIG. 23 is a view showing part of a flow chart illustrating an example of operation of the pointer detection apparatus of the first embodiment.
Figure 24:
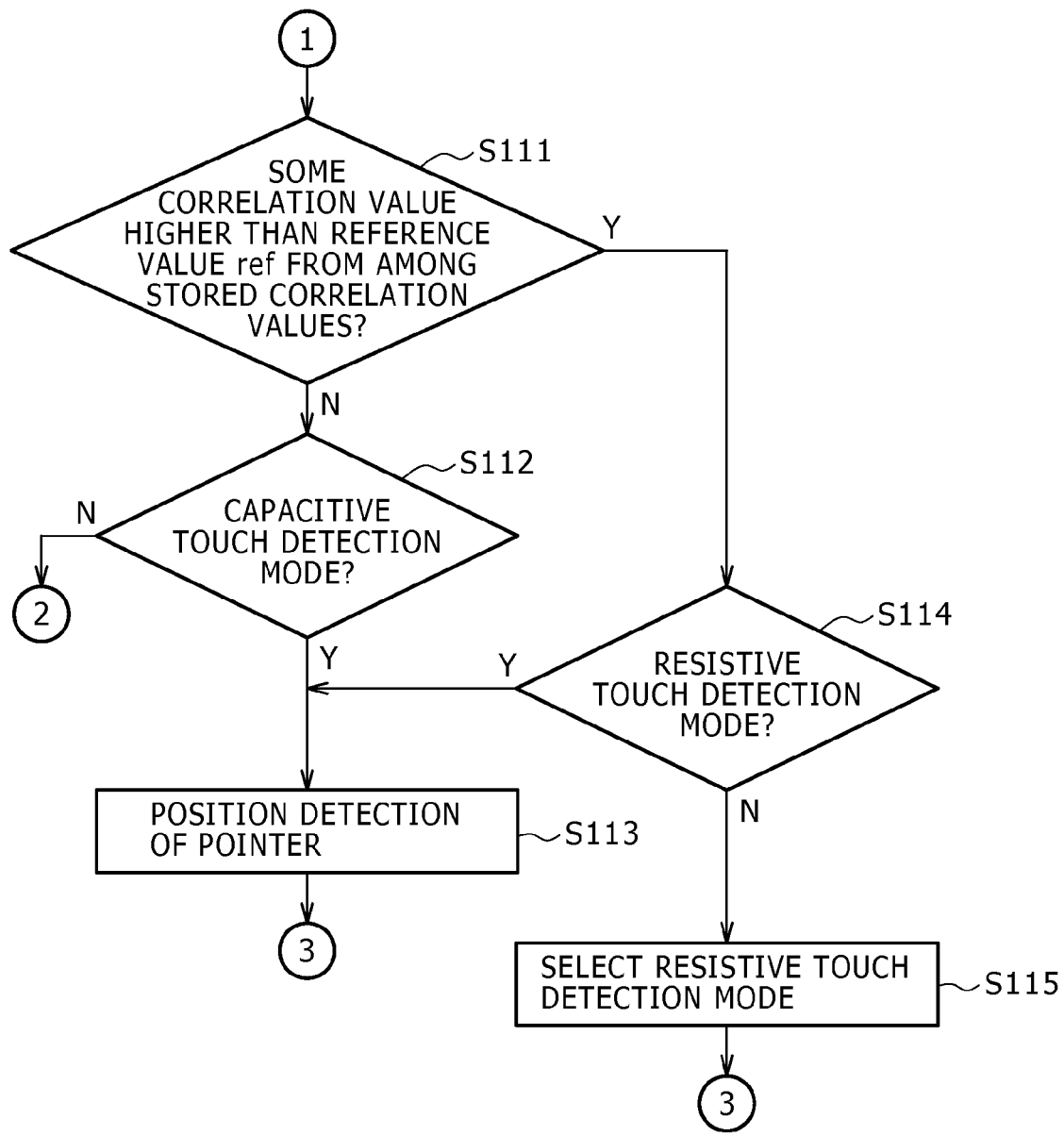
FIG. 24 is a view showing part of the flow chart illustrating the example of operation of the pointer detection apparatus of the first embodiment.

FIGS. 23 and 24 are flow charts illustrating a flow of general processing operation including a detection mode switching process by the pointer detection apparatus 1 in the present embodiment.

The processing of the flow charts of FIGS. 23 and 24 starts in response to a start signal ST from the control circuit 40. Then, one cycle of the processing operation regarding all of the cross points of the pointing input surface 100S is executed every time the start signal ST is generated.

First, if a transmission load signal $St_{load}$ generated one cycle of the clock signal CLK after when the control circuit 40 outputs the start signal ST is supplied to the transmission signal supplying circuit 21, then the transmission signal supplying circuit 21 generates 16 kinds of spread codes $C_1$ to $C_{16}$ synchronized with the transmission load signal $St_{load}$ and the clock signal CLK and starts supply of the generated codes to the transmission conductor selection circuit 22 (step S101).

Then, the control circuit 40 selects the capacitive touch detection mode as the detection mode and switches the switch circuits 55 of the I/V conversion circuits 3201 to 3216 to the detecting capacitor 52 side in accordance with a switch control signal SW1 (step S102).

Then, the control circuit 40 carries out switching control for the switching circuits 3101 to 3116 of the reception conductor selection circuit 31 in accordance with a switch control signal SW3 generated based on the clock signal CLK to select one reception conductor 12X from within each of the detection blocks DB1 to DB16 (step S103).

Further, the control circuit 40 carries out switching control for the switching circuits 2201 to 2216 of the transmission conductor selection circuit 22 in accordance with a switch control signal SW2 generated in synchronism with the transmission load signal St load to select one transmission conductor 11Y from within each of the transmission blocks TB1 to TB16 (step S104).

Consequently, the 16 kinds of spread codes $C_1$ to $C_{16}$ are supplied in synchronism with each other at the same time to the 16 transmission conductors 11Y selected by the transmission conductor selection circuit 22 (step S105). Then, output signals $S_1$ to $S_{16}$ are obtained as reception signals from the 16 reception conductors 12X selected by the reception conductor selection circuit 31. The output signals $S_1$ to $S_{16}$ are supplied to the correlation value calculation circuits 3501 to 3516 of the calculation processing circuit 35, respectively, through the amplification circuit 32 and the A/D conversion circuit 33 (step S106).

Then, the correlation value calculation circuits 3501 to 3516 carry out correlation calculation of digital sample data and correlation value calculating codes $C_1'$ to $C_{16}'$ and write correlation values obtained as a result of the correlation calculation into the storage circuit 36M of the outputting circuit 36 through the correlation value storage circuit 35d (step S107).

The control circuit 40 decides whether or not the supply of the spread codes has been carried out for all of the transmission conductors 11Y which form the cross points with the selected reception conductors 12X (step S108). If it is determined at step S108 that the supply of the spread codes has not been completed, then the processing returns to step S104 and then the processes at and after step S104 are repetitively carried out. Since one transmission block is formed of four transmission conductors 12Y, the number of sets of plural transmission conductors to be selected is four. Accordingly, at step S108, it is determined whether or not the processes at steps S104 to S107 have been carried out repetitively for four times.

Then, if it is determined at step S108 that the supply of the spread codes to all of the transmission conductors 11Y which form the cross points with the reception conductors 12X selected by the reception conductor selection circuit 31 is completed, then it is determined whether or not an output signal has been obtained from all of the reception conductors 12X (step S109). If it is determined at step S109 that the output signal has not been obtained from all of the reception conductors 12X, then the processing returns to step S103 and then the processes at and after step S103 are repetitively carried out. Since a detection block is formed of eight reception conductors 12X, the number of sets of plural reception conductors to be selected is eight. Accordingly, at step S109, it is determined whether or not the processes at step S103 to S108 have been carried out repetitively for eight times.

If it is determined at step S109 that the supply of the transmission signals has been carried out for all of the transmission conductors 11Y and the output signal is obtained from all of the reception conductors 12X, then the correlation values stored in the storage circuit 36M are referred to, in order to determine whether or not a correlation value higher than the reference value ref exists (step S111 in FIG. 24).

If it is determined at step S111 that a correlation value higher than the reference value ref does not exist in the correlation values stored in the storage circuit 36M, then the control circuit 40 determined whether or not the detection mode at that time is the capacitive touch detection mode (step S112). If it is determined at step S112 that the detection mode then is the capacitive touch detection mode, then the control circuit 40 controls the output circuit 36 to carry out a position detection process of a pointer and output a result of the detection (step S113). However, if it is determined at step S112 that the detection mode then is not the capacitive touch detection mode, then the processing returns to step S102, at which the control circuit 40 supplies the switch control signal SW1 to the switching circuits 55 of the I/V conversion circuits 3201 to 3216 to switch the switching circuits 55 to the detecting capacitor 52 side thereby to change the detection mode to the capacitive touch detection mode. Then, the control circuit 40 repetitively carries out the processes at and after step S103.

On the other hand, if it is determined at step S111 that a correlation value higher than the reference value ref exists in the correlation values stored in the storage circuit 36M, then the control circuit 40 determines whether or not the detection mode then is the resistive touch detection mode (step S114). If it is determined at step S114 that the detection mode then is the resistive touch detection mode, then the control circuit 40 controls the output circuit 36 to carry out a position detection process of a pointer and output a result of the detection (step S113). However, if it is determined at step S114 that the detection mode then is not the resistive touch detection mode, then the control circuit 40 supplies the switch control signal SW1 to the switching circuits 55 of the I/V conversion circuits 3201 to 3216 to switch the switching circuits 55 to the detecting resistor 54 side thereby to change the detection mode to the resistive touch detection mode (step S115). Then, the control circuit 40 returns the processing to step S103 and repetitively carries out the processes at and after step S103.

<Hovering Detection: FIGS. 25 to 27>

A detection technique of a hovering state is described with reference to FIGS. 25 to 27. Detection of hovering can be carried out in the following manner. When, in the capacitive touch detection mode, a pointer 18 touches the pointing input surface 100S of the sensor section 100 as shown in FIG. 25(A), the correlation value at the cross point at the contact center position exhibits a maximum correlation value PK and cross points in a comparatively small area range around the cross point at the contact center position exhibit correlation values of the negative polarity as shown in FIG. 25(B).

Meanwhile, when the pointer 18 is spaced from the pointing input surface 100S of the sensor section 100 in the capacitive touch detection mode as shown in FIG. 26(A), the correlation value at the cross point at a position immediately below the pointer 18 exhibits a maximum correlation value PK while cross points in a comparatively greater area range around the cross point at the position immediately below the pointer 18 exhibit correlation values of the negative polarity as shown in FIG. 26(B).

In particular, each of FIG. 25(B) and FIG. 26(B) shows a curve (hereinafter referred to as a level curve of the correlation values) 400 indicating a level variation of the correlation values at peripheral cross points centered at the cross point at the contact center position or at the position immediately below the pointer 18 on or above the pointing input surface 100S.

The reason why such results as illustrated in FIGS. 25(B) and 26(B) are obtained can be explained in the following manner. First, in a state wherein the pointer 18 touches the pointing input surface 100S of the sensor section 100 as shown in FIG. 25(A), a comparatively great number of electric flux lines corresponding to a transmission signal (voltage signal) supplied to a transmission conductor 11Y converge to the pointer 18 (for example, a finger) as described hereinabove. Consequently, of a current flowing to a reception conductor 12X when the pointer 18 does not exist on the reception conductor 12X, a current corresponding to the electric flux lines which converge to the pointer 18 is shunted to the ground through the pointer 18. Further, since the pointer 18 and the reception conductor 12X touch with each other, the range of those electrostatically coupled reception conductors 12X is small. As a result, the level curve 400 of the correlation values becomes a curve which exhibits a small width (area) within which a level variation is exhibited and with which a comparatively high peak value PK is obtained as shown in FIG. 25(B).

In contrast, in a state (hovering state) wherein the pointer 18 is spaced from the pointing input surface 100S of the sensor section 100 as shown in FIG. 26(A), the range within which the pointer 18 and the reception conductors 12X are electrostatically coupled to each other is greater than that in the case in which the pointer 18 touches, while the coupling degree between the pointer 18 and the reception conductors 12X decreases, and also a current shunted to the ground through the pointer 18 from within the current flowing to the reception conductor 12X decreases. Then, the range within which the pointer 18 and the reception conductors are electrostatically coupled to each other increases as the space distance between the pointer 18 and the pointing input surface 100S increases. As a result, the current shunted to the ground through the pointer 18, from within the current to flow to the reception conductor 12X when the pointer 18 does not exist on the reception conductor 12X, decreases as the space distance between the pointer 18 and the pointing input surface 100S increases.

Accordingly, when the pointer 18 is in a hovering state as shown in FIG. 26(B), in the level curve 400 of the correlation values, the width (area) with which a level variation is exhibited increases in accordance with the space distance between the pointer 18 and the pointing input surface 100S, and the peak value PK decreases in accordance with the space distance between the pointer 18 and the pointing input surface 100S.

From the foregoing, the ratio between the gradient $\theta$ of the level curve 400 of the correlation values and the peak value PK of the level curve of the correlation values is determined, and a detection output in the hovering state is obtained from this ratio. In this instance, the ratio between the gradient $\theta$ of the level curve 400 of the correlation values and the peak value PK of the level curve of the correlation values and a predetermined threshold value are compared with each other to discern whether or not the pointer 18 touches the pointing input surface 100S. Then, if it is discerned that the pointer 18 is in a hovering state, then the space distance between the pointer 18 and the pointing input surface 100S is determined from the value of the ratio.

Now, a particular example of calculation for determining the ratio between the gradient $\theta$ of the level curve 400 of the correlation values and the peak value PK of the level curve of the correlation values is described.

If level values of the correlation value obtained at a certain point of time in a state in which the pointer 18 is spaced from the pointing input surface 100S as shown in FIG. 26(A) are mapped, then, for example, such a distribution as shown in FIG. 27 is obtained. It is to be noted that FIG. 27 illustrates correlation value level values obtained at 3×3 cross points. The correlation value level values are in a normalized form and have positive values for the convenience of description.

In the example illustrated in FIG. 27, a maximum value "100" of the correlation value level is obtained at the central cross point, and another correlation value level value "50" is obtained at cross points at the positions leftwardly, rightwardly, upwardly and downwardly of the central cross point. A further correlation value level value "20" is obtained at cross points at the positions obliquely leftwardly upwardly, obliquely rightwardly upwardly, obliquely leftwardly downwardly and obliquely rightwardly downwardly of the central cross point. Accordingly, the peak value PK of this level curve of the correlation value is "100."

The gradient of the level curve 400 of the correlation values can be obtained by determining the difference between the peak value PK and the correlation value level value at another cross point adjacent to the cross point at which the peak value PK is obtained. For example, in the case of FIGS. 27, since the peak value PK of the level curve 400 of the correlation values is "100" at the central grid, the gradient of the edge is 100−50=50.

Accordingly, the ratio between the gradient and the peak value of the level curve 400 of the correlation values of the example of FIG. 27 is (gradient of the level curve of the correlation values)/(peak value PK)=50/100=0.5. Accordingly, if the threshold value for determining whether the pointer 18 is in a hovering state or in a touching state is, for example, 0.7, then in the example illustrated in FIG. 27, the position calculation circuit 361 determines that the pointer 18 is in a hovering state. On the other hand, where the ratio between the gradient and the peak value of the level curve 400 of the correlation values is, for example, 0.9, the position calculation circuit 361 determines that the pointer 18 is in a state wherein it is touching the pointing input surface of the sensor section 100.

While, in the example described above, a single threshold value is provided for determination of a hovering state and a touching state of the pointer 18, the present invention is not limited to this configuration. For example, in addition to a threshold value for determining a hovering state and a touching state of the pointer 18, one or a plurality of threshold values for determining a degree of a hovering state (a space distance between the pointing input surface 100S of the sensor section 100 and the pointer) may be set additionally. Of course the threshold value or values in this instance are lower than the threshold value for the determination of a hovering state and a touching state.

It is to be noted that, while the foregoing described the case wherein determination of a hovering state is carried out directly based on the level curve of the correlation values (mapping data of the correlation value level values), the present invention is not limited to this configuration. A hovering state may be determined based on a characteristic after the level curve of the correlation values is processed by nonlinear processing.

Description is given using a case in which, for example, logarithmic conversion is carried out as nonlinear processing for the level curve of the correlation values as an example. Where nonlinear processing is not carried out, the level of the correlation value obtained when the pointer 18 touches the pointing input surface of the sensor section 100 is extremely high at a location at which the pointer 18 and the pointing input surface 100S touch with each other but is extremely low at another location at which the pointer 18 is spaced from the pointing input surface 100S. Therefore, if it is tried to carry out a recognition process including a state in which the pointer 18 is spaced a little from the pointing input surface 100S, since the correlation value level is extremely different between the two cases described above, accurate recognition is difficult.

Therefore, if a predetermined signal conversion process, for example, a logarithmic process, is carried out for the level curve of the correlation values, then it is possible to make a portion, at which the correlation value is low, stand out and suppress another portion, at which the correlation value level is high. In other words, the shape of a peak portion of the level curve of the correlation values after the logarithmic conversion is broadened and the maximum value of the same is suppressed. In this instance, the variation of the level value of the correlation value in the proximity of the boundary between the touching state and the non-touching state of the pointer 18 becomes continuous, and a hovering state can be readily discerned even if the hovering state is such that the pointer 18 is spaced very little from the pointing input surface 100S. Consequently, the recognition characteristic can be improved.

<Detection of a Pressing Force (Finger Force)>

If it is determined as a result of reference to the correlation values stored in the storage circuit 36M by the position calculation circuit 361 that a cross point at which the correlation value is higher than the reference value ref exists, then the cross point is a portion to which a pressing force is applied from the pointer 18 through the pointing input surface 100S.

Then, as described hereinabove, in the sensor section 100 of the present embodiment, the contact area between the transmission resistive element 13Y and the reception resistive element 14X varies in accordance with the pressing force. In particular, as the pressing force increases, the contact area between the transmission resistive element 13Y and the reception resistive element 14X increases and the resistance value of the variable resistor formed between the transmission resistive element 13Y and the reception resistive element 14X decreases. However, if the pressing force becomes higher than a fixed level, then the variation of the contact area no longer occurs and a limiter is applied.

Then, the current value of the electric signal obtained from the reception conductor 12X varies in response to the resistance value of the variable resistor formed between the transmission resistive element 13Y and the reception resistive element 14X, and as the pressing force increases, the current value of the current signal obtained from the reception conductor 12X increases.

Accordingly, the digital sample data of the output signal obtained from the reception conductor 12X at the cross point at which the pressing force is applied has a digital value which increases in proportion to the pressing force until the limiter is applied. Therefore, the correlation value regarding the digital sample data also assumes a positive value corresponding to the pressing force.

As described above, if the position calculation circuit 361 detects a correlation value higher than the reference value ref from among the correlation values stored in the storage circuit 36M, then it determines, from the address position of the correlation value, a coordinate position of the corresponding cross point and outputs a detection output of the pressing force corresponding to the magnitude of the correlation value.

It is to be noted that, while, in the embodiment described above, before the correlation values are written into the storage circuit 36M, an offset value is subtracted from the respective correlation values. However, the present invention is not limited to this configuration. For example, the correlation values calculated by the correlation value calculation circuits 3501 to 3516 may be stored in the storage circuit 36M such that, when position detection is to be carried out by the position calculation circuit 361, an offset value may be subtracted from the respective correlation values. In this instance, the position calculation circuit 361 carries out the decision process at step S111 described hereinabove and notifies the control circuit 40 of a result of the decision. Then, the position calculation circuit 361 outputs output data of the result of the pointer detection in accordance with a controlling instruction of the control circuit 40.

It is to be noted that the processing of the position calculation circuit 361 may be executed as software processing by a microcomputer provided in the control circuit 40.

As described above, in the present embodiment, the outputting circuit 36 includes the position calculation circuit 361 and processes the correlation values written in the storage circuit 36M to obtain a detection result of a pointer. In particular, the position calculation circuit 361 generates a coordinate corresponding to a cross point inputted by pointing of the pointer 18, an area inputted by the pointing, a hovering state, a pressing force, a flag corresponding to a detection mode, a pointer detection result regarding a large number of pointers, and so forth, and outputs them as output data.

However, the processing operation of the position calculation circuit 361 can be carried out by an apparatus to which the pointer detection apparatus 1 of the present embodiment is connected such as, for example, a computer. In this instance, the outputting circuit 36 does not include the position calculation circuit 361 but converts the stored contents of the storage circuit 36M into, for example, bit map data or the like and outputs them as output data. Alternatively, the outputting circuit 36 may output the stored contents of the storage circuit 36M as they are as output data.

In the first embodiment described above, the control circuit 40 switches the detection mode between the capacitive touch detection mode and the resistive touch detection mode in response to the correlation values stored in the storage circuit 36M. However, the present invention is not limited to this configuration. For example, naturally it is possible to change the detection mode between the capacitive touch detection mode and the resistive touch detection mode by manual operation.

In particular, for example, a slide switch may be connected to the control circuit 40 such that the capacitive touch detection mode or the resistive touch detection mode is designated manually by means of the slide switch. In this instance, the slide switch may be configured such that "automatic mode switching" can be selected. In this instance, the user can select such automatic mode switching as in the embodiment described hereinabove, while the user can also switch the detection mode so as to select only the capacitive touch detection mode or the resistive touch detection mode according to each application.

Further, while, in the embodiment described above, the transmission resistive elements 13Y are formed along the transmission conductors 11Y and the reception resistive elements 14X are formed along the reception conductors 12X, each of the transmission resistive elements 13Y and the reception resistive elements 14X may be formed in the same direction as the transmission conductors 11Y or the reception conductors 12X. Alternatively, the transmission resistive elements 13Y and the reception resistive elements 14X may be provided like islands for individual regions corresponding to the cross points between the transmission conductors 11Y and the reception conductors 12X. Furthermore, the transmission resistive elements 13Y and the reception resistive elements 14X may be formed over an overall area of the lower side substrate 16 and the upper side substrate 17 as described hereinabove.

Further, the transmission conductors 11Y or the reception conductors 12X may be formed along the transmission conductors 11Y or the reception conductors 12X while the reception conductors 12X or the transmission conductors 11Y are formed over an overall area of one face of the lower side substrate 16 or the upper side substrate 17. Alternatively, the transmission conductors 11Y or the reception conductors 12X may be provided like islands in individual regions corresponding to the cross points between the transmission conductors 11Y and the reception conductors 12X while the reception conductors 12X or the transmission conductors 11Y are formed over an overall area of one face of the lower side substrate 16 or the upper side substrate 17 or along the transmission conductors 11Y or the reception conductors 12X.

In the pointer detection apparatus of the first embodiment described above, the control circuit 40 decides whether the detection mode should be set to the capacitive touch detection mode or the resistive touch detection mode and switches the switch circuits 55 of the I/V conversion circuits 3201 to 3216 of the amplification circuit 32.

However, as described hereinabove with reference to FIG. 10, if the detecting resistor 54 of the resistive film method has an inductance value substantially equal to that of the direct current bias resistor 53 of the detecting capacitor 52, then the I/V conversion circuits of the amplification circuit 32 do not require the mode switch circuit 55.

It is to be noted that, while the first embodiment is described taking a case in which the correlation values stored in the storage circuit 36M are compared with the reference value ref to switch the detection mode to the resistive touch detection mode or the capacitive touch detection mode as an example, the present invention is not limited to this configuration. For example, the detection mode may be switched to the resistive touch detection mode or the capacitive touch detection mode for each I/V conversion circuit. By this configuration, also where a plurality of pointers exist on or above the pointing input surface 100S and one of the pointers is in a hovering state or in a contacting state while another pointer applies a pressing force to the pointing input surface, the pointers can be detected appropriately.

[Second Embodiment: Example wherein Switching of a Detection Mode is not Carried Out, FIGS. 28 to 29]

In the pointer detection apparatus of the first embodiment described above, the control circuit 40 decides whether the detection mode should be set to the capacitive touch detection mode or the resistive touch detection mode and changes the switch circuits 55 of the I/V conversion circuits 3201 to 3216 of the amplification circuit 32.

However, for example, if a pointer 18 is brought onto the pointing input surface 100S of the sensor section 100 and into contact with the pointing input surface 100S and is then pressed against the pointing input surface 100S at a high speed, then there is the possibility that switching of the mode for each of the I/V conversion circuits 3201 to 3216 by the control circuit 40 may not be able to follow the high movement speed.

Therefore, the pointer detection apparatus of the second embodiment is configured such that the I/V conversion circuits of the configuration of FIG. 10 in the configuration of the first embodiment described hereinabove are used for the amplification circuit 32 to eliminate the necessity for the mode switching in which a switch circuit is used. In the second embodiment described below, the configuration other than the amplification circuit 32 is similar to that of the first embodiment, and like elements to those of the first embodiment are denoted by like reference characters and detail description of them is omitted. This similarly applies also to the other embodiments hereinafter described.

Figure 28:
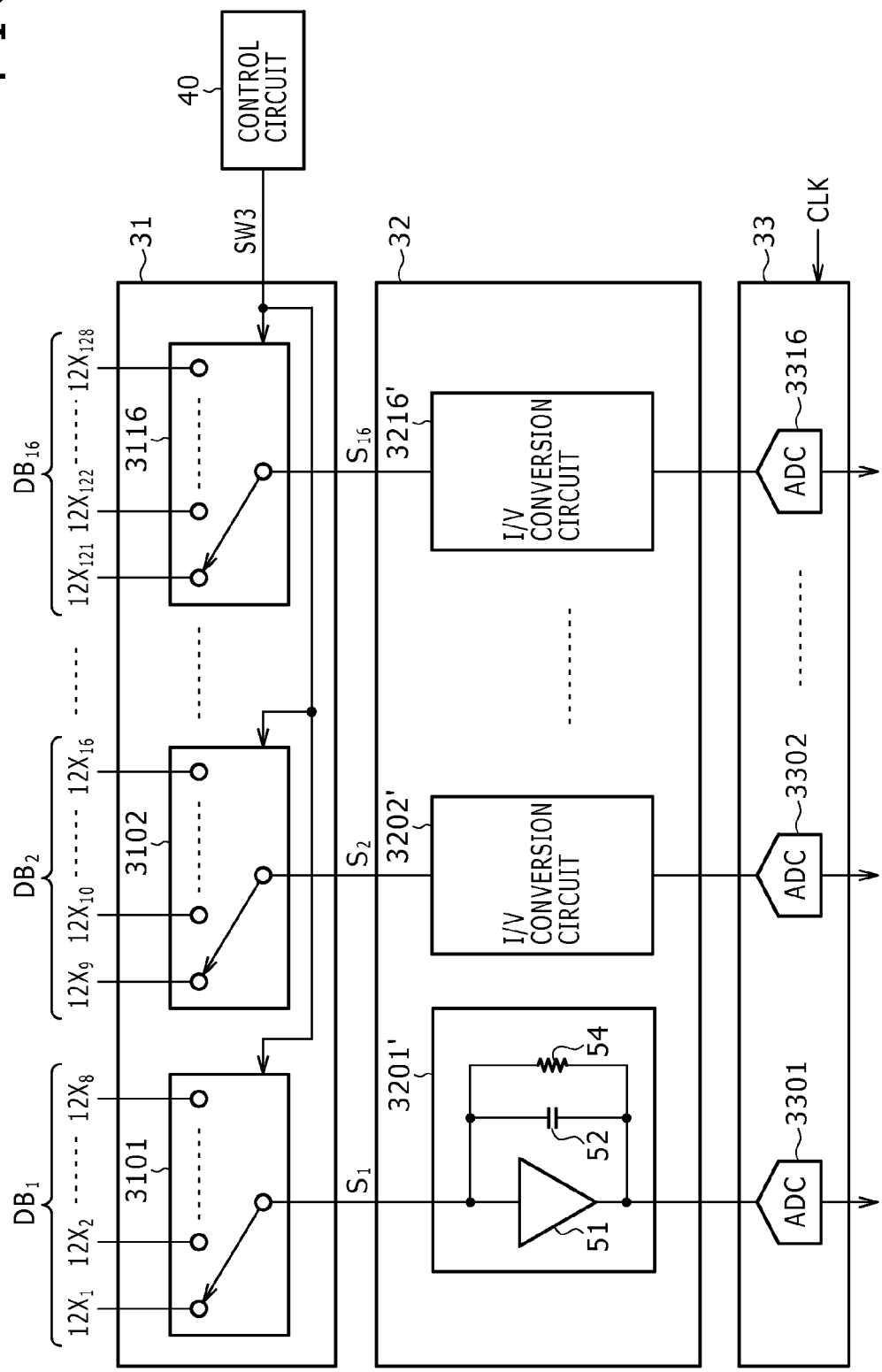
FIG. 28 is a block diagram showing an example of a configuration of main part of a second embodiment of a pointer detection apparatus according to the present invention.

FIG. 28 is a view showing an example of a configuration of the amplification circuit 32 in the case of the present second embodiment.

As shown in FIG. 28, in the pointer detection apparatus of the present second embodiment, the amplification circuit 32 is formed from 16 I/V conversion circuits 3201', 3202', . . . , 3216' corresponding to the detection blocks DB1 to DB16, respectively. Each of the I/V conversion circuits 3201' to 3216' is formed from an I/V conversion circuit of a configuration wherein a detecting capacitor 52 for the electrostatic coupling method and a detecting resistor 54 for the resistive film method are connected in parallel across an operational amplifier 51 as shown in FIG. 10.

The I/V conversion circuits 3201' to 3216' include no switch circuit 55 for the detection mode. Accordingly, in the present second embodiment, the control circuit 40 need not generate the switch control signal SW1 to the I/V conversion circuits 3201 to 3216 as in the case of the first embodiment. Therefore, the control circuit 40 eliminates the requirement for a decision process wherein it refers to correlation values calculated by the correlation value calculation circuits 3501 to 3516 to determine whether the detection mode should be set to the capacitive touch detection mode or the resistive touch detection mode. In regard to the other point, the second embodiment is configured similarly to the first embodiment.

Now, an example of a flow of general processing operation in the pointer detection apparatus of the second embodiment is described with reference to a flow chart of FIG. 29.

Figure 29:
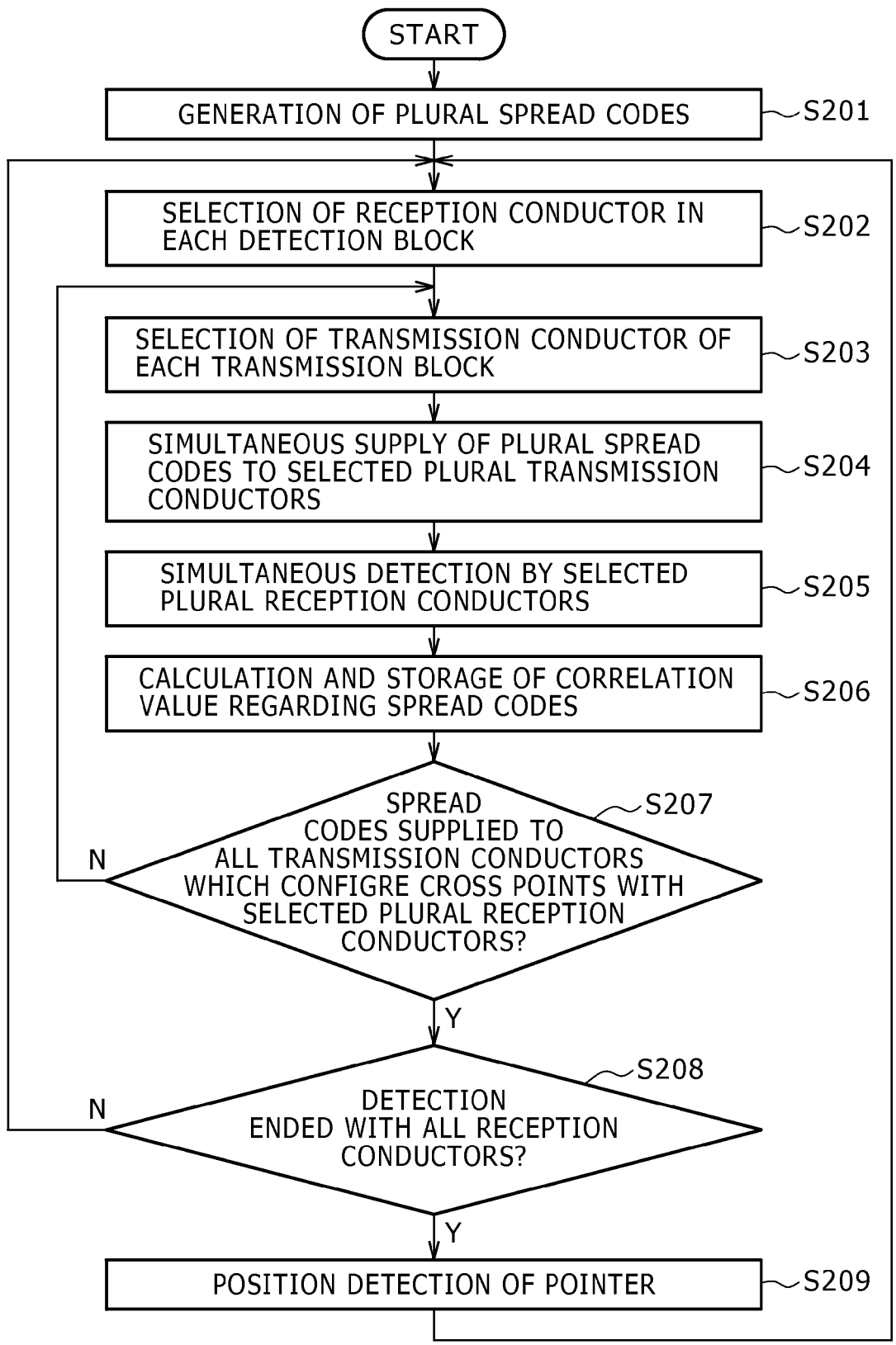
FIG. 29 is a flow chart illustrating an example of operation of the pointer detection apparatus of the second embodiment.

The processing illustrated in the flow chart of FIG. 29 is started in accordance with a start signal ST from the control circuit 40. Then, one cycle of the processing operation for all of the cross points of the pointing input surface 100S is executed every time the start signal ST is generated.

First, if the transmission load signal $St_{load}$ generated one cycle of the clock signal CLK after the control circuit 40 outputs the start signal ST is supplied to the transmission signal supplying circuit 21, then the transmission signal supplying circuit 21 generates 16 kinds of spread codes $C_1$ to $C_{16}$ synchronized with the transmission load signal $St_{load}$ and the clock signal CLK and starts supply of the generated codes to the transmission conductor selection circuit 22 (step S201).

The control circuit 40 carries out switching control of the switching circuits 3101 to 3116 of the reception conductor selection circuit 31 in accordance with a switch control signal SW3 generated based on the transmission load signal $St_{load}$ to carry out selection of one reception conductor 12X from within each of the detection blocks DB1 to DB16 (step S202).

Further, the control circuit 40 carries out switching control of the switching circuits 2201 to 2216 of the transmission conductor selection circuit 22 in accordance with a switch control signal SW2 generated based on the transmission load signal $St_{load}$ to carry out selection of one transmission conductor 11Y from within each of the transmission blocks $TB_1$ to $TB_{16}$ (step S203).

Consequently, the 16 kinds of spread codes $C_1$ to $C_{16}$ are supplied in synchronism with each other at the same time to the 16 transmission conductors 11Y selected by the transmission conductor selection circuit 22 (step S204). Then, the reception conductor selection circuit 31 acquires reception signals from the 16 reception conductors 12X selected by the reception conductor selection circuit 31 as output signals $S_1$ to $S_{16}$. The output signals $S_1$ to $S_{16}$ are supplied to the correlation value calculation circuits 3501 to 3516, respectively, of the calculation processing circuit 35 through the amplification circuit 32 and the A/D conversion circuit 33 (step S205).

Then, correlation calculation between digital sample data and correlation value calculating codes $C_1'$ to $C_{16}'$ is carried out by the correlation value calculation circuits 3501 to 3516, respectively, and correlation values obtained as a result of the correlation calculation are written into the storage circuit 36M of the outputting circuit 36 through the correlation value storage circuit 35d (step S206).

The control circuit 40 determines whether or not supply of the spread codes $C_k$ to all of the transmission conductors 11Y which form the cross points with the selected reception conductors 12X has been carried out (step S207). If it is determined at step S207 that the supply of the spread codes $C_k$ has not been completed, then the processing returns to step S203 and then the processes at and after step S203 are repetitively carried out. Since the number of sets of plural transmission conductors to be selected is four, it is determined at step S207 whether or not the processes from step S203 to step S206 have been carried out repetitively by four times.

On the other hand, if it is determined at step S207 that the supply of the spread codes to all of the transmission conductors 11Y which form the cross points with the selected reception conductors 12X has been completed, then it is determined whether or not an output signal has been obtained from all of the reception conductors 12X (step S208). If it is determined at step S208 that supply of a transmission signal to all of the transmission conductors 11Y has been carried out and an output signal is not obtained from all of the reception conductors 12X, then the processing returns to step S202 and then the processes at and after step S202 are repetitively carried out. Since the number of sets of plural reception conductors to be selected is eight, it is determined at step S208 whether or not the processes from step S202 to step S207 are carried out repetitively by eight times.

If it is determined at step S208 that the supply of a transmission signal to all of the transmission conductors 11Y has been carried out and an output signal has been obtained from all of the reception conductors 12X, then the control circuit 40 controls the outputting circuit 36 to carry out a position detection process of a pointer and output a result of the detection (step S209). Thereafter, the control circuit 40 returns the processing to step S202 and repetitively carries out the processes at and after step S202.

In the present second embodiment, since the control circuit 40 need not carry out management and switching control of the detection mode, it is simplified in circuit configuration. It is to be noted that, the second embodiment is similar to the first embodiment in that the position calculation circuit 361 determines which one of the detection methods of the electrostatic coupling method and the resistive film method is used to detect a pointer depending upon whether or not the correlation values stored in the storage circuit 36M are higher than the reference value ref, and a result of the determination can be reflected in the output data of a pointer detection result.

Further, since the pointer detection apparatus of the first embodiment carries out switching control of the detection mode, it is sometimes difficult for the pointer detection apparatus of the first embodiment to detect a touching state or a hovering state of the pointer 18 on the pointing input surface 100S and a pressing state of the pointing input surface 100S by the pointer 18 at the same time.

In contrast, the pointer detection apparatus of the second embodiment can carry out detection regarding the pointer 18 on or above the sensor section 100 simultaneously based on both the electrostatic coupling method and the resistance film method. Therefore, even if a pointing input operation based on touching of a pointer 18 is carried out at a certain cross point on the pointing input surface 100S and a pressing input operation by another pointer 18 is carried out at another cross point, the pointer detection apparatus of the second embodiment can easily detect them at the same time.

[Third Embodiment]

This third embodiment is also an example which solves the problem that switching of the mode for each of the I/V conversion circuits 3201 to 3216 by the control circuit 40 may not be able to follow the moving speed of a pointer 18. In the present third embodiment, the capacitive touch detection mode and the resistive touch detection mode are carried out concurrently.

Figure 30:
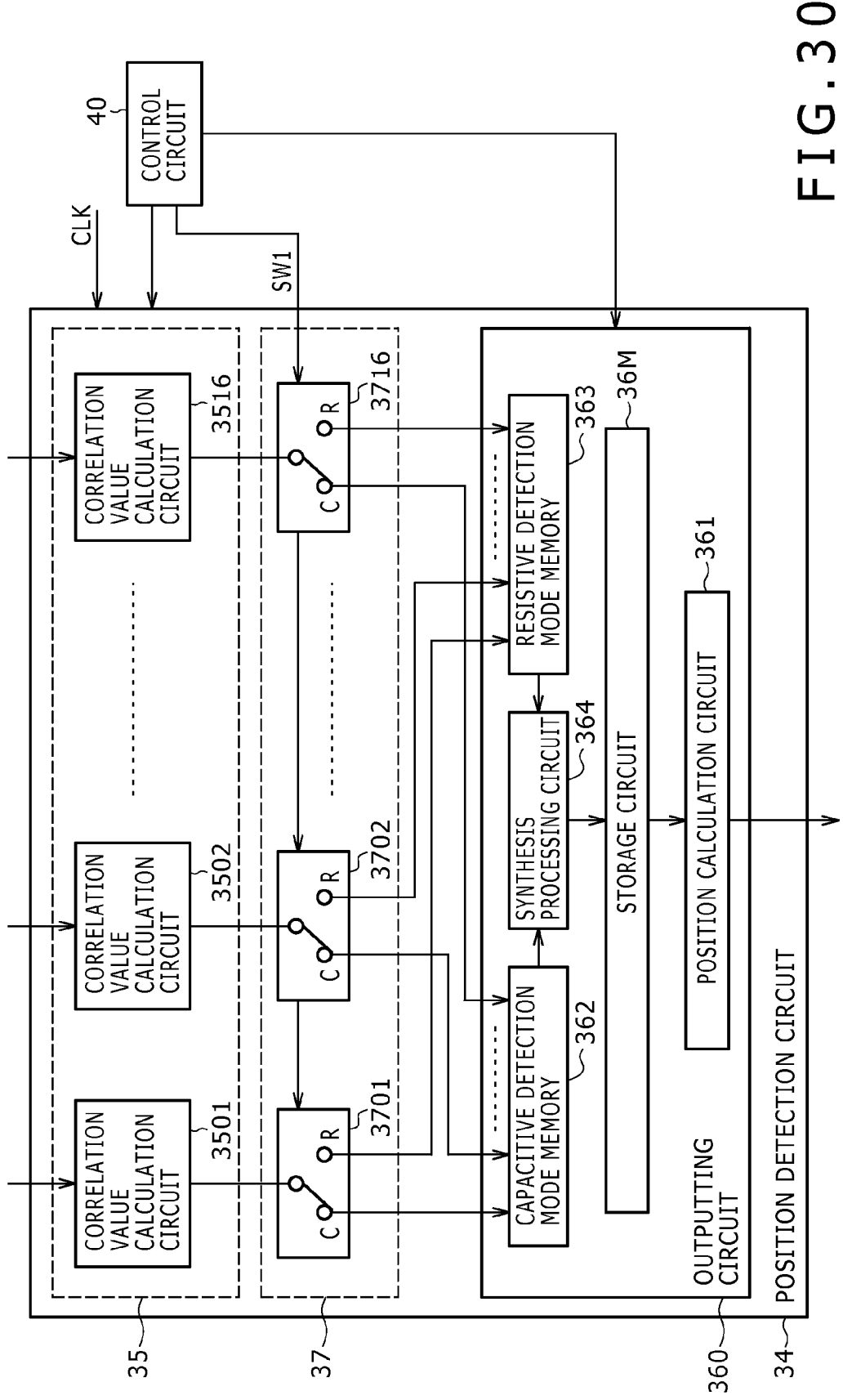
FIG. 30 is a block diagram showing an example of a configuration of main part of a third embodiment of a pointer detection apparatus according to a third embodiment of the present invention.
Figure 31:
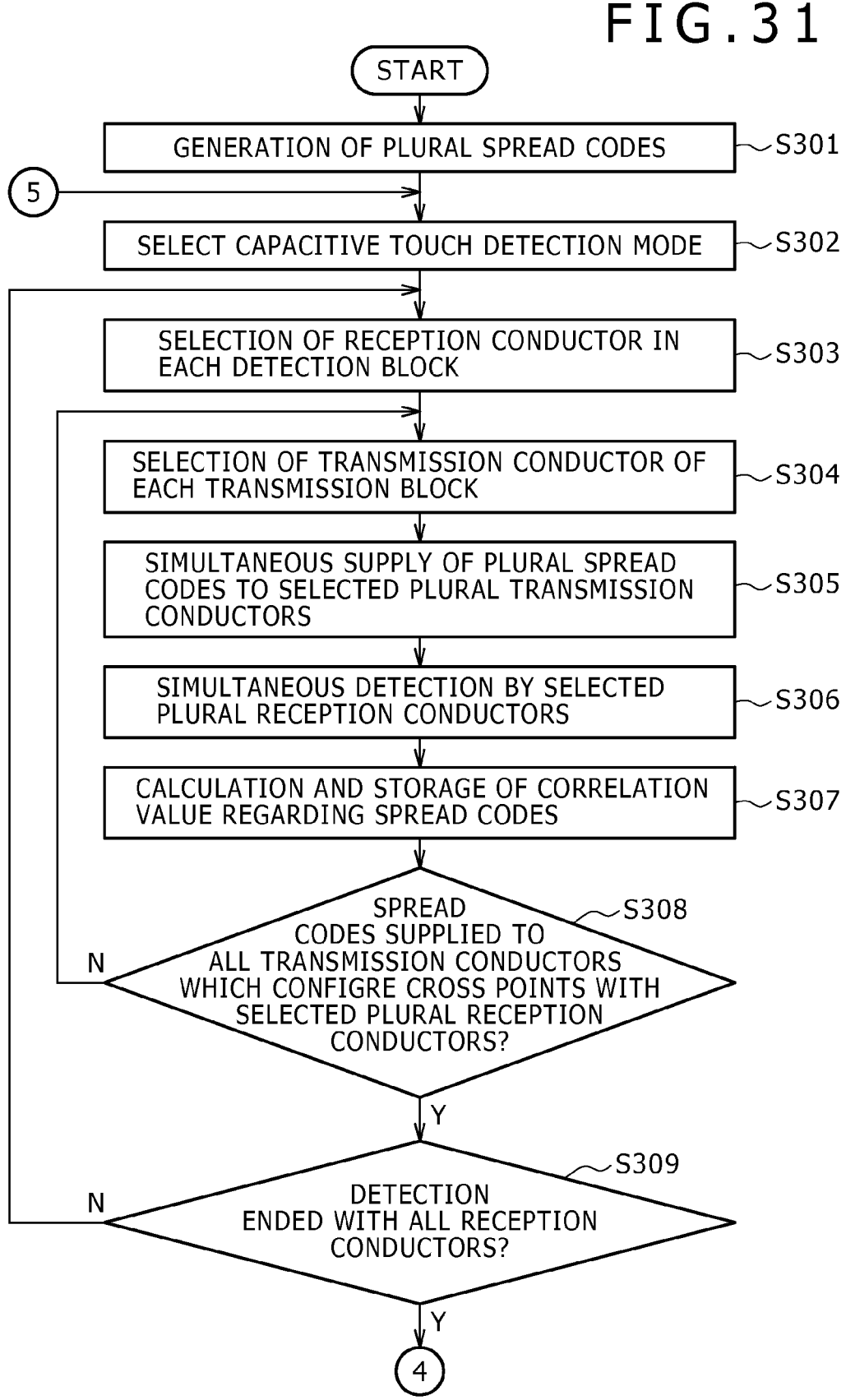
FIG. 31 is a flow chart illustrating an example of operation of the pointer detection apparatus of the third embodiment.
Figure 32:
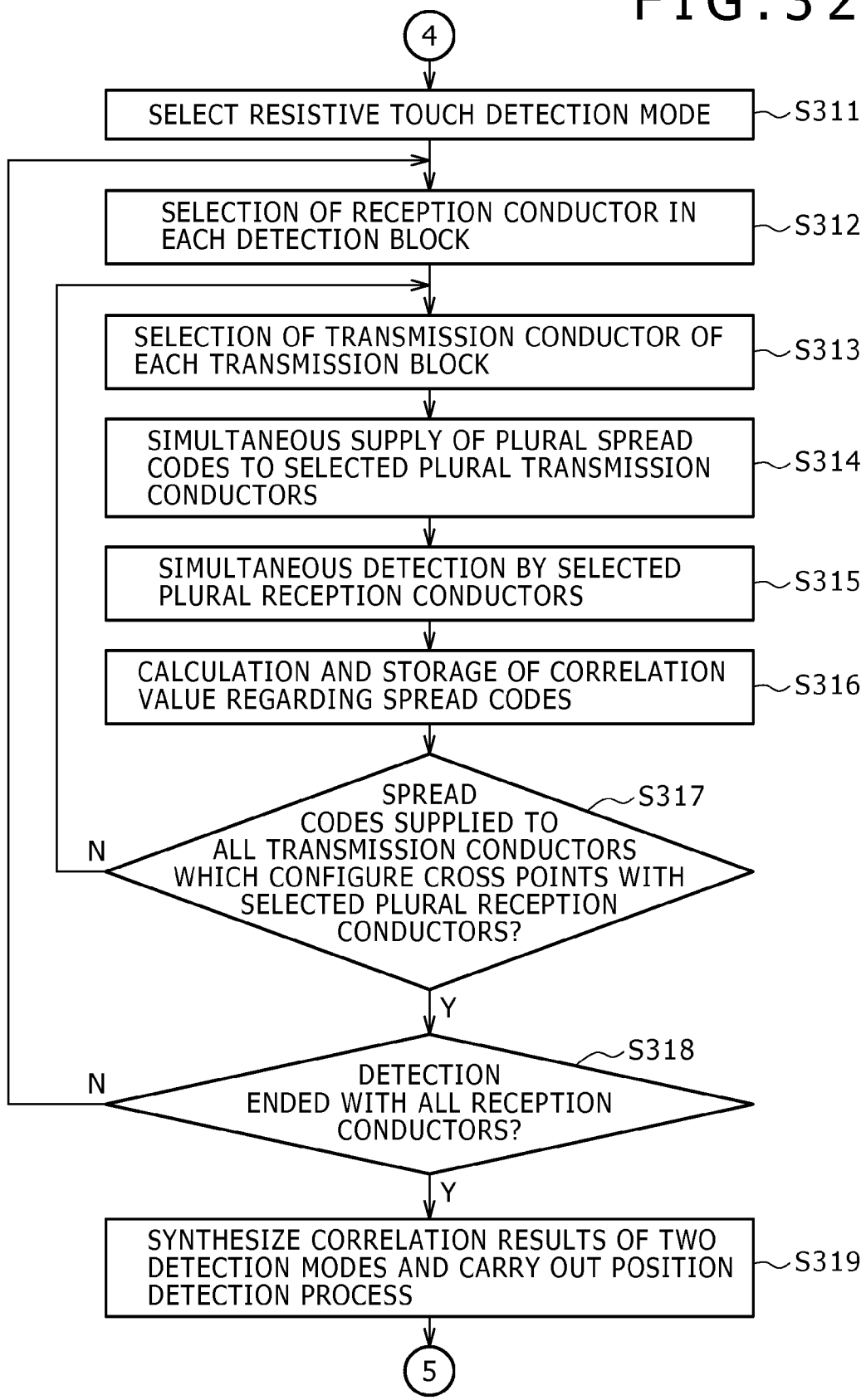
FIG. 32 is a flow chart illustrating the example of operation of the pointer detection apparatus of the third embodiment.

<First Configuration Example: FIGS. 30 to 32>

In the first configuration example of the present third embodiment, a pointer detection process of the capacitive touch detection mode and a pointer detection process of the resistive touch detection mode are executed time-divisionally to carry out both of the detection modes concurrently. In the first configuration example of the present third embodiment, the I/V conversion circuits 3201 to 3216 of the amplification circuit 32 have the configuration shown in FIG. 9 similarly as in the first embodiment. Then, the control circuit 40 has a configuration that the switch circuits 55 of the I/V conversion circuits 3201 to 3216 are changed (switched) by the switch control signal SW1.

As shown in FIG. 30, the position detection circuit 34 is configured from a calculation processing circuit 35 and an outputting circuit 360. Further, a mode changeover circuit 37 is interposed between the calculation processing circuit 35 and the outputting circuit 360. Further, in the present third embodiment, the configuration of the outputting circuit 360 is made different from that of the position detection circuit 34 in the first embodiment. It is to be noted that the configuration of the other part is similar to that of the first embodiment.

As shown in FIG. 30, the outputting circuit 360 in the present example includes, in addition to the storage circuit 36M and the position calculation circuit 361, a capacitive touch detection mode memory 362 and a resistive touch detection mode memory 363 of a configuration which has storage addresses corresponding to all cross points of the sensor section 100 similarly to the storage circuit 36M, and a synthesis processing circuit 364.

Further, the capacitive touch detection mode memory 362 and the resistive touch detection mode memory 363 are connected at an individual output terminal thereof to two input terminals of the synthesis processing circuit 364, and the synthesis processing circuit 364 is connected at an output terminal thereof to an input terminal of the storage circuit 36M.

The mode switching circuit 37 is formed from 16 switch circuits 3701 to 3716 individually corresponding to the detection blocks $DB_1$ to $DB_{16}$. The switch circuits 3701 to 3716 are connected at an individual input terminal thereof to output terminals of the 16 correlation value calculation circuits 3501 to 3516 of the calculation processing circuit 35.

The switch circuits 3701 to 3716 have a C side terminal (output terminal) and an R side terminal (output terminal). The switch circuits 3701 to 3716 are connected at the individual C side terminal thereof to an input terminal of the capacitive touch detection mode memory and at the individual R side terminal thereof to an input terminal of the resistive touch detection mode memory 363. Further, the switch circuits 3701 to 3716 are changed (switched) to the C side output terminal when the detection mode is the capacitive touch detection mode but to the R side output terminal when the detection mode is the restive touch detection mode in accordance with the switch control signal SW1 from the control circuit 40, and the I/V conversion circuits 3201 to 3216 are changed (switched) similarly but in synchronism with the switching by the switch circuits 55.

In the first configuration example of the present third embodiment, since the detection mode is switched time-divisionally between the capacitive touch detection mode and the resistive touch detection mode, the switch control signal SW1 is used as a control signal for switching the detection mode between the two detection modes. In the present example, at a point of time at which pointer detection regarding all cross points of the sensor section 100 in the capacitive touch detection mode is completed, the detection mode is switched to the resistive touch detection mode. Then, the control circuit 40 supplies the switch control signal SW1 to the switch circuits 55 of the I/V conversion circuits 3201 to 3216 and the switch circuits 3701 to 3716 to switch the switch circuits 55 and the switch circuits 3701 to 3716 to the R side terminal.

Further, at the point of time at which the pointer detection with regard to all cross points of the sensor section 100 in the resistive touch detection mode is completed, the control circuit 40 switches the detection mode to the capacitive touch detection mode. Then, the control circuit 40 supplies the switch control signal SW1 to the switch circuits 55 of the I/V conversion circuits 3201 to 3216 and the switch circuits 3701 to 3716 to switch the switch circuits 55 and the switch circuits 3701 to 3716 to the C side terminal. Therefore, every time a point of time at which the pointer detection with regard to all cross points of the sensor section 100 in one of the detection modes of the capacitive touch detection mode and the resistive touch detection mode is completed, the control circuit 40 controls the control mode so as to switch to the other one of the two detection modes.

Then, since the switch circuits 3701 to 3716 are switched to the C side terminal as described above, when the detection mode is the capacitive touch detection mode, the correlation values calculated by the correlation value calculation circuits 3501 to 3516 are written into the capacitive touch detection mode memory 362.

Further, since the switch circuits 3701 to 3716 are switched to the R side terminal as described above, when the detection mode is the resistive touch detection mode, the correlation values calculated by the correlation value calculation circuits 3501 to 3516 are written into the resistive touch detection mode memory 363.

Then, every time a pair of the capacitive touch detection mode and the resistive touch detection mode is completed, that is, for every two cycles of the start signal ST, the synthesis processing circuit 364 synthesizes the stored contents of the capacitive touch detection mode memory 362 and the stored contents of the resistive touch detection mode memory 363.

The synthesis process of the synthesis processing circuit 364 is carried out, for example, in the following manner. In particular, the synthesis processing circuit 364 refers to the stored contents of the capacitive touch detection mode memory 362 to search for a correlation value lower than the reference value ref. Then, if a correlation value lower than the reference value ref is found, then the synthesis processing circuit 364 writes the correlation value into an address of the storage circuit 36M that is the same as the address of the capacitive touch detection mode memory 362 in which the correlation value is written.

Further, the synthesis processing circuit 364 refers to the stored contents of the resistive touch detection mode memory 363 to search for a correlation value higher than the reference value ref. Then, if a correlation value higher than the reference value ref is found, then the synthesis processing circuit 364 writes the correlation value into an address of the storage circuit 36M that is the same as the address of the capacitive touch detection mode memory 362 in which the correlation value is written.

Then, the synthesis processing circuit 364 writes a correlation value (=reference value ref) which signifies no existence of a pointer into the other addresses of the storage circuit 36M. It is to be noted that, where an offset value is subtracted from the correlation values upon writing of the correlation values into the capacitive touch detection mode memory 362 and the resistive touch detection mode memory 363, the reference value ref is ref=0 similarly as in the embodiment described hereinabove.

When writing of the correlation values at all cross points into the storage circuit 36M is completed, the control circuit 40 clears the stored contents of the capacitive touch detection mode memory 362 and the resistive touch detection mode memory 363 in preparation for subsequent storage of correlation values.

Then, in the first configuration example of the present third embodiment, at a point of time at which the stored contents of all cross points of the storage circuit 36M are rewritten, that is, after every two cycles of the start signal ST, the position calculation circuit 361 carries out processing that is the same as that in the case of the first embodiment described hereinabove for the stored contents of the storage circuit 36M to generate output data and outputs the output data.

An example of a flow of general processing operation by the first configuration example of the third embodiment is described with reference to a flow chart of FIG. 31 and another flow chart of FIG. 32 which continues from the flow chart of FIG. 31.

The control circuit 40 starts the processing of the flow charts in FIGS. 31 and 32 at a point of time at which a first start signal ST is generated. Then, the control circuit 40 executes one cycle of processing operation regarding all of the cross points of the pointing input screen 100S while switching the detection mode every time a second start signal ST is generated. Then, the control circuit 40 controls the outputting circuit 36 to carry out a position detection process for every two start signals ST and controls the outputting circuit 36 to output the output data of pointer detection.

First, if the transmission load signal $St_{load}$ generated one cycle of the clock signal CLK after the control circuit 40 outputs the start signal ST is supplied to the transmission signal supplying circuit 21, then the transmission signal supplying circuit 21 generates 16 kinds of spread codes $C_1$ to $C_{16}$ synchronized with the transmission load signal $St_{load}$ and the clock signal CLK, and starts supply of the generated codes to the transmission conductor selection circuits 22 (step S301).

Then, the control circuit 40 selects the capacitive touch detection mode as the detection mode, and switches the switch circuits 55 of the I/V conversion circuits 3201 to 3216 to the detecting capacitor 52 side with the switch control signal SW1 and switches the switch circuits 3701 to 3716 to the C side terminal (step S302).

Then, the control circuit 40 carries out switching control of the switch circuits 3101 to 3116 of the reception conductor selection circuit 31 in accordance with the switch control signal SW3 generated based on the transmission load signal $St_{load}$ to select one reception conductor 12X from within each of the detection blocks $DB_1$ to $DB_{16}$ (step S303).

Further, the control circuit 40 carries out switching control of the switch circuits 2201 to 2216 of the transmission conductor selection circuit 22 in accordance with the switch control signal SW2 generated based on the transmission load signal $St_{load}$ to select one transmission conductor 11Y from within each of the transmission blocks $TB_1$ to $TB_{16}$ (step S304).

Consequently, the 16 kinds of spread codes $C_1$ to $C_{16}$ are supplied in synchronism with each other at the same time to the 16 transmission conductors 11Y selected by the transmission conductor selection circuit 22 (step S305). Then, the reception conductor selection circuit 31 acquires reception signals from the 16 reception conductors 12X selected by the reception conductor selection circuit 31 as output signals $S_1$ to $S_{16}$. The output signals $S_1$ to $S_{16}$ are supplied to the correlation value calculation circuits 3501 to 3516 of the calculation processing circuit 35, respectively, through the amplification circuit 32 and the A/D conversion circuit 33 (step S306).

Then, correlation calculation between the digital sample data and the correlation value calculating codes $C_1'$ to $C_{16}'$ is carried out by the correlation value calculation circuits 3501 to 3516, respectively, and correlation values obtained as a result of the correlation calculation are written into the capacitive touch detection mode memory 362 of the outputting circuit 36 through the correlation value storage circuit 35d (step S307).

The control circuit 40 determines whether or not supply of the spread codes to all of the transmission conductors 11Y which form the cross points with the selected reception conductors 12X is completed (step S308). If it is determined at step S308 that the supply of the spread codes has not been completed, then the processing returns to step S304 and then the processes at and after step S304 are repetitively carried out. Since a transmission block is formed of four transmission conductors 12Y, the number of sets of plural transmission conductors to be selected is four. Accordingly, it is determined at step S308 whether or not the processes from step S304 to step S307 have been carried out repetitively for four cycles.

Then, if it is determined at step S308 that the supply of the spread codes to all of the transmission conductors 11Y which form the cross points with the selected reception conductors 12X has been completed, then it is determined whether or not an output signal has been obtained from all of the reception conductors 12X (step S309). If it is determined at step S309 that an output signal has not been obtained from all of the reception conductors 12X, then the processing returns to step S303 and then the processes at and after step S303 are repetitively carried out. Since a detection block is configured from eight reception conductors 12X, the number of sets of plural reception conductors to be selected is eight. Accordingly, it is determined at step S309 whether or not the processes from step S303 to step S308 have been carried out repetitively for eight times.

If it is determined at step S309 that supply of a transmission signal to all of the transmission conductors 11Y has been carried out and an output signal has been obtained from all of the reception conductors 12X, then the control circuit 40 generates a next start signal ST and switches the detection mode to the resistive touch detection mode. In particular, the control circuit 40 switches the switch circuits 55 of the I/V conversion circuits 3201 to 3216 to the detecting resistor 54 side and switches the switch circuits 3701 to 3716 to the R side terminal with the switch control signal SW1 (step S311 in FIG. 32).

Then, the control circuit 40 carries out switching control of the switch circuits 3101 to 3116 of the reception conductor selection circuit 31 in accordance with the switch control signal SW3 generated based on the transmission load signal $St_{load}$ to select one reception conductor 12X from within each of the detection blocks $DB_1$ to $DB_{16}$ (step S312).

Further, the control circuit 40 carries out switching control of the switch circuits 2201 to 2216 of the transmission conductor selection circuit 22 in accordance with the switch control signal SW2 generated based on the transmission load signal $St_{load}$ to select one transmission conductor 11Y from within each of the transmission blocks $TB_1$ to $TB_{16}$ (step S313).

Consequently, the 16 kinds of spread codes $C_1$ to $C_{16}$ are supplied in synchronism with each other at the same time to the 16 transmission conductors 11Y selected by the transmission conductor selection circuit 22 (step S314). Then, the reception conductor selection circuit 31 acquires reception signals from the 16 reception conductors 12X selected by the reception conductor selection circuit 31 as output signals $S_1$ to $S_{16}$. The output signals $S_1$ to $S_{16}$ are supplied to the correlation value calculation circuits 3501 to 3516 of the calculation processing circuit 35, respectively, through the amplification circuit 32 and the A/D conversion circuit 33 (step S315).

Then, correlation calculation between the digital sample data and the correlation value calculating codes $C_1'$ to $C_{16}'$ is carried out by the correlation value calculation circuits 3501 to 3516, respectively, and correlation values obtained as a result of the correlation calculation are written into the resistive touch detection mode memory 363 of the outputting circuit 36 through the correlation value storage circuit 35d (step S316).

The control circuit 40 determines whether or not supply of the spread codes to all of the transmission conductors 11Y which form the cross points with the selected reception conductors 12X has been carried out (step S317). If it is determined at step S317 that the supplying of the spread codes has not been completed, then the processing returns to step S313 and then the processes at and after step S313 are repetitively carried out. Since the number of sets of plural transmission conductors to be selected is four, it is determined at step S317 whether or not the processes from step S313 to step S316 have been carried out repetitively for four cycles.

Then, if it is determined at step S317 that supply of the spread codes to all of the transmission conductors 11Y which form the cross points with the selected reception conductors 12X has been completed, then it is determined whether or not supply of a transmission signal to all of the transmission conductors 11Y has been carried out and an output signal has been acquired from all of the reception conductors 12X (step S318). If it is determined at step S318 that an output signal has not been acquired from all of the reception conductors 12X, then the processing returns to step S312 and then the processes at and after step S312 are repetitively carried out. Since the number of sets of plural reception conductors to be selected is eight, it is determined at step S318 whether or not the processes from step S312 to step S317 have been carried out repetitively for eight times.

On the other hand, if it is determined at step S318 that the supply of a transmission signal to all of the transmission conductors 11Y has been carried out and an output signal has been obtained from all of the reception conductors 12X, then the synthesis processing circuit 364 of the outputting circuit 36 refers to and synthesizes the stored contents of the capacitive touch detection mode memory 362 and the resistive touch detection mode memory 363 with each other and then writes a result of the synthesis into the storage circuit 36M. Then, the position calculation circuit 361 carries out, regarding the stored contents of the storage circuit 36M, a position detection process and a generation process of output data of a result of the pointer detection as described above and then outputs the generated output data (step S319).

The control circuit 40 returns the processing to step S302 after the process at step S319 and then starts pointer detection by the capacitive touch detection mode again. Then, the control circuit 40 repetitively carries out the processes at and after step S302 described above.

In this manner, in the first configuration example of the present third embodiment, output data of a pointer detection result are obtained in a unit of two cycles of the start signal ST.

It is to be noted that, in the first configuration example of the present third embodiment described above, the three memories including the capacitive touch detection mode memory 362, resistive touch detection mode memory 363, and storage circuit 36M are used. However, if an overwritable memory is used for the storage circuit 36M and a configuration described below is applied, then a configuration which uses only one memory (that is, the storage circuit 36M) can be achieved while omitting the capacitive touch detection mode memory 362 and the resistive touch detection mode memory 363.

In particular, the position detection circuit 34 carries out, in the first half of a unit of two cycles of the start signal ST, calculation of correlation values for pointer detection in one of the detection modes of the capacitive touch detection mode and the resistive touch detection mode and writes the calculated correlation values into the storage circuit 36M.

Then, the position detection circuit 34 carries out, in the latter half of the unit of two cycles of the start signal ST, calculation of correlation values for pointer detection in the other detection mode. Then, prior to writing the calculated correlation values into the storage circuit 36M, the position detection circuit 34 refers to and compares the calculated correlation values and the reference value ref with each other and determines, based on a result of the comparison, whether or not writing into the storage circuit 36M should be executed.

In particular, if a correlation value calculated in the other detection mode which is to be newly written has a value equal to the reference value ref, then the correlation value is not written into a corresponding address of the storage circuit 36M. On the other hand, if the correlation value calculated in the other detection mode which is to be newly written has a value different from the reference value ref, then the position detection circuit 34 refers to the correlation value already written in the corresponding address of the storage circuit 36M and, if the correlation value referred to is equal to the reference value ref, overwrites it with the correlation value to be newly written. If the correlation value at the corresponding address has a value different from the reference value ref, which is indicative of presence of a pointer, then the position detection circuit 34 leaves the correlation value already written and does not carry out overwriting of the correlation value.

By controlling the writing of results of calculation in the two detection modes into the storage circuit 36M in such a manner as described above, only the storage circuit 36M needs to be provided, that is, the number of memories for all cross points to be provided in the position detection circuit 36 may be only one.

It is to be noted that, while, in the configuration example 1 described above, the detection mode is switched between the capacitive touch detection mode and the resistive touch detection mode for every start signal ST, the switching timing of the detection mode is not limited to this configuration. For example, a period of one cycle of the clock signal CLK may be divided into two divisional periods for the capacitive touch detection mode and the resistive touch detection mode such that, for every ½ cycle of the clock signal CLK, the detection mode may be switched alternately between the capacitive touch detection mode and the resistive touch detection mode. It is to be noted that, in this instance, the circuit of the reception section 300 is configured so as to operate at a clock rate equal to twice that of the embodiments described hereinabove.

Alternatively, the period within which 16 spread codes are supplied at the same time in synchronism with each other to a plurality of transmission conductors may be set equal to two cycles of the spread codes such that the detection mode is switched between the capacitive touch detection mode and the resistive touch detection mode alternately between the first cycle as the first half and the second cycle as the latter half.

Figure 33:
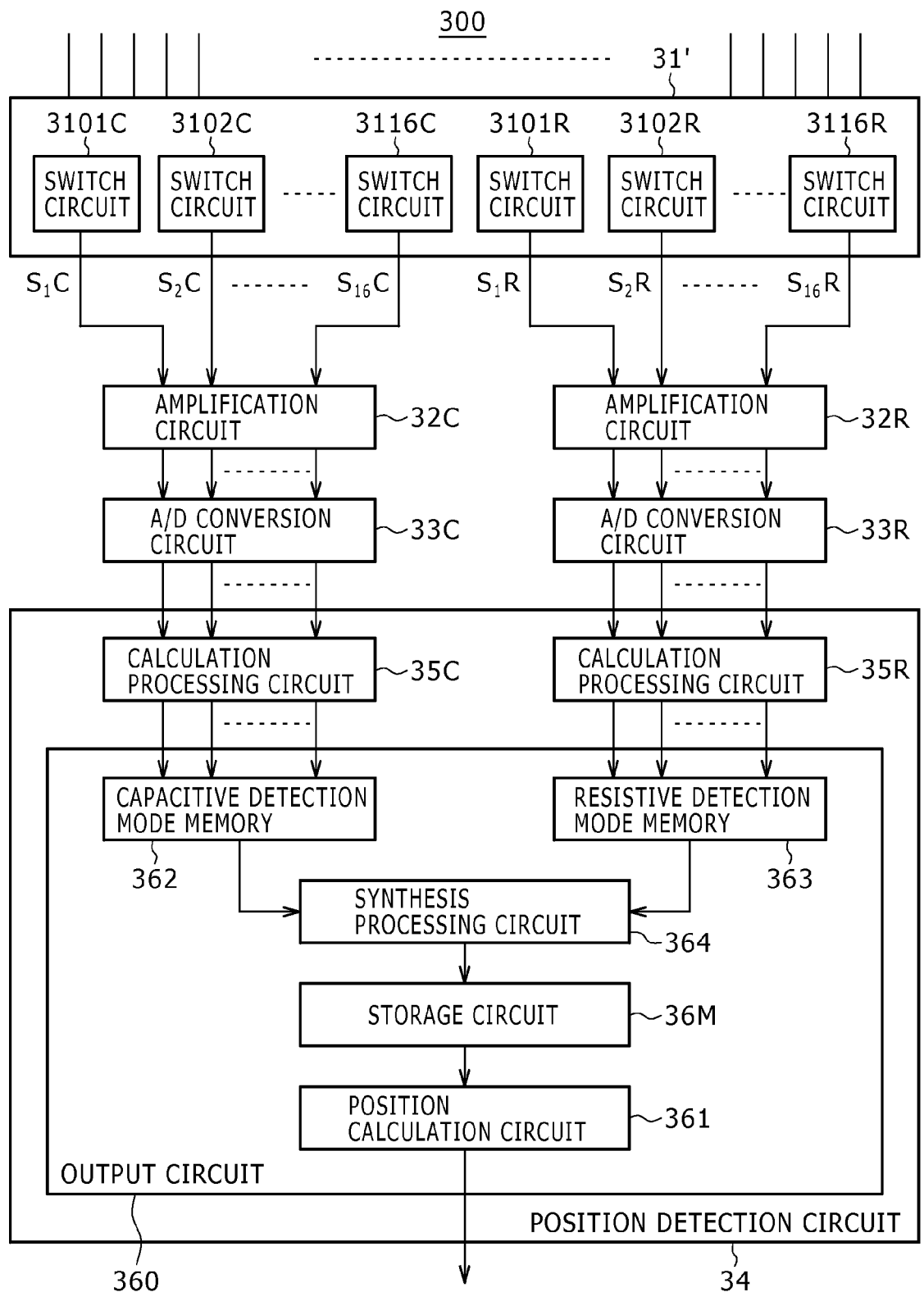
FIG. 33 is a block diagram showing an example of a configuration of main part of another example of the third embodiment of the pointer detection apparatus according to the present invention.

<Second Configuration Example: FIG. 33>

The second configuration example of the third embodiment is configured such that a pointer detection process in the capacitive touch detection mode and a pointer detection process in the resistive touch detection mode are carries out always concurrently without being executed time-divisionally.

FIG. 33 shows an example of a configuration of the reception section 300 of the pointer detection apparatus of the second configuration example of the present third embodiment. It is to be noted that the configuration of the other part is similar to that of the first embodiment.

As shown in FIG. 33, in the present second configuration example, the reception section 300 includes, for the capacitive touch detection mode, an amplification circuit 32C, an A/D conversion circuit 33C and a calculation processing circuit 35C, and includes, for the resistive touch detection mode, an amplification circuit 32R, an A/D conversion circuit 33R and a calculation processing circuit 35R. Further, the position detection circuit 34 includes an outputting circuit 360 similarly as in the first configuration example.

The reception conductor selection circuit 31' in the present second configuration example includes two sets of the 16 switch circuits described hereinabove with reference to FIG. 14 in regard to the first embodiment for the capacitive touch detection mode and for the resistive touch detection mode. In particular, in the reception conductor selection circuit 31', switch circuits 3101C to 3116C are for the capacitive touch detection mode, and switch circuits 3101R to 3116R are for the resistive touch detection mode.

Further, the switch circuits 3101C to 3116C output respective output signals (current signals) $S_1C$ to $S_{16}C$ each from one reception conductor selected from among the reception conductors of a corresponding one of the detection blocks $DB_1$ to $DB_{16}$. Also the switch circuits 3101R to 3116R output respective output signals (current signals) $S_1R$ to $S_{16}R$ each from one reception conductor from among the reception conductors of a corresponding one of the detection blocks $DB_1$ to $DB_{16}$. It is to be noted, however, the switch circuits 3101C to 3116C and the switch circuits 3101R to 3116R are changed over (switched) in accordance with switching control signals from the control circuit 40 so as not to select the same reception conductor at the same time.

In particular, for example, if a case in which the switch circuit 3101C and the switch circuit 3101R for selecting one reception conductor from within the detection block $DB_1$ is taken as an example, then the switch circuit 3101C and the switch circuit 3101R are switched such that, when the switch circuit 3101C selects the reception conductor $12X_1$, the switch circuit 3101R selects the reception conductor $12X_2$ displaced by one conductor distance from the reception conductor $12X_1$, and then, when the switch circuit 3101C subsequently selects the reception conductor $12X_2$, the switch circuit 3101R selects the reception conductor $12X_3$ at a position displaced by one conductor distance from the reception conductor $12X_2$, and so forth.

The amplification circuit 32C and the amplification circuit 32R individually include 16 I/V conversion circuits (not shown) which amplify and convert the output signals (current signals) $S_1C$ to $S_{16}C$ and $S_1R$ to $S_{16}R$ of the reception conductor selection circuit 31' into voltage signals similarly to the amplification circuit 32 of the first embodiment described hereinabove. In this instance, the 16 I/V conversion circuits of the amplification circuit 32C each have the configuration for the electrostatic coupling method shown in FIG. 5. Meanwhile, the 16 I/V conversion circuits of the amplification circuit 32R each have the configuration for the resistance value method shown in FIG. 8.

The output signals $S_1C$ to $S_{16}C$ of the reception conductor selection circuit 31' are inputted to the 16 I/V conversion circuits of the amplification circuit 32C, and the output signals $S_1R$ to $S_{16}R$ are inputted to the amplification circuit 32R.

The A/D conversion circuits 33C and 33R each include 16 A/D converters for converting output signals of the 16 I/V conversion circuits of the amplification circuits 32C and 32R into digital sample data synchronized with the clock signal CLK similarly to the A/D conversion circuit 33 in the first and second embodiments described hereinabove.

In the present example, the 16 I/V conversion circuits of the amplification circuit 32C are connected at an output terminal thereof to input terminals of the 16 A/D converters of the 16 A/D conversion circuit 33C. Meanwhile, the 16 I/V conversion circuits of the amplification circuit 32R are connected at an output terminal thereof to input terminals of the 16 A/D converters of the A/D conversion circuit 33R.

The calculation processing circuits 35C and 35R individually include 16 correlation value calculation circuits each including a shift register of 16 stages corresponding to 16 chips of the spread codes on the input side thereof similarly to the calculation processing circuit 35 in the first and second embodiments described hereinabove.

In the present example, the 16 A/D converters of the A/D conversion circuit 33C are connected at an output terminal thereof to input terminals of the 16 correlation value calculation circuits of the calculation processing circuit 35C. Meanwhile, the 16 A/D converters of the A/D conversion circuit 33R are connected at an output terminal thereof to input terminals of the 16 correlation value calculation circuits of the calculation processing circuit 35R.

Outputs of the 16 correlation value calculation circuits of the calculation processing circuit 35C are supplied to the capacitive touch detection mode memory 362, and outputs of the 16 correlation value calculation circuits of the calculation processing circuit 35R are supplied to the resistive touch detection mode memory 363.

Since the present example is configured in such a manner as described above, the output signals $S_1C$ to $S_{16}C$ of the reception conductor selection circuit 31' are amplified and converted into voltage signals by the 16 I/V conversion circuits of the amplification circuit 32C. The output signals from the 16 I/V conversion circuits of the amplification circuit 32C are converted into digital sample data by the 16 A/D converters provided in the A/D conversion circuit 33C.

Then, the digital sample data from the A/D conversion circuit 33C are transferred to and retained into the shift registers individually provided in the 16 correlation value calculation circuits of the calculation processing circuit 35C.

Then, the 16 correlation value calculation circuits of the calculation processing circuit 35C carry out correlation calculation of the digital sample data retained in the respective shift registers and the 16 correlation value calculating codes as described hereinabove. Then, the calculated correlation values are written into the capacitive touch detection mode memory 362 of the outputting circuit 360.

In this manner, the correlation values at all cross points of the sensor section 100 are written as a result of detection of a pointer by the electrostatic coupling method into the capacitive touch detection mode memory 362 per a period corresponding to one cycle of the start signal ST.

Concurrently with this, also into the resistive touch detection mode memory 363, correlation values of all cross points of the sensor section 100 are written as a result of detection of a pointer by the resistance film method per a period of one cycle of the start signal ST.

In particular, the output signals $S_1R$ to $S_{16}R$ of the reception conductor selection circuit 31 are amplified and converted into voltage signals by the 16 I/V conversion circuits of the amplification circuit 32R. The output signals from the amplification circuit 32 are converted into digital sample data by the 16 A/D converters provided in the A/D conversion circuit 33R.

Then, the digital sample data from the A/D conversion circuit 33R are transferred to and retained into the shift registers provided in the 16 correlation value calculation circuits of the calculation processing circuit 35R.

Then, the 16 correlation value calculation circuits of the calculation processing circuit 35R carry out correlation calculation between the digital sample data retained in the shift registers and the 16 correlation value calculating codes as described hereinabove and write the calculated correlation values into the resistive touch detection mode memory 363 of the outputting circuit 360.

If the correlation values corresponding to all cross points of the sensor section 100 are written into the capacitive touch detection mode memory 362 and the resistive touch detection mode memory 363 in this manner, then the synthesis processing circuit 364 carries out a synthesis process for the correlation values stored in the capacitive touch detection mode memory 362 and the resistive touch detection mode memory 363 in a similar manner as in the case of the first configuration example of the third embodiment described hereinabove. Then, the synthesis processing circuit 364 writes the correlation values after the synthesis process into the storage circuit 36M in a similar manner as in the case of the first configuration example of the third embodiment described hereinabove.

The correlation values of a result of the synthesis process of the correlation values stored in the capacitive touch detection mode memory 362 and the resistive touch detection mode memory 363 in this manner are stored into the storage circuit 36M per every one cycle of the start signal ST.

The position calculation circuit 361 generates output data of the position detection process and the pointer detection from the correlation values stored in the storage circuit 36M per every one cycle of the start signal ST in accordance with a control signal from the control circuit 40 and outputs the output data.

It is to be noted that, also in the second configuration example of the third embodiment described above, if an overwritable memory is used for the storage circuit 36M and a synthesis process of the correlation values calculated in the capacitive touch detection mode and the correlation values calculated in the resistive touch detection mode is carried out in the following manner similarly as in the first configuration example, then a configuration can be achieved which uses a single memory (that is, the storage circuit 36M) for all cross points while omitting the capacitive touch detection mode memory 362 and the resistive touch detection mode memory 363.

In other words, the synthesis processing circuit 364 carries out a synthesis process of outputs of correlation values from the calculation processing circuit 35C and outputs of correlation values from the calculation processing circuit 35R and then writes results of the synthesis process into the storage circuit 36M.

In this instance, the synthesis processing circuit 364 refers to and compares a correlation value calculated in the capacitive touch detection mode from the calculation processing circuit 35C and a correlation value calculated in the resistive touch detection mode from the calculation processing circuit 35R with regard to the same cross point and determines a correlation value to be written based on a result of the comparison.

In particular, if both of a correlation value calculated in the capacitive touch detection mode and a correlation value calculated in the resistive touch detection mode with regard to the same cross point are equal to the reference value ref, then the reference value ref is written as a correlation value at the cross point into the storage circuit 36M.

On the other hand, if one of the two correlation values has a value different from the reference value ref in a direction corresponding to the detection in such a manner that the correlation value calculated in the capacitive touch detection mode has a value equal to or lower than the reference value ref or the correlation value calculated in the resistive touch detection mode has a value higher than the reference value ref, then that correlation value is written as a correlation value at the cross point into the storage circuit 36M.

With the second configuration of the present third embodiment, a result of pointer detection is obtained for each cycle of the start signal ST similarly as in the first embodiment. Further, detection of a pointer at each of a plurality of different cross points on the pointing input surface 100S can be carried out, and a pointer in a contacting or hovering state and another pointer which presses a cross point can be detected at the same time.

[Fourth Embodiment: Example of an Improved Configuration Where an Hadamard Code is Used as a Spread Code]

The present fourth embodiment is an example of an improvement of the pointer detection apparatus of the first embodiment.

In the pointer detection apparatus of the first embodiment, a transmission signal from the transmission section 200 is supplied to a transmission conductor 11Y, and a reception signal (current signal) corresponding to the transmission signal (voltage signal) is obtained from a reception conductor 12X which spatially crosses with the transmission conductor 11Y. Then, since the current value of the reception signal when a pointer does not exist above or on the pointing input surface 100S and the current value of the reception signal when a pointer exists above or on the sensor section 100 as in a hovering state or in a contacting state are different from each other, a current variation of the reception signal is detected to detect a pointer above or on the pointing input surface 100S.

In this instance, since the reception signal obtained from the reception conductor 12X in the capacitive touch detection mode has a low level, it is important for an I/V conversion circuit of the amplification circuit 32 to be configured such that a high gain (amplitude gain) can be obtained sufficiently.

Incidentally, the embodiment described above is configured such that a plurality of transmission signals are supplied at the same time to a plurality of transmission conductors and the reception section 300 separates and detects reception signal components corresponding to the plural transmission signals so that high-speed pointer detection can be carried out.

Further, in the embodiment described above, spread codes are used as the plural transmission signals, and particularly, Hadamard codes which are orthogonal to each other and have a high degree of separation are used as the spread codes. For example, in the embodiment described above, as shown also in FIG. 34(A), an Hadamard matrix of 16 rows×16 columns is generated and Hadamard codes in each row of the Hadamard matrix are used as 16 spread codes $C_1$ to $C_{16}$.

Further, in the embodiment described above, the 16 spread codes $C_1$ to $C_{16}$ are supplied at the same time in synchronism with each other to the 16 transmission conductors 11Y. In particular, in FIG. 34(A), the chips $PN_1, PN_2, \ldots, PN_{16}$ of the 16 spread codes $C_1$ to $C_{16}$ are supplied at the same time in synchronism with each other to the 16 transmission conductors.

Accordingly, from a reception conductor 12X which crosses with the 16 transmission conductors 11Y, a signal corresponding to the sum of data of the chips $PN_1, PN_2, \ldots, PN_{16}$ of the 16 spread codes $C_1$ to $C_{16}$ is obtained as a reception signal. In other words, a current signal equal to the sum of data at the same chip positions in the column direction of the Hadamard matrix of FIG. 34(A) is obtained from each of the reception conductors 12X for each one chip of the spread codes $C_1$ to $C_{16}$ of the transmission signals.

While the 16 chips of the spread code $C_1$ in the top row from among the spread codes $C_1$ to $C_{16}$ formed from the 16 Hadamard codes of the example of FIG. 34(A) are all "1s," the 16 chips in the other spread codes $C_2$ to $C_{16}$ includes eight "1s" and eight "−1s."

Further, the Hadamard matrix in FIG. 34(A) is a symmetric matrix, and code strings in a row direction and code strings in a column direction are the same as each other. Accordingly, the code strings in the column direction are also Hadamard codes, and as can be recognized from FIG. 34(A), at a timing of the first chips $PN_1$ of the 16 spread codes $C_1$ to $C_{16}$, a current signal corresponding to the sum of 16 "1s" is obtained from one reception conductor 12X. Further, at each of timings of the second and succeeding chips $PN_2$ to $PN_{16}$ from among the 16 spread codes $C_1$ to $C_{16}$, a current signal of the zero level which is the sum of eight "1s" and eight "−1s" is obtained from one reception conductor 12X.

It is necessary for the amplification gain of the I/V conversion circuits of the amplification circuit 32 to be set such that an output signal corresponding to the level of a current signal to be detected is obtained at timings of all chips without causing saturation. To this end, where the Hadamard codes of 16 chips of FIG. 34(A) are used as the spread codes $C_1$ to $C_{16}$, it is necessary also to set the amplification gain of the I/V conversion circuits of the amplification circuit 32 to a comparatively low amplification ratio with which the current signal corresponding to the sum of 16 "1s" at the timing of the first chip $PN_1$ is not placed into a saturation state. However, where the amplification gain is set to such a low amplification ratio as just described, there is the possibility that the amplification gain of the I/V conversion circuits of the amplification circuit 32 may be insufficient to detect a current variation of a low level in the electrostatic coupling method.

Therefore, in the present fourth embodiment, 16 spread codes $MC_1$ to $MC_{16}$ (refer to FIG. 34(B)) each including 15 chips are used as spread codes to be generated from the transmission signal supplying circuit 21, without using the first one chip $PN_1$ which is "1" in all of the 16 spread codes $C_1$ to $C_{16}$ from within the Hadamard matrix of 16 rows×16 columns shown in FIG. 34(A).

In particular, as can be seen from FIG. 34(B), the 16 spread codes $MC_1$ to $MC_{16}$ include the second and succeeding chips $PN_2$ to $PN_{16}$ of the 16-chip spread codes $C_1$ to $C_{16}$ of FIG. 34(A) as 15 chips $PN_1$ to $PN_{15}$ thereof. Accordingly, at the timing of each of the 15 chips $PN_1$ to $PN_{15}$ of the 16 spread codes $MC_1$ to $MC_{16}$, eight "1s" are supplied to eight transmission conductors 11Y and eight "−1s" are supplied to other eight transmission conductors 11Y. Therefore, from one reception conductor 12X which crosses with the sixteen transmission conductors, a current signal of the zero level which is the sum of eight "1s" and eight "−1s" is obtained. Therefore, the current signal does not exhibit such a high level as in the case of 16 chips at the timing of the top chip.

Accordingly, with the pointer detection apparatus of the present fourth embodiment, it is possible to set the amplification gain of the I/V conversion circuits of the amplification circuit 32 to a high level.

However, where the spread codes $MC_1$ to $MC_{16}$ formed without using the top chips corresponding to the column which includes all "1s" in a 16×16 Hadamard matrix as in the present example are used as the 16 spread codes to be generated from the transmission signal supplying circuit 21, it has been found that the following problem occurs. In the following, the problem is described taking a case of a 4×4 Hadamard matrix as an example. It is to be noted that this problem appears in pointer detection in accordance with the electrostatic coupling method.

Figure 35:
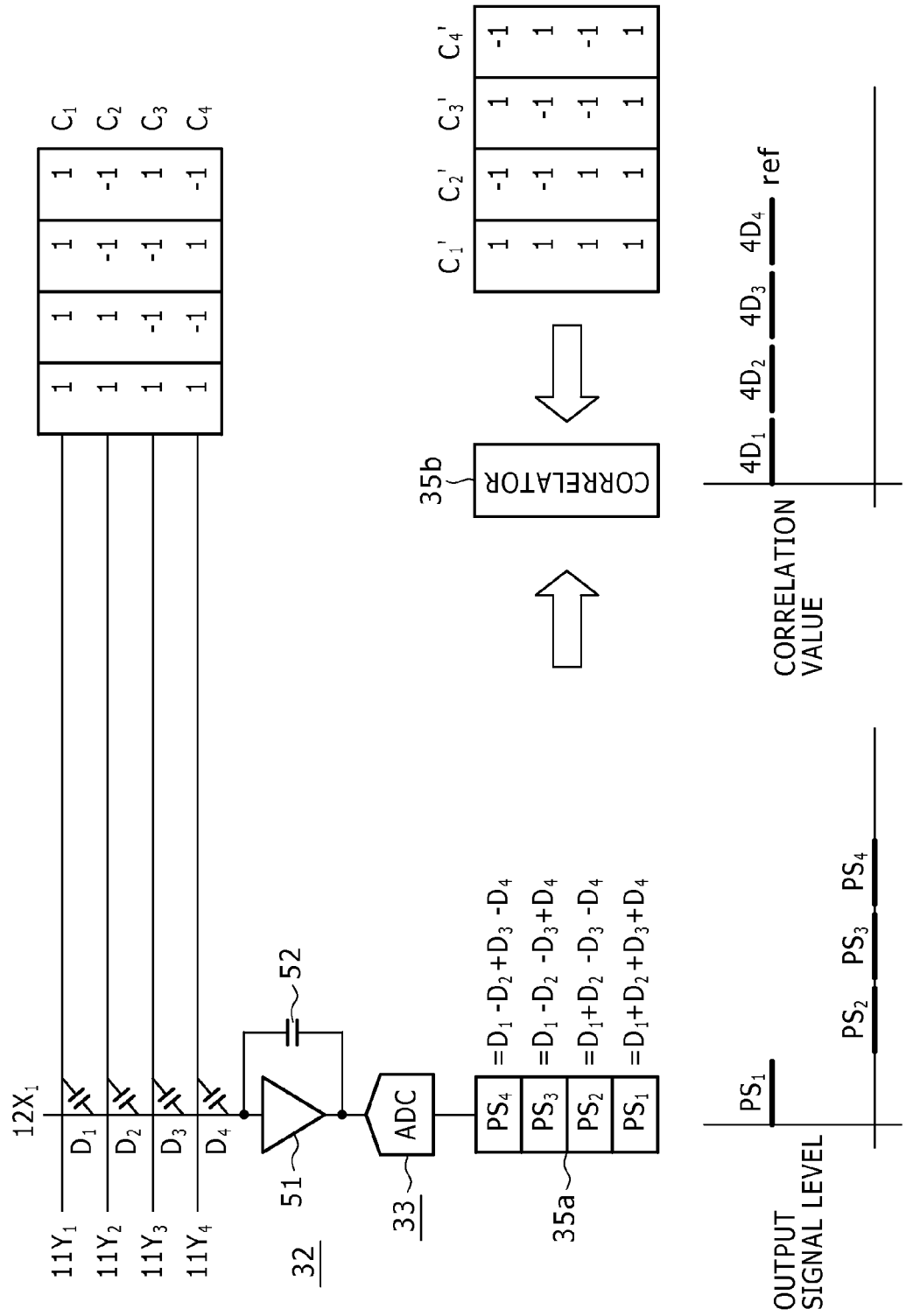
FIG. 35 is a view illustrating the fourth embodiment of the pointer detection apparatus according to the present invention.
Figure 36:
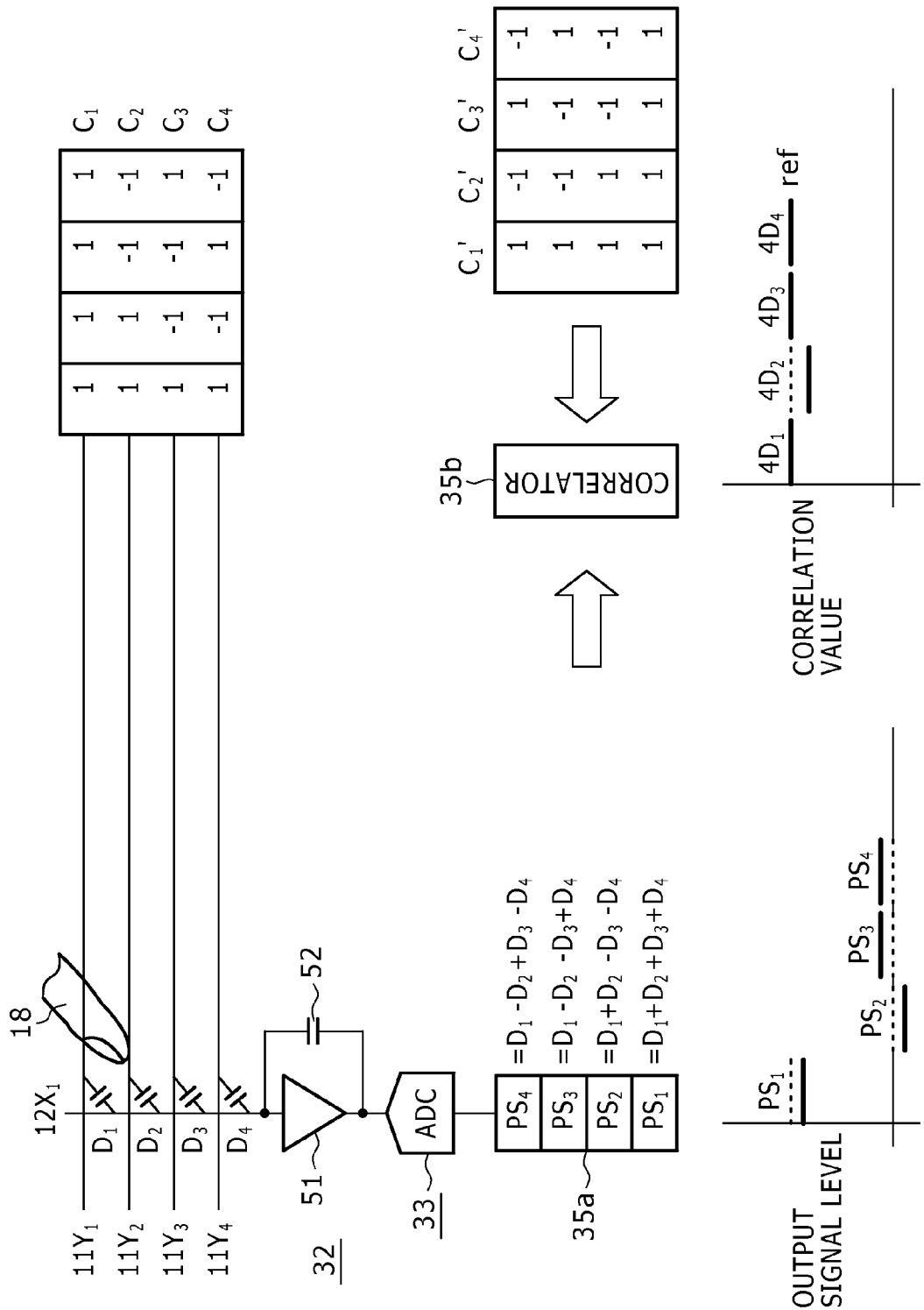
FIG. 36 is a view illustrating the fourth embodiment of the pointer detection apparatus according to the present invention.

FIGS. 35 and 36 are views illustrating a case in which spread codes $C_1$ to $C_4$ which use all of the chips in the rows of Hadamard codes of a 4×4 Hadamard matrix are supplied at the same time in synchronism with each other to the four transmission conductors $11Y_1$ to $11Y_4$, and correlation values are obtained between a reception signal (current signal) obtained from the one reception conductor $12X_1$ and the spread codes $C_1$ to $C_4$.

FIG. 35 illustrates a case in which a pointer does not exist above or on the pointing input surface 100S, and FIG. 36 illustrates another case in which a pointer 18 is, for example, in contact with the cross point between the transmission conductor $11Y_2$ and the reception conductor $12X_1$. It is to be noted that, in FIGS. 35 and 36, correlation value calculating codes for obtaining correlation values between the reception signal and the spread codes $C_1$ to $C_4$ are represented as spread codes $C_1'$ to $C_4'$ in conformity with the example described hereinabove.

In the following description, it is assumed that, when the spread codes $C_1$ to $C_4$ are applied to the transmission conductors 11Y in a state in which a pointer 18 does not exist above or on the pointing input surface 100S, signal levels $D_1$ to $D_4$ in accordance with the transmission signals supplied to the four transmission conductors $11Y_1$ to $11Y_4$ are obtained from the reception conductor $12X_1$ which cross with the four transmission conductors $11Y_1$ to $11Y_4$, respectively.

Further, in FIGS. 35 and 36, a reception signal obtained from the reception conductor $12X_1$ is supplied to an A/D conversion circuit 33 through an amplification circuit 32 which includes an I/V conversion circuit which in turn includes an operational amplifier 51 and a detecting capacitor 52. Then, the reception signal obtained from the reception conductor $12X_1$ is converted into digital sample data by the A/D conversion circuit 33 to obtain output signals $PS_1$, $PS_2$, $PS_3$ and $PS_4$ corresponding to the four chips of the spread codes $C_1$ to $C_4$ and then retained into a shift register 35a of the correlation value calculation circuit.

Then, the output signals $PS_1$ to $PS_4$ corresponding to the four chips of the spread codes retained in the shift register 35a and the correlation value calculating codes $C_1'$ to $C_4'$ are supplied to a correlator 35b, by which correlation calculation is carried out.

First, the values of the output signals $PS_1$, $PS_2$, $PS_3$ and $PS_4$ in a state in which a pointer 18 does not exist above or on the pointing input surface 100S and correlation values are described.

Since all of the first chips of the spread codes $C_1$ to $C_4$ are "1" as described hereinabove, the value of the output signal $PS_1$ becomes such a high value as shown at a left lower portion in FIG. 35. Accordingly, as described hereinabove, where the Hadamard codes of four chips are used as the spread codes $C_1$ to $C_4$, it is necessary for the amplification gain of the I/V conversion circuits of the amplification circuit 32 to be set to such a comparatively low amplification ratio with which no saturation occurs with a current signal of a high value corresponding to the sum of four "1s" at the timing of the first chip $PS_1$ described hereinabove. Therefore, if the amplification gain is set to such a low amplification ratio as just described, then there is the possibility that the amplification gain of the I/V conversion circuits of the amplification circuit 32 may become insufficient to detect a current variation of a low level in the electrostatic coupling method. It is to be noted that the value of the output signals $PS_2$, $PS_3$ and $PS_4$ corresponding to the second and succeeding chips is zero.

Further, four correlation values between the output signals $PS_1$ to $PS_4$ retained in the shift register 35a and the correlation value calculating codes $C_1'$ to $C_4'$ all exhibit a predetermined value as shown at a right lower portion of FIG. 35 because the output signal $PS_1$ assumes a value other than zero. In this instance, if it is assumed that all of the electrostatic coupling capacitances at the cross points of the transmission conductors $11Y_1$ to $11Y_4$ and the reception conductor $12X_1$ are equal to each other, then since $D_1=D_2=D_3=D_4$, the correlation values in the state in which the pointer 18 does not exist above or on the pointing input surface 100S are all equal to each other (the reference value ref described hereinabove) as described hereinabove.

Now, the values of the output signals $PS_1$, $PS_2$, $PS_3$ and $PS_4$ in a state in which a pointer 18 is, for example, in touch with the cross point between the transmission conductor $11Y_2$ and the reception conductor $12X_1$ as shown in FIG. 36 and correlation values are described.

In this instance, since the pointer 18 is in touch with the cross point between the transmission conductor $11Y_2$ and the reception conductor $12X_1$, the values of the output signals $PS_1$, $PS_2$, $PS_3$ and $PS_4$ reflect a decreasing amount of the signal level $D_2$ as shown at a left lower portion of FIG. 36.

Then, the four correlation values of the output signals $PS_1$ to $PS_4$ retained in the shift register 35a and the correlation value calculating codes $C_1'$ to $C_4'$ assume such values as shown at a right lower portion of FIG. 36. In particular, the correlation value regarding the correlation value calculating code $C_2'$ corresponding to the spread code $C_2$ decreases by an amount corresponding to a decreasing amount of the signal level $D_2$ from the reference value ref while the other three correlation values are equal to the reference value ref.

In this instance, since a component which reflects the decreasing amount of the signal level $D_2$ appearing in each of the digital sample data $PS_1$, $PS_3$ and $PS_4$ is canceled upon calculation of the correlation values with the correlation value calculating codes $C_1'$, $C_3$ and $C_4'$, the component does not appear with the correlation values, and the correlation values are equal to the reference value ref. Meanwhile, the correlation value regarding the correlation value calculating code $C_2'$ corresponding to the spread code $C_2$ becomes lower than the reference value ref by an amount corresponding accurately to the decreasing amount of the signal level $D_2$.

Accordingly, if the reference value ref which is a correlation value in the state in which the pointer 18 does not exist above or on the pointing input surface 100S is subtracted from the calculated correlation values, then the correlation value regarding only the correlation value calculating code $C_2'$ corresponding to the spread code $C_2$ assumes a negative value which corresponds accurately to the decreasing amount of the signal level $D_2$.

In order to eliminate the problem that the amplification gain of the I/V conversion circuits of the amplification circuit 32 is set small where the first one chip of each row of the Hadamard codes in the 4×4 Hadamard matrix is used, the spread codes $MC_1$ to $MC_4$ which do not use the first 1 chip should be used as described hereinabove.

Figure 37:
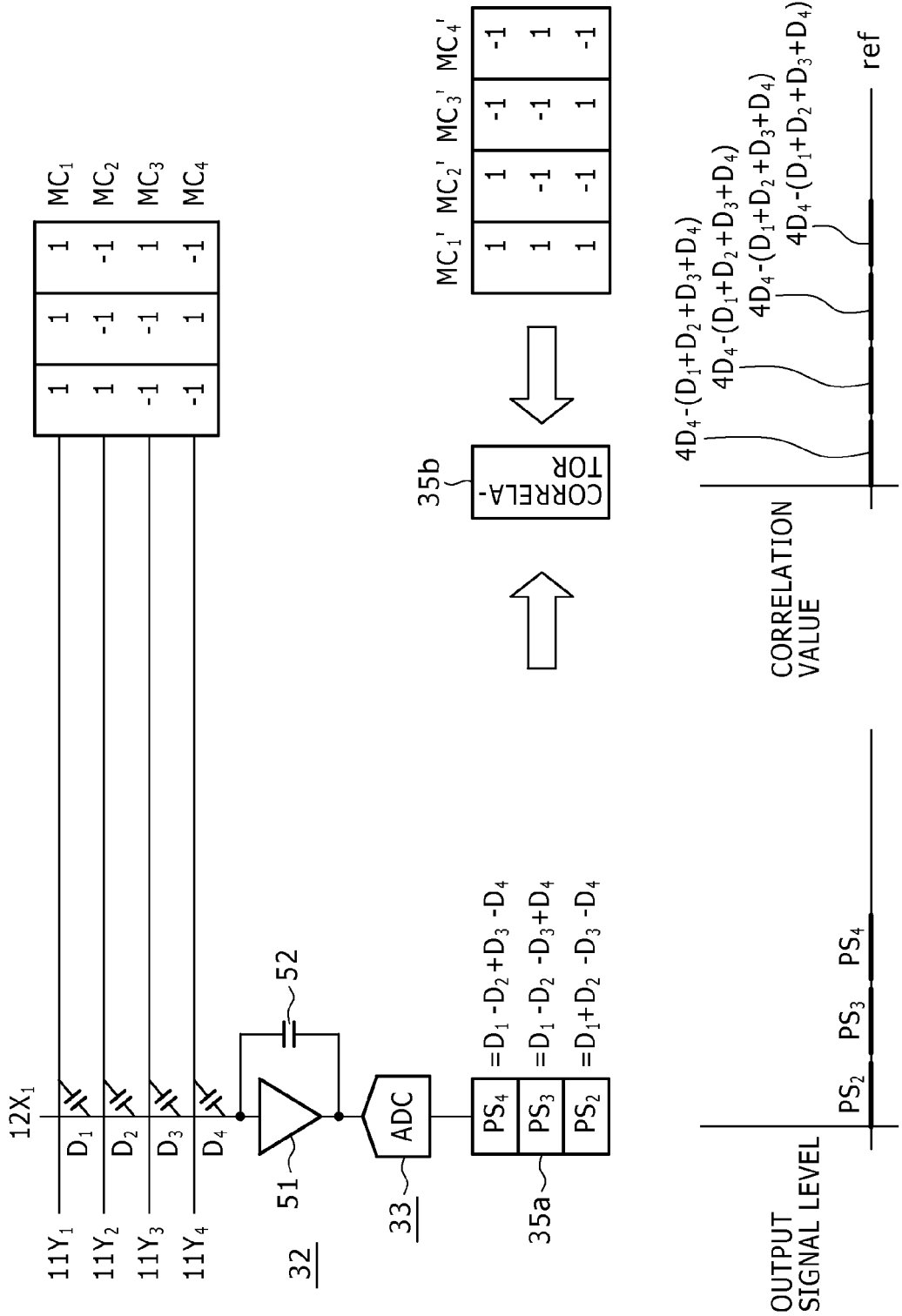
FIG. 37 is a view illustrating the fourth embodiment of the pointer detection apparatus according to the present invention.
Figure 38:
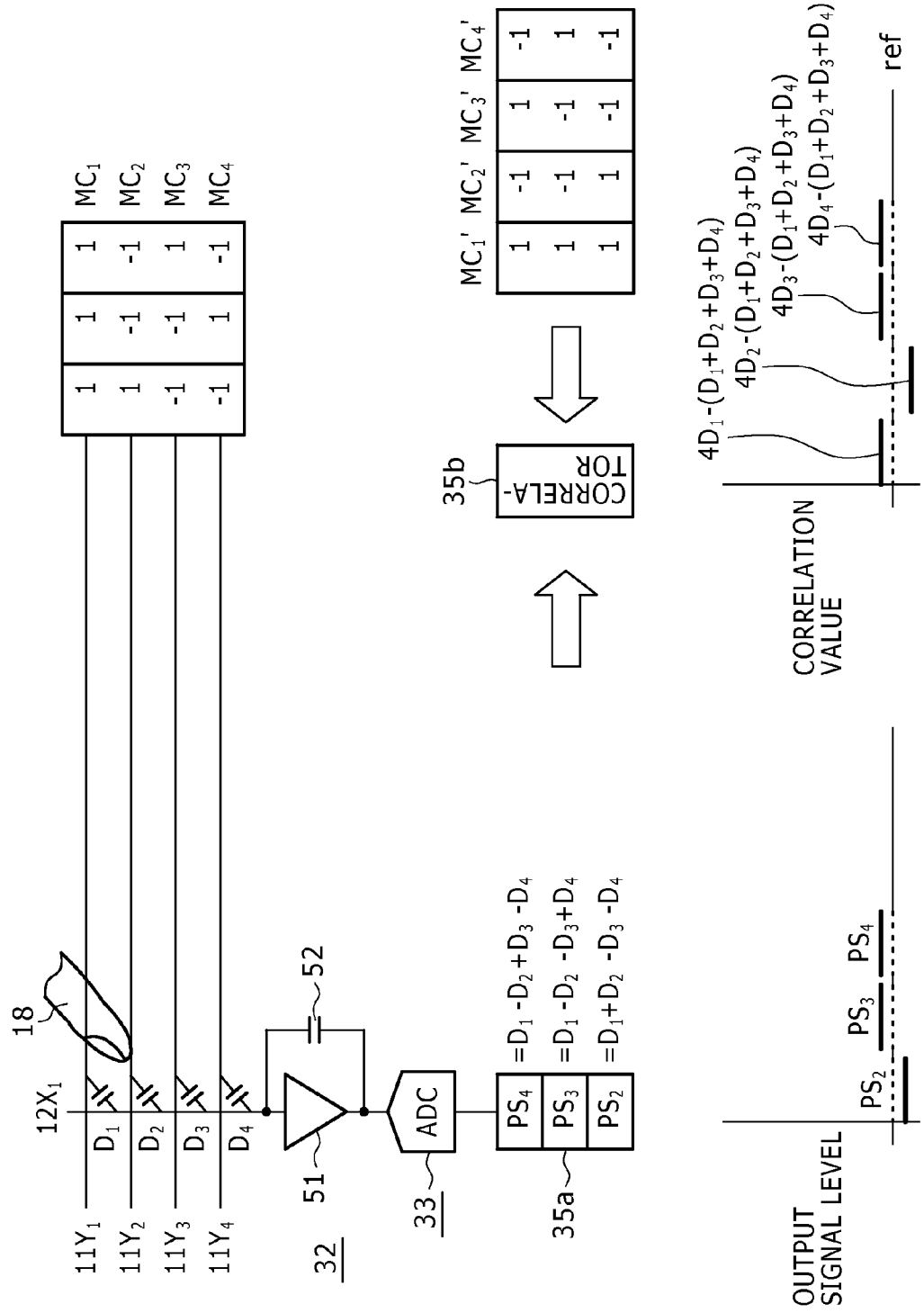
FIG. 38 is a view illustrating the fourth embodiment of the pointer detection apparatus according to the present invention.

In reference to FIGS. 37 and 38, a case is described in which the spread codes $MC_1$ to $MC_4$ which do not use the first 1 chip of each row of the Hadamard codes of the 4×4 Hadamard matrix are supplied at the same time in synchronism with each other to the four transmission conductors $11Y_1$ to $11Y_4$, and correlation values are obtained between a reception signal from the reception conductor $12X_1$ and the spread codes $MC_1$ to $MC_4$. It is to be noted that, in FIGS. 37 and 38, the correlation value calculating codes for obtaining correlation values between the reception signal and the spread codes $MC_1$ to $MC_4$ are represented as spread codes $MC_1'$ to $MC_4'$ in conformity with the example described hereinabove.

In particular, FIGS. 37 and 38 are views corresponding to FIGS. 35 and 36, respectively, and FIG. 37 illustrates a case in which the pointer 18 does not exist above or on the pointing input surface 100S and FIG. 38 illustrates another case in which the pointer 18 is, for example, in contact with the cross point between the transmission conductor $11Y_2$ and the reception conductor $12X_1$.

In FIGS. 37 and 38, a reception signal obtained from the reception conductor $12X_1$ is supplied to the A/D conversion circuit 33 through the amplification circuit 32 and converted into output signals $PS_2$, $PS_3$ and $PS_4$ corresponding to the three chips of the spread codes $MC_1$ to $MC_4$. The output signals $PS_2$, $PS_3$ and $PS_4$ are retained into the shift register 35a of the correlation value calculation circuit.

Then, the output signals $PS_2$ to $PS_4$ retained in the shift register 35a and the correlation value calculating codes $MC_1'$ to $MC_4'$ are supplied to the correlator 35b, by which correlation calculation is carried out.

First, the values of the output signals $PS_2$, $PS_3$ and $PS_4$ in a state in which the pointer 18 does not exist above or on the pointing input surface 100S as shown in FIG. 37 and correlation values are described.

As described hereinabove, the output signals $PS_2$, $PS_3$ and $PS_4$ corresponding to the chips of the spread codes $MC_1$ to $MC_4$ have the value 0. Also, the four correlation values between the output signals $PS_2$ to $PS_4$ retained in the shift register 35a and the spread codes $MC_1'$ to $MC_4'$ are all equal to zero as shown at a right lower portion of FIG. 37. In other words, the reference value ref for the correlation values is zero and also the correlation values are zero.

Now, the values of the output signals $PS_2$, $PS_3$ and $PS_4$ in a state in which the pointer 18 is, for example, in contact with the cross point between the transmission conductor $11Y_2$ and the reception conductor $12X_1$ as shown in FIG. 38 and the correlation values are described.

In this instance, since the pointer 18 is touching the cross point between the transmission conductor $11Y_2$ and the reception conductor $12X_1$, the signal level $D_2$ drops. Therefore, the values of the output signals $PS_2$, $PS_3$ and $PS_4$ reflect the decreasing amount of the signal level $D_2$ and do not become equal to zero as shown at a left lower portion of FIG. 38.

Thus, the four correlation values between the output signals $PS_2$ to $PS_4$ retained in the shift register 35a and the correlation value calculating codes $C_1'$ to $C_4'$ become such values as shown at a right lower portion of FIG. 38. In particular, the correlation value regarding the correlation value calculating code $C_2'$ corresponding to the spread code $C_2$ decreases by an amount corresponding to the decreasing amount of the signal level $D_2$ from zero while the remaining three correlation values are displaced by an amount (referred to as an offset) corresponding to the decreasing amount of the signal level $D_2$ from zero.

In this instance, the average value of the four correlation values is zero. Further, the four correlation values vary upwardly and downwardly around the average value of zero in response to the touching state or the hovering state of a pointer.

This gives rise to a problem that, where the correlation value regarding a spread code corresponding to an original cross point, which the pointer 18 is touching, is detected as the reference level ref=zero, a correlation value of the negative polarity obtained at the cross point, at which the pointer exists, as detected by the electrostatic coupling method becomes lower by an amount corresponding to the offset, resulting in the possibility that detection of a pointer may not be carried out correctly.

In order to solve this problem, in connection with the example of FIG. 38, offset amounts appearing in the correlation values between the output signals $PS_2$, $PS_3$ and $PS_4$ and the correlation value calculating codes $C_1'$, $C_3'$ and $C_4'$ are subtracted from the calculated correlation values to carry out correction. This way, since the reference value ref to be used for the pointer position detection can be set to zero in a state in which the amount corresponding to the offset is eliminated, a negative correlation value can be detected correctly.

The offset amounts appearing in the correlation values between the output signals $PS_2$, $PS_3$ and $PS_4$ and the correlation value calculating codes $C_1'$, $C_3'$ and $C_4'$ are caused by drop of the signal level $D_2$ when, in the example of FIG. 38, the pointer 18 touches the cross point between the transmission conductor $11Y_2$ and the reception conductor $12X_1$. Then, the offset amounts can be detected correctly from the correlation values regarding the spread codes through the other transmission conductors $11Y_1$, $11Y_3$ and $11Y_4$ to which a pointing input operation such as touching is not carried out by the pointer 18.

However, it should be noted here that the transmission conductor 11Y from which the offset amount is to be detected is a transmission conductor 11Y at a position at which a pointing input operation such as touching is not carried out by the pointer 18 while a pointing input operation such as touching is carried out by the pointer 18 on the pointing input surface 100S. Accordingly, in order to satisfy this condition, the transmission conductor 11Y from which an offset amount is to be detected must always be in a state in which a pointing input operation such as touching is not carried out by the pointer 18.

As a measure for this, an arbitrary one of a plurality of spread codes that are different from each other may be obtained from a transmission conductor 11Y, to which a masking process or the like is applied so that a pointing input operation such as touching by a pointer 18 cannot be detected.

However, it is difficult to apply such a masking process as just described above to a transmission conductor 11Y. Further, even if it is possible to apply a masking process, there is the possibility that the sensor section 100 may be complicated in structure and the cost may become high.

Therefore, in the present fourth embodiment, an arbitrary one of a plurality of spread codes that are different from each other is not supplied to a transmission conductor 11Y but is supplied directly to an output signal of a reception conductor 12X. If this measure is taken, then the spread code can be added to the output signal of the reception conductor 12X without passing through a cross point to which a pointing input operation such as touching is applied by the pointer 18, and an offset amount can be detected as a detection value of the spread code. Then, by correcting the correlation value calculated by the correlation value calculation circuit with the detected offset amount, it is possible to always detect a pointer correctly.

Figure 40:
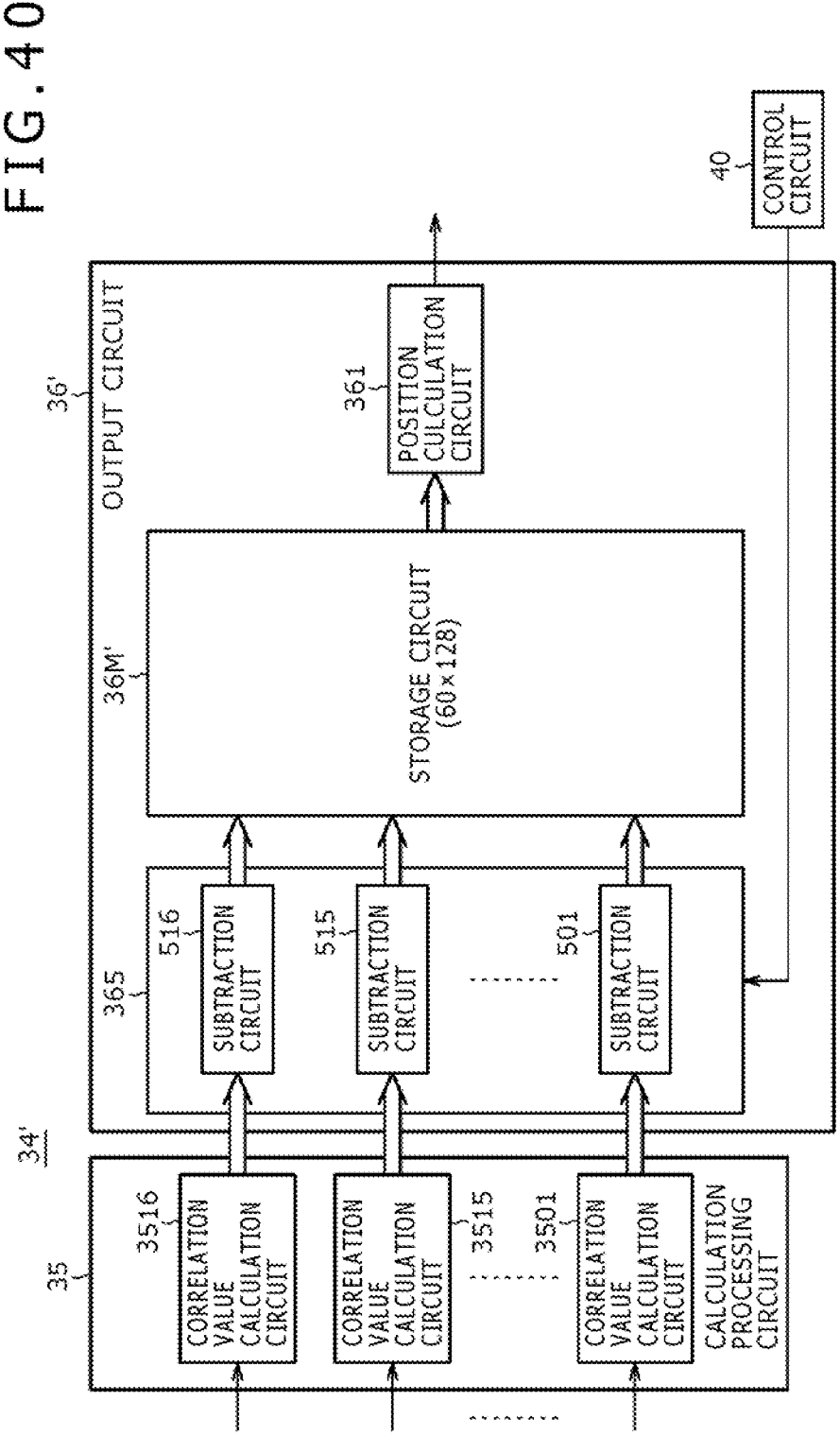
FIG. 40 is a block diagram showing an example of a configuration of another main part of the pointer detection apparatus according to the fourth embodiment of the present invention.

A configuration of essential part where the present fourth embodiment is applied to the pointer detection apparatus of the first embodiment described hereinabove is shown in FIGS. 39 and 40. The configuration of the present fourth embodiment is an example of a case in which the spread code $C_1$ from among the 16 spread codes $C_1$ to $C_{16}$ is used as a spread code for detection of an offset amount. It is to be noted that like components to those of the first embodiment are denoted by like reference characters and detailed description of the same is omitted.

FIG. 39 is a view showing an example of a configuration of a sensor section 100', a transmission section 200' and a portion of a reception section 300' up to an amplification circuit 32 in the case of the present fourth embodiment. Meanwhile, FIG. 40 is a view showing an example of a configuration of a position detection circuit 34' in the case of the present fourth embodiment. The other part is configured similarly to that in the first embodiment.

As shown in FIG. 39, the sensor section 100' in the present fourth embodiment does not have the four transmission conductors $11Y_1$ to $11Y_4$ of the transmission block TB1 in the sensor section 100 of the first embodiment. Accordingly, in the sensor section 100' in the fourth embodiment, the number of transmission conductors is 60. It is to be noted that, also in the present fourth embodiment, the reception conductor group 12 is similar to that in the first embodiment including the configuration of the detection blocks DB1 to DB16.

And, in the present fourth embodiment, since the transmission block $TB_1$ does not exist, the transmission conductor selection circuit 22' does not have the switch circuit 2201 of the transmission conductor selection circuit 22 in the case of the first embodiment.

And, as shown in FIG. 39, the 15 kinds of spread codes $C_2$ to $C_{16}$ from the spread code generation circuits 2102 to 2116 of the transmission signal supplying circuit 21 are supplied at the same time in synchronism with each other to the individual transmission conductors 11Y of the transmission blocks $TB_2$ to $TB_{16}$ through the transmission conductor selection circuit 22'.

In the present fourth embodiment, the spread code $C_1$ from the spread code generation circuit 2101 of the transmission signal supplying circuit 21 is added to output signals $S_1$ to $S_{16}$ from the reception conductor selection circuit 31 through capacitors 3801, 3802, ..., 3816 and supplied to I/V conversion circuits 3201, 3202, ..., 3216 of the amplification circuit 32, respectively.

In this instance, the capacitance of the capacitors 3801, 3802, ..., 3816 is set to a capacitance Co at the cross point, for example, between the transmission conductor 11Y and the reception conductor 12X. In short, the spread code $C_1$ is supplied to the I/V conversion circuits 3201, 3202, ..., 3216 of the amplification circuit through the capacitance Co, which is the same as that at the cross point in a state in which the pointer 18 does not exist at the cross point.

Accordingly, the output signals $S_1$ to $S_{16}$ to be inputted to the I/V conversion circuits 3201, 3202, ..., 3216 of the amplification circuit 32 are signals corresponding to a signal in which all of the 16 spread codes $C_1$ to $C_{16}$ are multiplexed.

The output signals $S_1$ to $S_{16}$ are individually converted into voltage signals and amplified by the I/V conversion circuits 3201, 3202, ..., 3216 of the amplification circuit 32 and then converted into digital sample data by A/D converters 3301 to 3316 of the A/D conversion circuit 33 in a similar manner as in the case of the first embodiment.

Then, the digital sample data outputted from the A/D converters 3301 to 3316 are supplied to corresponding ones of the correlation value calculation circuits 3501 to 3516 of the calculation processing circuit 35 of the position detection circuit 34 as illustrated in FIG. 40. The correlation value calculation circuits 3501 to 3516 have a configuration that is the same as that in the case of the first embodiment shown in FIG. 18, and the inputted digital sample data are retained as output signals $PS_1$ to $PS_{16}$ into the shift register 35a.

As described hereinabove, the correlation value calculation circuits 3501 to 3516 carries out correlation calculation of the output signals $PS_1$ to $PS_{16}$ retained in the shift register 35a and the 16 spread codes $C_1$ to $C_{16}$, and calculated correlation values are supplied to an outputting circuit 36'. As hereinafter described, from among the 16 correlation values between the output signals $PS_1$ to $PS_{16}$ retained in the shift register 35a and the 16 spread codes $C_1$ to $C_{16}$, the correlation value regarding the spread code $C_1$ indicates the offset value.

In the present fourth embodiment, the outputting circuit 36' is configured to include a storage circuit 36M', a position calculation circuit 361, and an offset removing circuit 365, as shown in FIG. 40.

The storage circuit 36M' is a storage circuit for storing correlation values of the number of transmission conductors× the number of reception conductors=60×128 cross points of the sensor section 100'. The position calculation circuit 361 has a configuration similar to that of the first embodiment and, in the present fourth embodiment, generates a result of detection of a pointer as output data from the correlation values stored in the storage circuit 36M'.

The offset removing circuit 365 includes subtraction circuits 501 to 516 for receiving outputs from the correlation value storage circuits 35d of the correlation value calculation circuits 3501 to 3516 to carry out removal of an offset.

Then, the subtraction circuits 501 to 516 of the offset removing circuit 365 are connected to the storage circuit 36M' and transfers the correlation values, from which an offset value is removed by the subtraction circuits 501 to 516, to the storage circuit 36M'. The storage circuit 36M' stores the correlation values transferred thereto.

Figure 41:
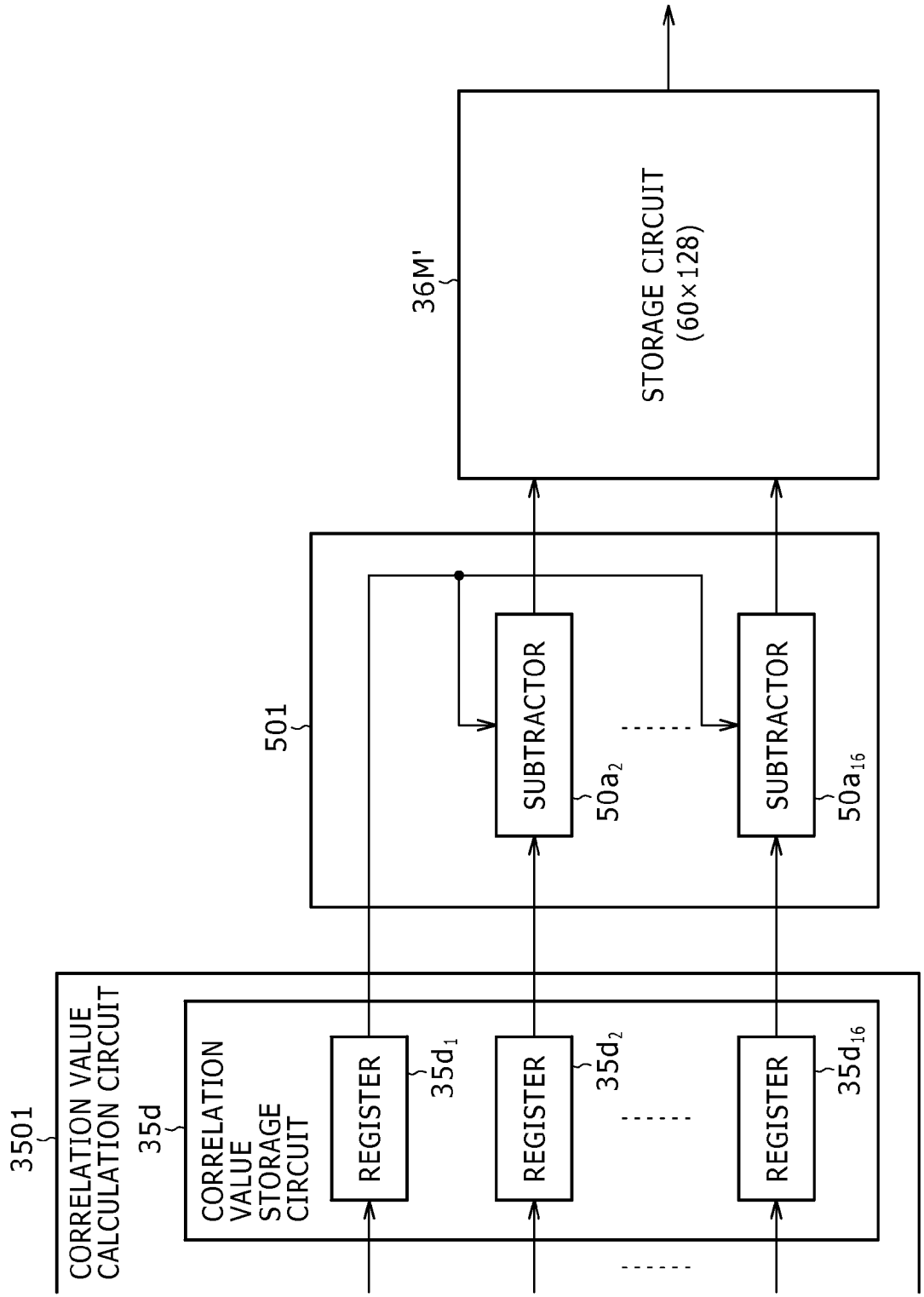
FIG. 41 is a block diagram showing an example of a configuration of a further main part of the pointer detection apparatus according to the fourth embodiment of the present invention.

Further, the offset removing circuit 365 is connected to the control circuit 40. Since all of the subtraction circuits 501 to 516 of the offset removing circuit 365 have the same configuration, an example of the configuration of the subtraction circuit 501 is shown in FIG. 41.

The subtraction circuit 501 is formed from 15 subtractors $50a_2$ to $50a_{16}$. The 15 subtractors $50a_2$ to $50a_{16}$ are connected at one of input terminals thereof to output terminals of corresponding ones of registers $35d_2$ to $35d_{16}$ of the correlation value storage circuit 35d of the correlation value calculation circuit 3501.

Further, the subtractors $50a_2$ to $50a_{16}$ are connected at the other input terminal thereof to an output terminal of the register $35d_1$ of the correlation value storage circuit 35d of the correlation value calculation circuit 3501.

The subtractors $50a_2$ to $50a_{16}$ subtract a correlation value (offset value) from the register $35d_1$ from the correlation values from the registers $35d_2$ to $35d_{16}$.

Similarly as in the first embodiment, in a state in which the reception conductor selection circuit 31 selects one of the reception conductors 12X of each of the 16 detection blocks DB, the 15 spread codes $C_2$ to $C_{16}$ are supplied to the four sets of the transmission conductors 11Y each including 15 transmission conductors 11Y per every one cycle. Then, in the state in which one reception conductor 12X is selected in each of the 16 detection blocks $DB_1$ to $DB_{16}$, the 15 spread codes $C_2$ to $C_{16}$ are all supplied to all of the transmission conductors 11Y per four cycles of the spread codes.

Accordingly, each of the 16 output signals $S_1$ to $S_{16}$ from the reception conductor selection circuit 31 is a signal comprising a sum of components of the chips of the spread codes $C_2$ to $C_{16}$. Then, since the spread code $C_1$ is added to each of the 16 output signals $S_1$ to $S_{16}$ from the reception conductor selection circuit 31, through the capacitors 3801 to 3816 respectively, each of the output signals $S_1$ to $S_{16}$ inputted to the I/V conversion circuits 3201, 3202, . . . , 3216 of the amplification circuit 32 is a signal comprising a sum of all of the 16 spread codes $C_1$ to $C_{16}$.

Within a first one cycle from among four cycles of the spread codes, the 15 spread codes $C_2$ to $C_{16}$ are supplied to the 15 transmission conductors $11Y_8, 11Y_{12}, \ldots, 11Y_{60}$, respectively. Then, the spread code $C_1$ is added to the 16 output signals $S_1$ to $S_{16}$ from the reception conductor selection circuit 31 through the capacitors 3801 to 3816, respectively.

The output signals $S_1$ to $S_{16}$ are supplied to the A/D conversion circuit 33 through the amplification circuit 32 and converted into digital sample data by the A/D conversion circuit 33 as described hereinabove and are retained into the shift registers 35d of the correlation value calculation circuits 3501 to 3516. Then, the correlation value calculation circuits 3501 to 3516 calculate correlation values between the digital sample data of the output signals $S_1$ to $S_{16}$ and the spread codes $C_1$ to $C_{16}$, respectively.

In this instance, since the spread code $C_1$ is not supplied to the transmission conductors 11Y of the sensor section 100' as described hereinabove, the correlation value regarding the spread code $C_1$ becomes an offset value regarding the cross points between a reception conductor 12X selected by the reception conductor selection circuit 31 and the 15 transmission conductors $11Y_8, 11Y_{12}, \ldots, 11Y_{60}$.

This offset value is obtained from the register $35d_1$ of the correlation value storage circuit 35d of each of the correlation value calculation circuits 3501 to 3516. In other words, an offset value is retained in each of the registers $35d_1$ of the correlation value storage circuits 35d. Then, the offset values from the registers $35d_1$ are supplied to the offset removing circuit 365 and supplied to the subtractors $50a_2$ to $50a_{16}$ of the subtraction circuits 501 to 516.

Then, in the subtraction circuits 501 to 516 of the offset removing circuit 365, the subtractors $50a_2$ to $50a_{16}$ subtract the offset values from the register $35d_1$ from the correlation values from the registers $35d_2$ to $35d_{16}$ to remove the offset values. Then, the correlation values from which the offset values are removed from the subtraction circuits 501 to 516 are supplied to and stored into the storage circuit 36M'.

Also, for the reception conductor 12X selected by the reception conductor selection circuit 31 and the other sets of 15 transmission conductors, processing operation similar to that described hereinabove is carried out. Then, if the processing operation for the four sets of 15 transmission conductors is completed, then the reception conductor 12X selected by the reception conductor selection circuit 31 is switched over to another one of the reception conductors in each of the detection blocks $DB_1$ to $DB_{16}$, and the operation described above is repeated.

In this manner, since the present fourth embodiment does not use spread codes whose first chips all have the value "1" in a plurality of Hadamard codes having different codes from each other, the amplification gain of the amplification circuit 32 can be increased.

Additionally, in the present fourth embodiment, even though spread codes whose first chips do not all have the value "1" in a plurality of Hadamard codes are used, the problem in this instance can be solved to detect a pointer correctly, similarly as in the case in which all chips of the Hadamard codes are used.

<Different Example of the Synthesis Method of Calibration Signals>

Incidentally, in the example described above, a case is described in which an output signal of a reception conductor 12X and an offset correcting signal (calibration signal) for a correlation value are synthesized before they are inputted to an A/D conversion circuit 33, that is, at the stage of analog signals. Where a calibration signal and an output signal from a reception conductor 12X are synthesized at the stage of analog signals in this manner, such synthesis can be implemented only by provision of the capacitors 3801 to 3816, and therefore, the circuit configuration can be simplified.

However, it is necessary to set the capacitors 3801 to 3816 so as to have a capacitance value substantially equal to that of capacitors formed at cross points between the transmission conductors 11Y and the reception conductors 12X. Since the capacitance of the capacitors formed at the cross points between the transmission conductors 11Y and the reception conductors 12X is, for example, approximately 0.5 pF and very low, it is very difficult to actually mount the capacitors on a circuit board. Further, since, in the example described above, a calibration signal and an output signal from a reception conductor 12X are synthesized at the stage of analog signals, there is another problem that an error is likely to occur.

Therefore, in a different example of the synthesis method of a calibration signal, a calibration signal is synthesized with an output signal of an A/D conversion circuit 33, that is, with a reception signal after it is converted into a digital signal.

Figure 42:
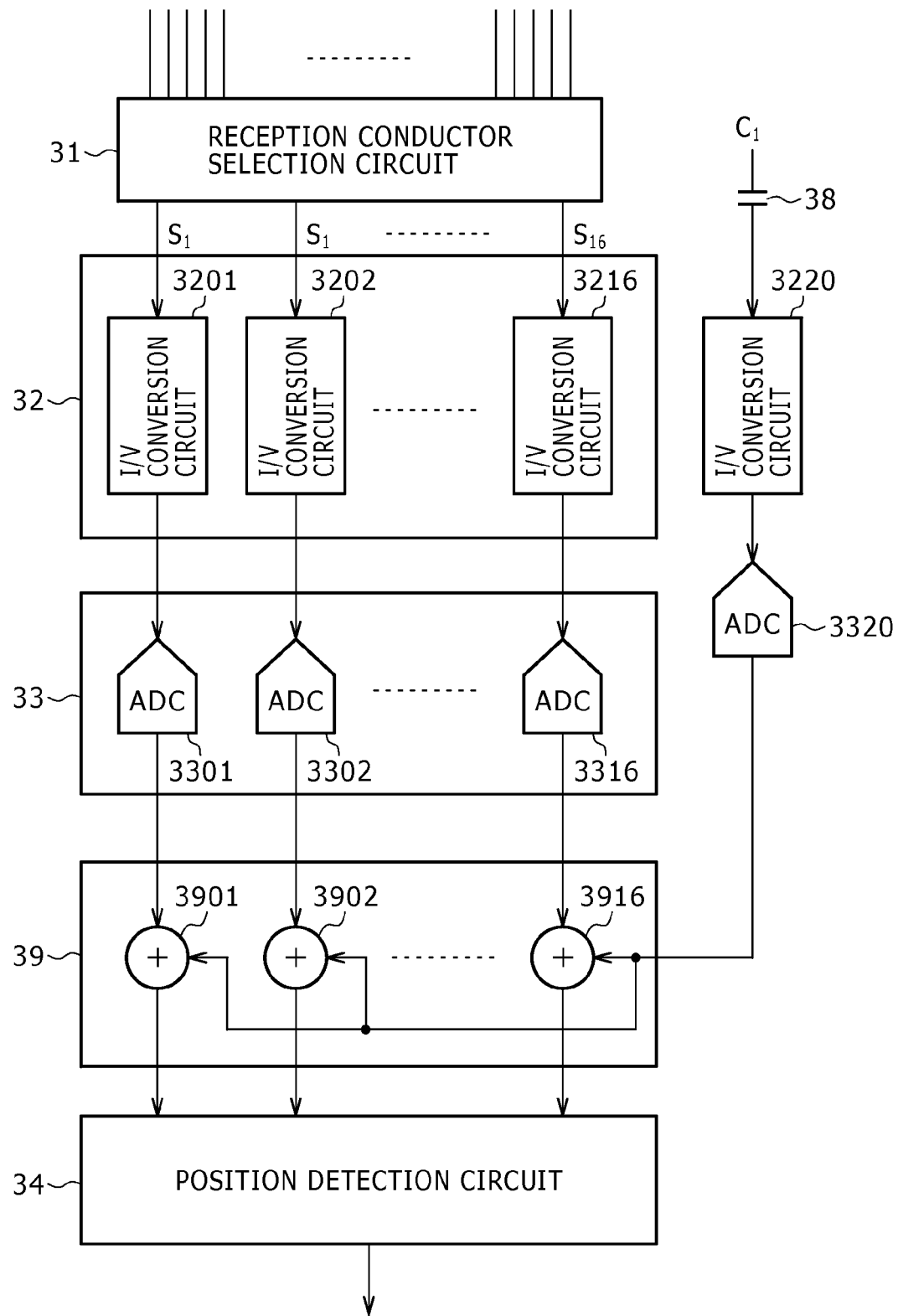
FIG. 42 is a block diagram showing another example of a configuration of main part of the fourth embodiment of the pointer detection apparatus of the fourth embodiment.

FIG. 42 is a view showing an example of a configuration where a spread code as a calibration signal for obtaining an offset value is added to an output signal of an A/D conversion circuit 33. Also in the example of FIG. 42, the spread code $C_1$ is used as a calibration signal for obtaining an offset value.

In the present example, an addition circuit 39 is provided on the output side of the A/D conversion circuit 33. The addition circuit 39 includes adders 3901 to 3916 each connected at an input terminal thereof to one of output terminals of a corresponding one of A/D converters 3301 to 3316 of the A/D conversion circuit 33.

Then, the spread code $C_1$ from the spread code generation circuit 2101 of the transmission signal supplying circuit 21 is supplied to an I/V conversion circuit 3220 through a capacitor 38. In this instance, the capacitance of the capacitor 38 is set equal to the capacitance Co at the cross points between the transmission conductors 11Y and the reception conductors 12X. The I/V conversion circuit 3220 is configured similarly to the I/V conversion circuits 3201 to 3216 of the amplification circuit 32. In short, the spread code $C_1$ is supplied to the I/V conversion circuit 3220 through the capacitance Co at the cross point at which a pointer 18 does not exist.

Then, similarly to the A/D converters 3301 to 3316 of the A/D conversion circuit 33, an A/D converter 3320 converts an output signal of the I/V conversion circuit 3220 into digital sample data synchronized with the clock signal CLK. The digital sample data from the A/D converter 3320 is supplied to the adders 3901 to 3916 of the addition circuit 39.

The adders 3901 to 3916 of the addition circuit 39 add the digital sample data from the A/D converters 3301 to 3316 and the digital sample data from the A/D converter 3320. Then, addition outputs of the adders 3901 to 3916 of the addition circuit 39 are supplied to the position detection circuit 34. The configuration of the other part is similar to that of the fourth embodiment described hereinabove.

As described hereinabove, in the different example of the synthesis method of a calibration signal, a calibration signal and an output signal from a reception conductor 12X are added in digital signals. Accordingly, by using a capacitor of 8 pF for the capacitor 38 for supplying a calibration signal, and by canceling 4 bits worth of data in the A/D converter 3320, signal synthesis with a higher degree of accuracy than that when signals are synthesized in analog signals can be achieved.

It is to be noted that, while, in the fourth embodiment described hereinabove, one spread code is used for the calibration signal, use of the calibration signal is not limited to use of one spread code. For example, two or more spread codes may be supplied as calibration signals.

While the foregoing description relates to a case in which the fourth embodiment is applied to the first embodiment, of course the fourth embodiment can be applied also to the second embodiment and the third embodiment.

[Fifth Embodiment: Removal of Detection Non-Uniformity, FIGS. 43 to 47]

The present fifth embodiment is a modification to the transmission section 200 or 200' and the reception section 300 or 300' in the first to fourth embodiments described hereinabove.

As described hereinabove, as the pointer 18, not only a finger of a user but also a pen or the like can be used. Further, in the pointer detection apparatus of the present embodiment, it is also possible to detect a pressing force by a pointer 18 in accordance with the resistance film method.

Figure 43A:
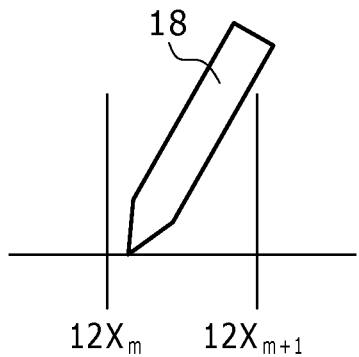
FIGS. 43A-43F are views illustrating a fifth embodiment of a pointer detection apparatus according to the present invention.

Incidentally, with the pointer 18 such as a pen, it is further possible to carry out a pointing input operation at a point between two reception conductors $12X_m$ and $12X_{m+1}$ as shown in FIGS. 43(A) and (B). However, where a pointing input operation on a point between the two reception conductors $12X_m$ and $12X_{m+1}$ in this manner is carried out, a detection output (correlation value) of a pointer calculated from output signals of the two reception conductors $12X_m$ and $12X_{m+1}$ varies depending on the position of the pointing input point between the two reception conductors $12X_m$ and $12X_{m+1}$.

Figure 43B:
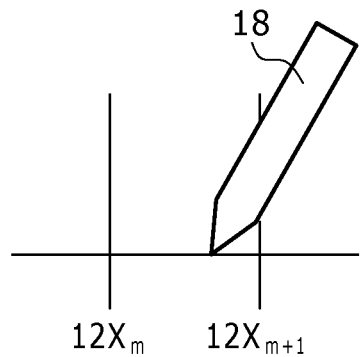
Figure 43C:
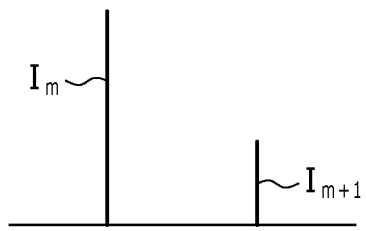
Figure 43D:
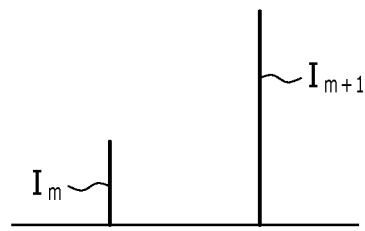

In particular, where the pointing input point of the pointer 18 in the form of a pen is nearer to the reception conductor $12X_m$ side between the two reception conductors $12X_m$ and $12X_{m+1}$ as shown in FIG. 43(A), a pointer detection output (correlation value) $I_m$ obtained from an output signal of the reception conductor $12X_m$ is higher while a pointer detection output (correlation value) $I_{m+1}$ obtained from an output signal of the reception conductor $12X_{m+1}$ is lower as shown in FIG. 43(C). On the other hand, where the pointing input point of the pointer 18 in the form of a pen is nearer to the reception conductor $12X_{m+1}$ side between the two reception conductors $12X_m$ and $12X_{m+1}$ as shown in FIG. 43(B), the pointer detection output (correlation value) $I_m$ obtained from an output signal of the reception conductor $12X_m$ is lower while a pointer detection output (correlation value) $I_{m+1}$ obtained from an output signal of the reception conductor $12X_{m+1}$ is higher as shown in FIG. 43(D).

Figure 44:
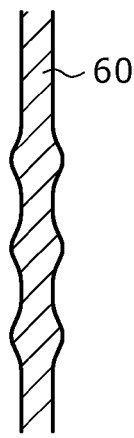
FIG. 44 is a view illustrating the fifth embodiment of the pointer detection apparatus according to the present invention.

Therefore, for example, if the pointer 18 in the form of a pen is moved in a direction in which a reception conductor extends in such a manner as to draw a straight line while pressing the pointing input surface 100S, then there is a problem that a line 60 detected in response to a detection output of the pointer suffers from non-uniformity or fluctuation in thickness, as shown in FIG. 44.

While the description of FIGS. 43 and 44 relates to a case in which a pointing input operation of a point between two reception conductors is carried out with the pointer 18, also where a pointing input operation of a point between two transmission conductors is carried out with the pointer 18, a similar problem occurs. The present fifth embodiment is an example which solves the problems described above.

FIRST EXAMPLE

Figure 45:
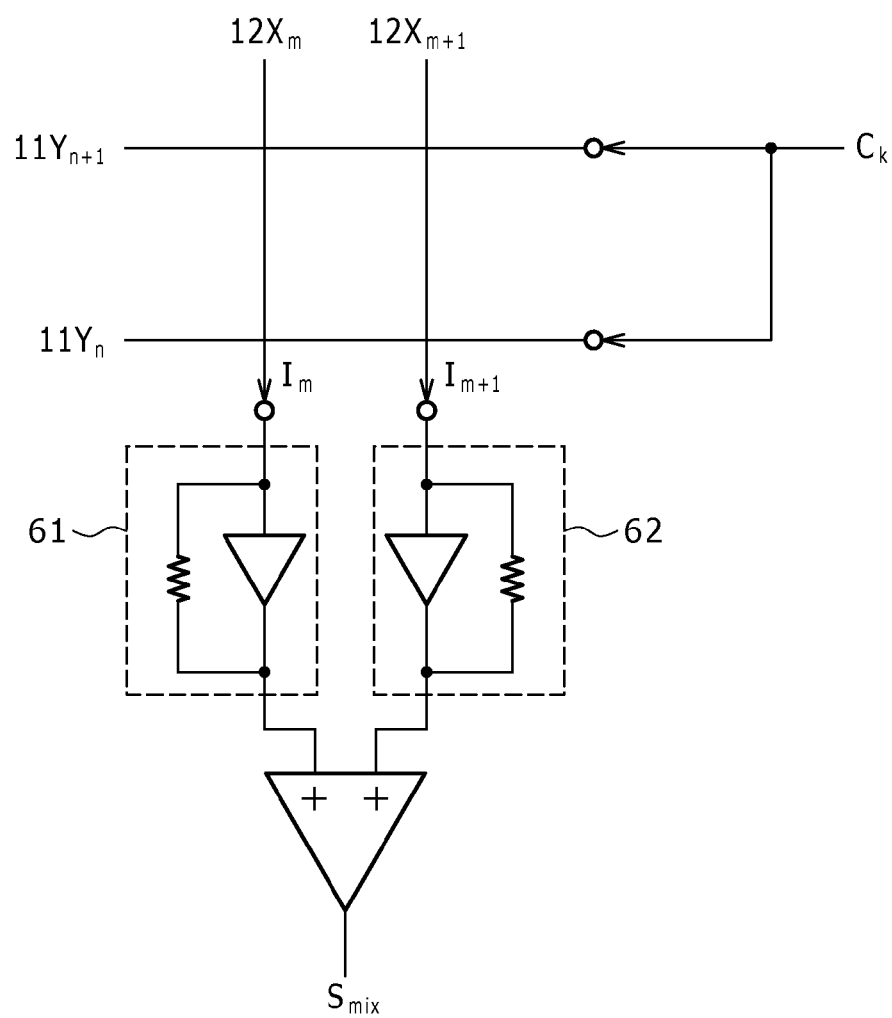
FIG. 45 is a diagram showing an example of a configuration of main part of the fifth embodiment of the pointer detection apparatus according to the present invention.

FIG. 45 is a view illustrating a basic concept of part of a first example of the present fifth embodiment. In the first example of the present fifth embodiment, a spread code $C_k$ is supplied at the same time to two transmission conductors $11Y_n$ and $11Y_{n+1}$. Further, reception signals (current signals) obtained from two reception conductors $12X_m$ and $12X_{m+1}$ are supplied to an amplifier 63 through I/V conversion circuits 61 and 62, respectively, such that they are added by the amplifier 63.

Figure 43E:
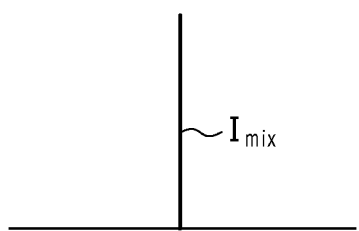
Figure 43F:
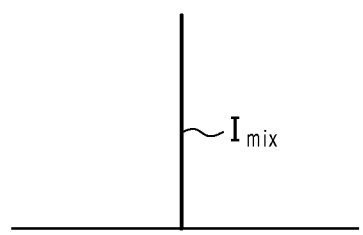

According to this measure, a pointer detection output (correlation value) regarding a signal $S_{mix}$ obtained from the amplifier 63 is a pointer detection output (correlation value) equivalent to the sum of the pointer detection output (correlation value) $I_m$ and the pointer detection output (correlation value) $I_{m+1}$. In particular, if the pointing input point of the pointer 18 in the form of a pen is nearer to the reception conductor $12X_m$ side between the two reception conductors $12X_m$ and $12X_{m+1}$ as shown in FIG. 43(A), then such a pointer detection output (correlation value) $I_{mix}$ as shown in FIG. 43(E) is obtained. Further, also where the pointing input point of the pointer 18 in the form of a pen is nearer to the reception conductor $12X_{m+1}$ between the two reception conductors $12X_m$ and $12X_{m+1}$ as shown in FIG. 43(B), such a pointer detection output (correlation value) $I_{mix}$ as shown in FIG. 43(F) is obtained.

Accordingly, if the pointer 18 in the form of a pen is moved in such a manner as to draw a straight line while it presses the pointing input surface 100S, then the line detected in response to the pointer detection output is free from non-uniformity or fluctuation in thickness.

Figure 46:
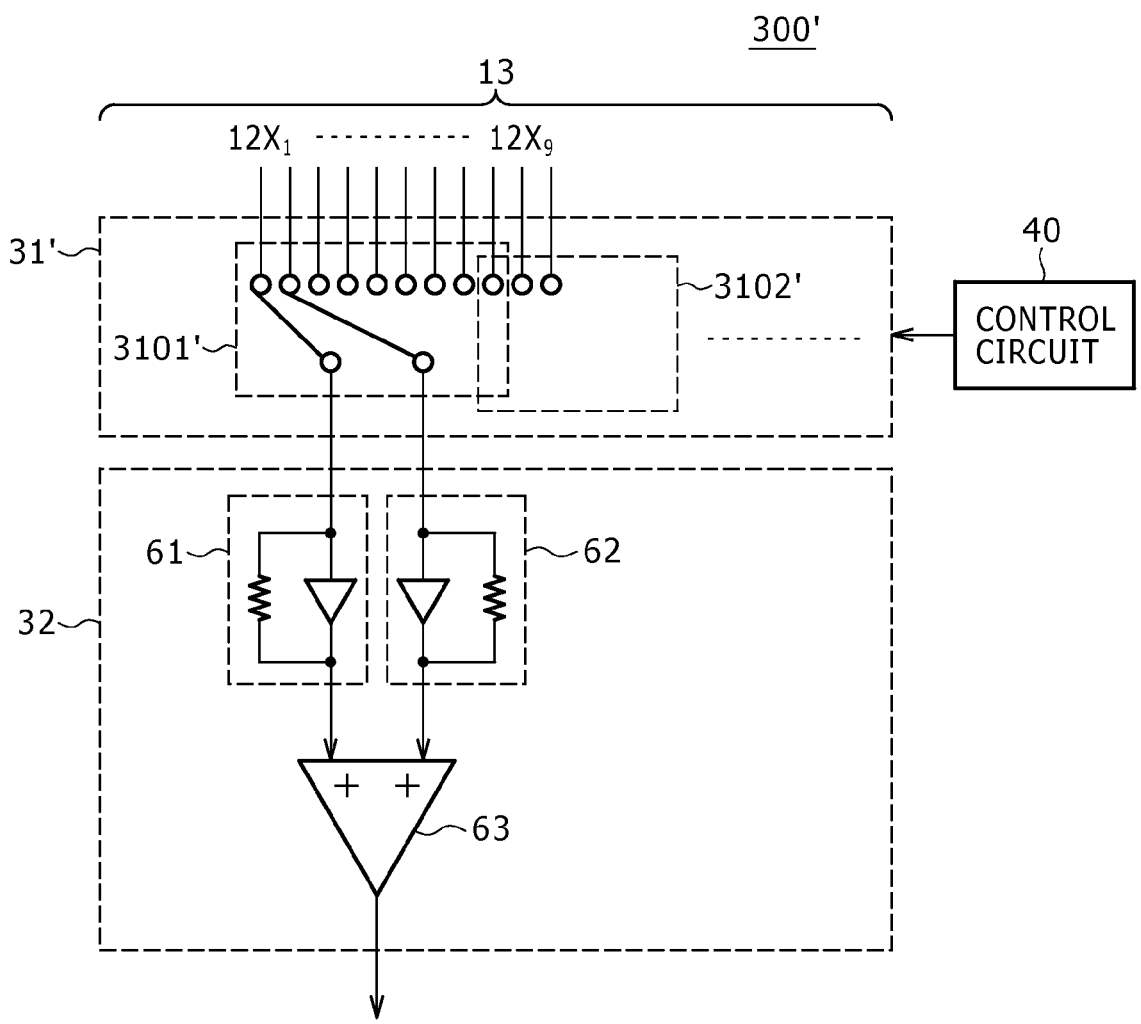
FIG. 46 is a diagram showing an example of a configuration of main part of the fifth embodiment of the pointer detection apparatus according to the present invention.

It is to be noted that, in the reception section 300' in the present fifth embodiment, each of the switch circuits 3101' to 3116' of the reception conductor selection circuit 31' has such a configuration of a switch circuit which selects two reception conductors as shown in FIG. 46. Further, each of the switch circuits 3101' to 3116' successively selects two reception conductors such that they are successively displaced by one conductor distance. In particular, each of the switch circuits 3101' to 3116' successively changes over (switches to) two reception conductors to be selected in such a manner that it selects, subsequently to the two reception conductors $12X_m$ and $12X_{m+1}$, the two reception conductors $12X_{m+1}$ and $12X_{m+2}$ and then selects the two reception conductors $12X_{m+2}$ and $12X_{m+3}$, and so forth.

In the case of the present fifth embodiment, the switch circuits 3101' to 3116' are configured such that, as indicated by a surrounding broken line in FIG. 46, a reception conductor having a maximum suffix from among the reception conductors which form a detection block is commonly used as a top reception conductor having a minimum suffix by an adjacent detection block.

Further, though not shown, the transmission conductor selection circuit 22' of the transmission section 200 is also configured such that two transmission conductors, to which a spread code $C_k$ is to be supplied, are successively changed over (switched) by one conductor distance. In particular, the two transmission conductors are successively changed over while being successively displaced by one conductor distance such that, subsequently to the two transmission conductors $11Y_n$ and $11Y_{n+1}$, the two transmission conductors $11Y_{n+1}$ and $11Y_{n+2}$ are selected, and then the two transmission conductors $11Y_{n+2}$ and $11Y_{n+3}$ are selected, and so forth. Further, similarly as in the case of the detection blocks described hereinabove, a transmission conductor between adjacent transmission blocks is commonly used by the two blocks.

SECOND EXAMPLE

Figure 47:
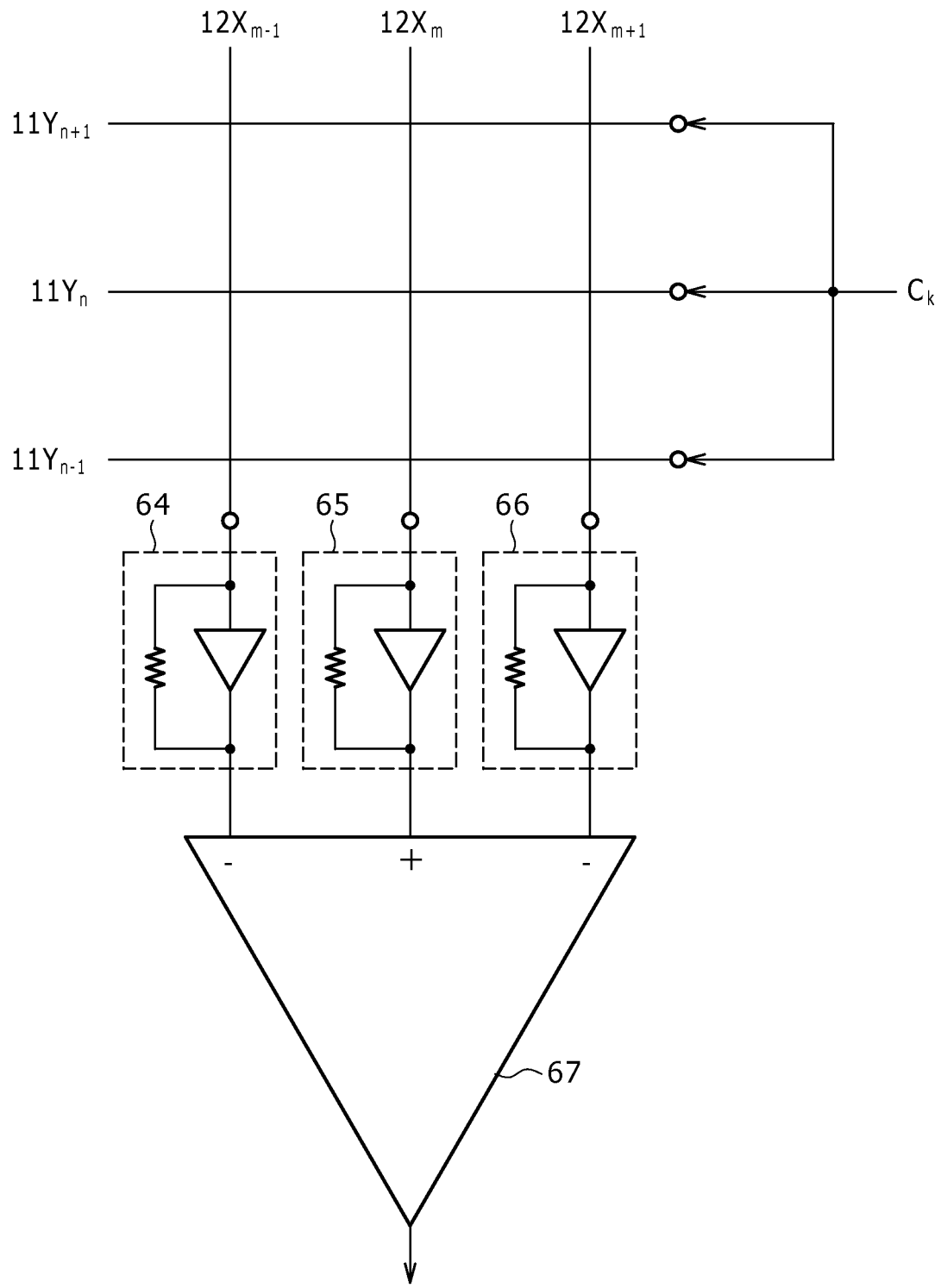
FIG. 47 is a diagram showing another example of a configuration of main part of the fifth embodiment of the pointer detection apparatus according to the present invention.

FIG. 47 is a view illustrating a basic concept of part of a second example of the present fifth embodiment. In the second example of the present fifth embodiment, a spread code $C_k$ is supplied to three transmission conductors $11Y_{n-1}$, $11Y_n$ and $11Y_{n+1}$ at the same time. Further, reception signals obtained from three reception conductors $12X_{m-1}$, $12X_m$ and $12X_{m+1}$ are supplied to a differential amplifier 67 through I/V conversion circuits 64, 65 and 66 so that they are synthesized by the differential amplifier 67. In the case of the present second example, the central reception conductor $12X_m$ is the reception conductor to be noted, and a reception signal from the noted reception conductor is supplied to a non-negated input terminal of the differential amplifier 67. Then, reception signals obtained from the reception conductors $12X_{m-1}$ and $12X_{m+1}$ on both sides of the central reception conductor $12X_m$ are supplied to negated input terminals of the differential amplifier 67.

In the present second example, as an output signal of the differential amplifier 67, an output signal having an improved noise resisting property with respect to a reception signal obtained from a reception conductor can be obtained. Further, a reception signal from the central reception conductor $12X_m$ supplied to the non-negated input terminal of the differential amplifier 67 is doubled with respect to reception signals obtained from the reception conductors $12X_{m-1}$ and $12X_{m+1}$ on both sides of the reception conductor $12X_m$, to particularly improve the noise resisting property.

It is to be noted that, also in the present second example, the reception conductor selection circuit on the reception side is configured such that it successively selects three reception conductors while successively displacing them by one conductor distance. Further, the transmission conductor selection circuit on the transmission side is also configured such that it successively selects three transmission conductors while successively displacing them by one conductor distance. Then, between adjacent conductors in the detection blocks or the transmission blocks, a reception conductor or a transmission conductor is used in an overlapping relationship similarly as in the first example.

It is to be noted that the present fifth embodiment can be applied to all of the embodiments described hereinabove.

[Sixth Embodiment: Automatic Gain Control of an Amplification Circuit]

Incidentally, in the pointer detection apparatus 1 of the first embodiment, a reception signal converted into an electric signal is amplified by an amplifier so as to have a predetermined signal level and is then converted into digital sample data by an A/D conversion circuit 33 and outputted to a position detection circuit 34 in order that correlation calculation can be carried out stably.

Where noise is higher than the reception signal, if the signal level of the reception signal which includes the noise is amplified uniformly, then also the noise is amplified. This gives rise to a problem that an A/D converter suffers from clipping and fails to detect the reception signal appropriately.

However, if the signal level of the reception signal is not amplified, then for example, when a pointer in a hovering state is to be detected, the variation of the signal level of the reception signal is very small, and this gives rise to a problem that the pointer 18 cannot be detected. The sixth embodiment solves this problem and is characterized by the amplification circuit 32.

Figure 48:
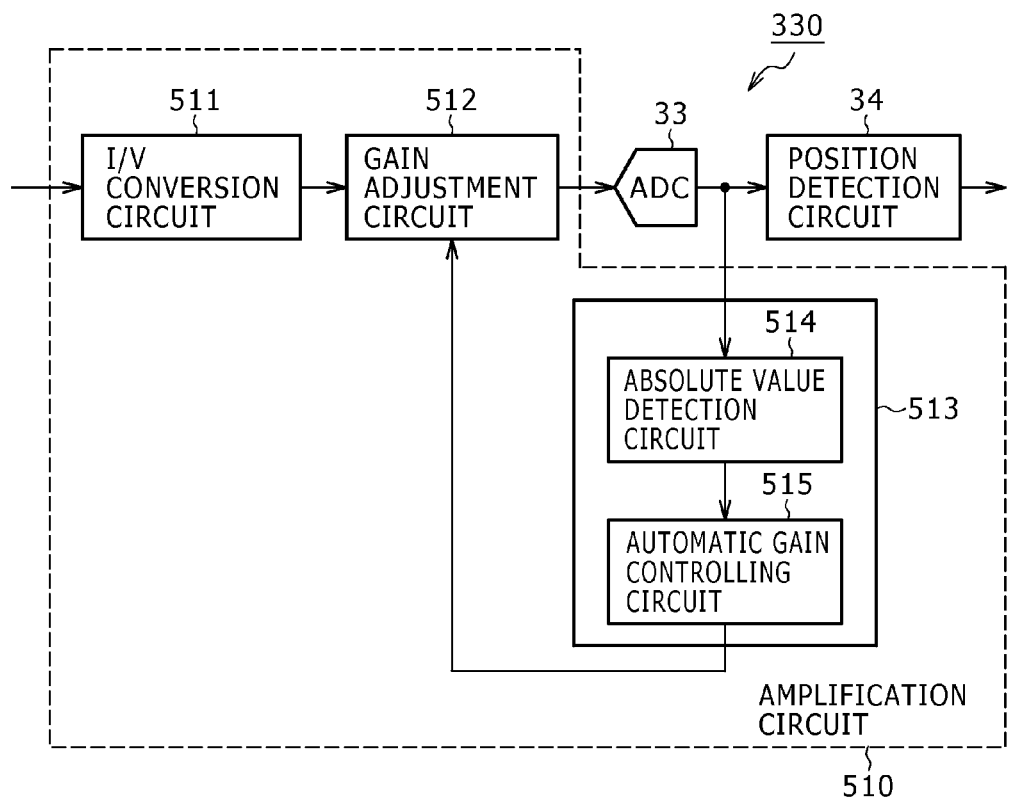
FIG. 48 is a block diagram showing an example of a configuration of main part of a sixth embodiment of the pointer detection apparatus according to the present invention.
Figure 49:
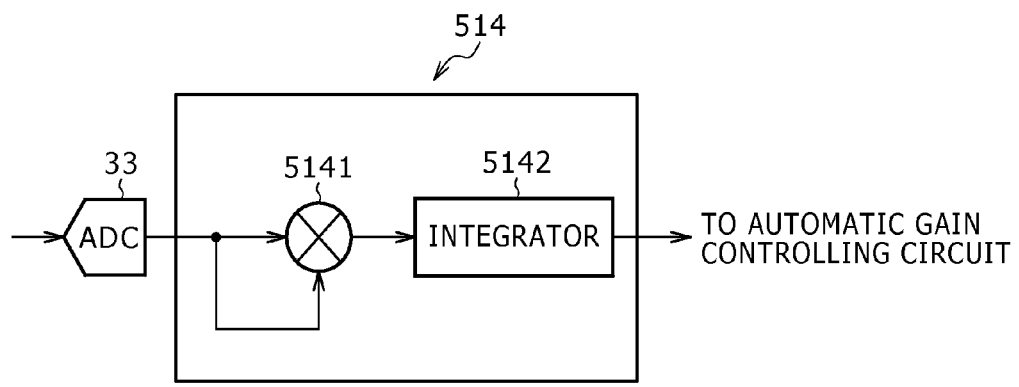
FIG. 49 is a block diagram showing an example of a detailed configuration of part of the configuration example of part of FIG. 48.

In the following, the present sixth embodiment is described with reference to FIGS. 48 and 49. FIG. 48 is a schematic block diagram of a reception section 330 in the present sixth embodiment, and FIG. 49 is a circuit diagram of an absolute value detection circuit which is a component of a gain value setting circuit hereinafter described.

If the reception section 330 presented by the present sixth embodiment and the reception section 300 in the first embodiment are compared with each other, then the difference resides in that the reception section 330 includes an amplification circuit 510 having an automatic gain controlling function in place of the amplification circuit 32. The other part of the reception section 330 has a configuration that is the same as that of the first embodiment, and like elements are denoted by like reference characters and description thereof is omitted. It is to be noted that, in the amplification circuit 510 of FIG. 48, an internal circuit for one of output signals $S_1$ to $S_{16}$ is shown for simplified illustration. Accordingly, the internal circuit of the amplification circuit 510 of FIG. 48 is provided for each of the output signals $S_1$ to $S_{16}$.

As shown in FIG. 48, the amplification circuit 510 in the present example includes an I/V conversion circuit 511, a gain adjustment circuit 512 and a gain value setting circuit 513. The I/V conversion circuit 511 has a configuration similar to that of the I/V conversion circuits 3201 to 3216 described hereinabove. In the present example, the I/V conversion circuit 511 is connected at an output terminal thereof to an input terminal of the gain adjustment circuit 512.

The gain adjustment circuit 512 is a circuit for suitably raising or dropping the signal level of a signal inputted thereto to a predetermined signal level. This gain adjustment circuit 512 carries out control of the output signal level thereof based on a control signal from the gain value setting circuit 513. Since the signal strength of signal energy components treated by the gain value setting circuit 513 includes not only a signal (spread code) component to be detected but also noise and so forth, the gain adjustment circuit 512 sets the gain value based on the signal strength of the energy components of the entire signal.

The output signal of the gain adjustment circuit 512 is supplied to the A/D conversion circuit 33, by which it is converted into digital sample data. The digital sample data from the A/D conversion circuit 33 are supplied to the position detection circuit 34 and, in the present example, also supplied to the gain value setting circuit 513.

The gain value setting circuit 513 generates a control signal for controlling the gain adjustment circuit 512 based on the digital sample data from the A/D conversion circuit 33 and supplies the control signal to a control signal input terminal of the gain adjustment circuit 512. The gain value setting circuit 513 includes an absolute value detection circuit 514 and an automatic gain controlling circuit 515.

The absolute value detection circuit 514 detects the signal strength of the energy components of the digital sample data from the A/D conversion circuit 33. It is to be noted that, since the digital sample data outputted from the A/D conversion circuit 33 includes not only a signal (spread code) component to be detected but also unnecessary signal components such as noise, the absolute value detection circuit 514 detects the signal strength of the energy components of the entire detection signal including the unnecessary signal components such as noise.

The automatic gain controlling circuit 515 generates a control signal for controlling the gain of the gain adjustment circuit 512 based on the signal strength detected by the absolute value detection circuit 514 and supplies the control signal to the gain adjustment circuit 512.

The absolute value detection circuit 514 is configured, for example, as shown in FIG. 49. In particular, in the example of FIG. 49, the absolute value detection circuit 514 includes a squaring multiplier 5141 and an integrator 5142 connected to an output terminal of the squaring multiplier 5141.

The squaring multiplier 5141 carries out squaring calculation of an output signal of the A/D conversion circuit 33 and outputs a squaring calculation output signal after the calculation to the integrator 5142. The integrator 5142 temporally integrates the squaring calculation output signal from the squaring multiplier 5141 and obtains the integrated output signal as an absolute value detection output. Then, the integrator 5142 supplies the integration output signal to the automatic gain controlling circuit 515.

In the present sixth embodiment, the signal strength of the energy components of a signal in which not only a signal (spread code) component to be detected but also noise and so forth are included is detected, and the gain value of the gain adjustment circuit 512 is controlled based on the signal strength to carry out automatic gain control so that the output level of the gain adjustment circuit 512 may be a predetermined level. Accordingly, even if noise and so forth are superposed on a signal inputted to the gain adjustment circuit 512, automatic gain control can be appropriately carried out for the input signal.

It is to be noted that, as a technique for obtaining an absolute value detection output by means of the absolute value detection circuit 514, any suitable method can be used as long as it is capable of detecting the level of a signal which includes both a signal component to be detected and noise. For example, in addition to the technique described hereinabove, a technique of integrating the absolute value of the level of an input signal into the absolute value detection circuit 514 can be used. Further, for the absolute value detection process, either digital signal processing after A/D conversion or analog signal processing before A/D conversion may be used.

It is to be noted that the present sixth embodiment can be applied to all of the embodiments described hereinabove.

[Seventh Embodiment: Another Example of the Configuration of the Sensor Section, FIGS. 50 to 54]

Another example of the configuration of the sensor section is described as the seventh embodiment.

<Modification 1 to the Sensor Section>

As shown in FIG. 2, the pressure sensitive member of the sensor section 100 of the embodiment described above has a configuration wherein the transmission resistive elements 13Y and the reception resistive elements 14X are disposed with the predetermined space 15 left therebetween in the direction orthogonal to the pointing input surface 100S. Further, very small concaves and convexes are formed on the faces of the transmission resistive elements 13Y and the reception resistive elements 14X, which are opposed to each other with the space 15 left therebetween.

However, the configuration of the pressure sensitive member of the sensor section 100 is not limited to that of a case in which the faces of the transmission resistive elements 13Y and the reception resistive elements 14X include the very small convexes and concaves that are opposing each other.

Figure 50A:
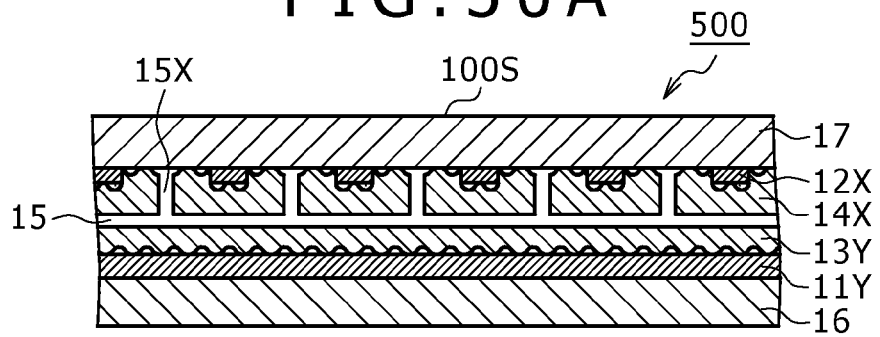
FIGS. 50A-50D are views showing a modification 1 to the sensor section in an embodiment of the pointer detection apparatus according to the present invention.
Figure 50B:
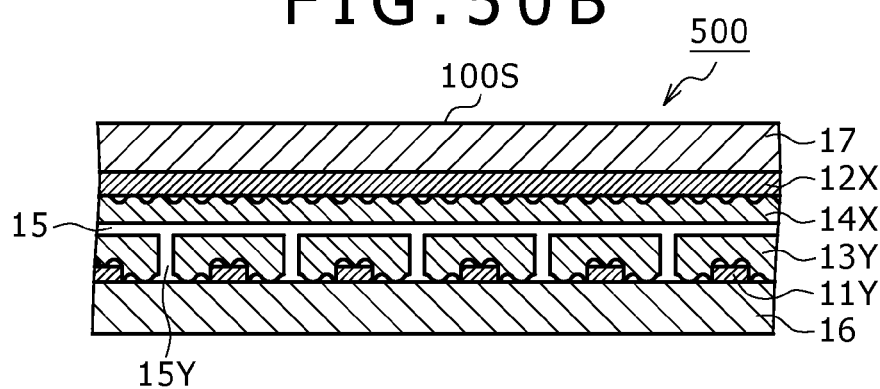

The modification 1 to the sensor section 1 is an example of the case described above. Part of the sensor section 500 of the modification 1 is shown in FIG. 50. FIG. 50(A) is a sectional view taken in an X-axis direction of the sensor section 500 and FIG. 50(B) is a sectional view taken in a Y-axis direction of the sensor section 500. It is to be noted that like elements to those of the embodiment described above are denoted by like reference characters and description of them is omitted. This similarly applies also to different modifications to the sensor section hereinafter described.

In the example of FIG. 50, while faces of the transmission resistive elements 13Y and the reception resistive element 14Xs, which are opposed to each other with the space 15 left therebetween, are mirror faces, very small convexes and concaves are formed on a face of the transmission resistive elements 13Y that is in contact with the transmission conductors 11Y and a face of the reception resistive elements 14X that is in contact with the reception conductors 12X, as shown in FIGS. 50(A) and (B).

In the example shown in FIGS. 50(A) and (B) also, when the pointing input surface 100S is pressed by a pointer 18 such as a finger, the faces of a transmission resistive element 13Y and a reception resistive element 14X opposed to each other contact with each other and the contact area between the transmission conductor 11Y and the transmission resistive element 13Y and the contact area between the reception conductor 12X and the reception resistive element 14X vary in response to the pressing force by the pointer 18. Accordingly, the resistance value between the transmission conductor 11Y and the reception conductor 12X in a state in which the transmission resistive element 13Y and the reception resistive element 14X contact with each other corresponds to the pressing force applied to the pointing input surface 100S by the pointer 18, and a working effect similar to that of the embodiment described above is obtained.

Figure 50C:
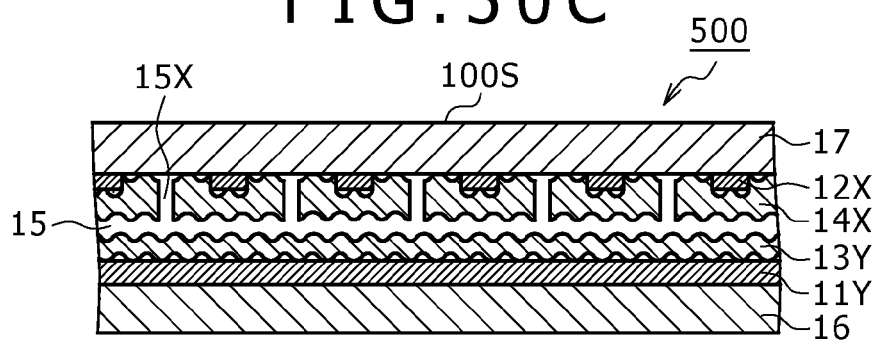
Figure 50D:
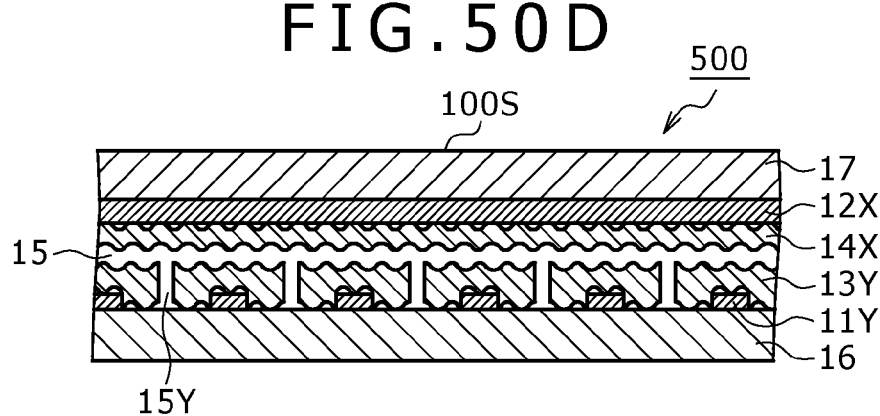

Further, as shown in FIGS. 50(C) and (D), as the configuration of the sensor section 500, the faces of the transmission resistive elements 13Y and the reception resistive elements 14X on which the very small convexes and concaves are formed may be set as the faces opposing each other, and additionally as the face of the transmission resistive elements 13Y contacting with the transmission conductors 11Y and the face of the reception resistive elements 14X contacting with the reception conductors 12X.

In an example shown in FIGS. 50(C) and (D) also, similarly as in the example shown in FIGS. 50(A) and (B), the resistance value between a transmission conductor 11Y and a reception conductor 12X in a state wherein the transmission resistive element 13Y and the reception resistive element 14X contact with each other corresponds to the pressing force applied to the pointing input screen 100S by the pointer 18. Accordingly, also in the example shown in FIGS. 50(C) and (D), a working effect similar to that of the embodiment described above is obtained.

It is to be noted that, while, in FIG. 50, the transmission resistive elements 13Y are formed along the transmission conductors 11Y and the reception resistive elements 14X are formed along the reception conductors 12X, the transmission resistive elements 13Y and the reception resistive elements 14X may be formed in the same direction as that of the transmission conductors 11Y or the reception conductors 12X. Alternatively, the transmission resistive elements 13Y and the reception resistive elements 14X may be formed so as to be provided in the form of an island for each of regions corresponding to the cross points between the transmission conductors 11Y and the reception conductors 12X. Further, as described above, the transmission resistive elements 13Y and the reception resistive elements 14X may be formed over an overall face of the lower side substrate 16 and the upper side substrate 17.

Further, the transmission resistive elements 11Y or the reception resistive elements 12X may be formed along the transmission conductors 11Y or the reception conductors 12X while the transmission resistive elements 11Y or the reception resistive element 12X are formed over an overall face of the lower side substrate 16 or the upper side substrate 17. Alternatively, the transmission resistive elements 11Y or the reception resistive elements 12X may be provided in the form of an island for each of regions corresponding to the cross points between the transmission conductors 11Y and the reception conductors 12X while the transmission conductors 11Y or the reception resistive elements 12X are formed over an overall face of the lower side substrate 16 or the upper side substrate 17 or along the transmission conductors 11Y or the reception conductors 12X.

<Modification 2 to the Sensor Section>

Figure 51A:
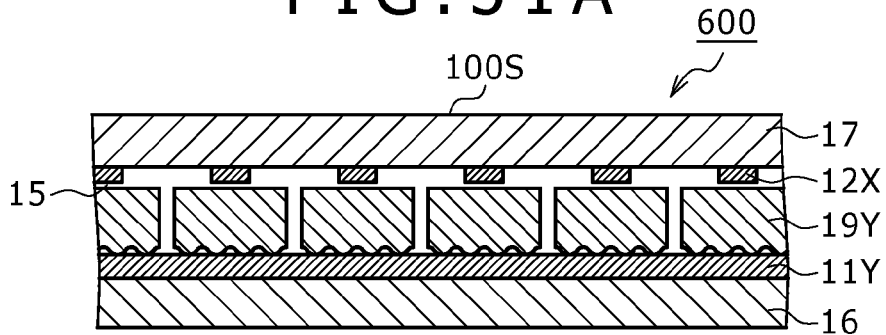
FIGS. 51A-51D are views showing a modification 2 to the sensor section in an embodiment of the pointer detection apparatus according to the present invention.
Figure 51B:
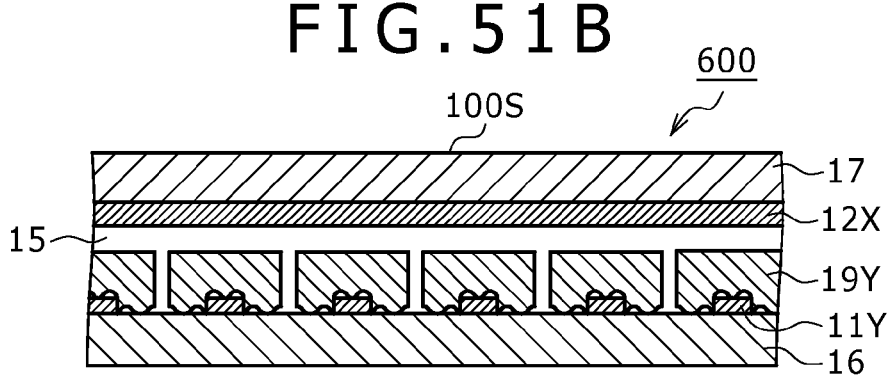

While the pressure sensitive member in the sensor section of the embodiment described above is formed of the transmission resistive elements 13Y and the reception resistive elements 14X, it can be formed also of one resistor. FIGS. 51(A) and (B) are views showing a first example wherein the pressure sensitive member is configured from one resistor. FIG. 51(A) is a sectional view in an X-axis direction of a sensor section 600 of the modification 2, and FIG. 51(B) is a sectional view in a Y-axis direction of the sensor section 600.

In particular, as shown in FIGS. 51(A) and (B), a rectangular resistive element 19 is provided at each of the cross points in a space between the transmission conductors 11Y on the lower side substrate 16 and the reception conductors 12X on the lower side of the upper side substrate 17. As the resistive element 19, a resistive element similar to the transmission resistive elements 13Y or the reception resistive elements 14X in the example described above is used.

In the example shown in FIGS. 51(A) and (B), the resistive element 19 is disposed on the transmission conductor 11Y on the lower side substrate 16. In the present example, as shown in FIGS. 51(A) and (B), the resistive element 19 is disposed such that the face side of the resistive element 19 on which very small convexes and concaves are formed is the transmission conductor 11Y side and the face side of the resistive element 19 on which very small convexes and concaves are not formed is the reception conductor 12X side. And, in this instance, between the resistive element 19 and the reception conductor 12X, a small air gap exists.

It is to be noted that, though not shown, a spacer member for maintaining the lower side substrate 16 and the upper side substrate 17 is provided at a peripheral portion of the sensor section 600 such that the resistive element 19 are disposed in a state wherein such a space as shown in FIG. 51 is provided is provided between the lower side substrate 16 and the upper side substrate 17. In other words, the lower side substrate 16 and the upper side substrate 17 are connected to each other with the spacer member interposed therebetween.

Also in the example shown in FIGS. 51(A) and (B), the resistive element 19 and the reception conductor 12X contact with each other when the pointing input screen 100S is pressed by a pointer 18 and the contact area between the transmission conductor 11Y and the resistive element 19 varies in response to the pressing force applied by the pointer 18. Accordingly, the resistance value between the transmission conductor 11Y and the reception conductor 12X in the state in which the resistive element 19 and the reception conductor 12X contact with each other corresponds to the pressing force applied to the pointing input screen 100S by the pointer 18, and a working effect similar to that in the embodiment described above is obtained.

Figure 51C:
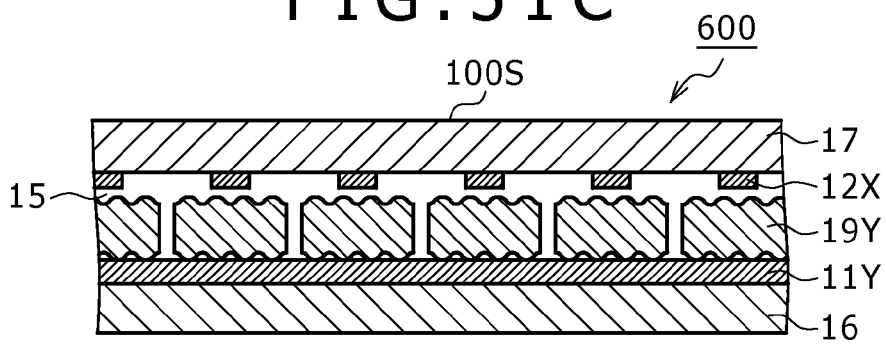

It is to be noted that, as shown in FIG. 51(C), the face side of the resistive element 19 opposed to the reception conductor 12X may also be configured similarly as the face on which very small convexes and concaves are formed.

Figure 51D:
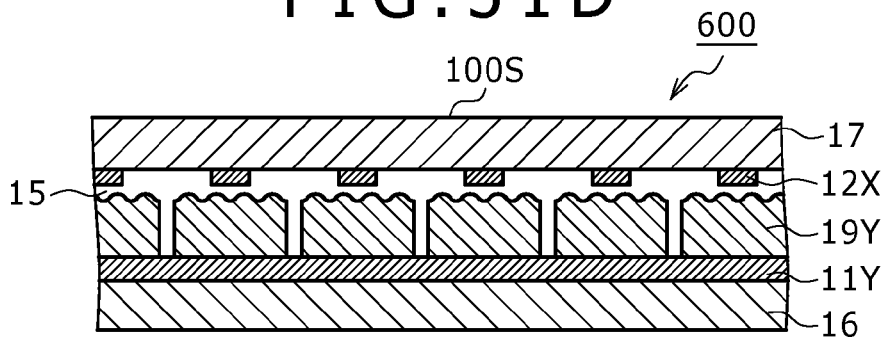

Further, as shown in FIG. 51(D), the face side of the resistive element 19 opposed to the reception conductor 12X may be configured as a face on which very small convexes and concaves are formed while the face side of the resistive element 19 contacting the transmission conductor 11Y may be configured as a face on which such very small convexes and concaves are not formed. In this instance, the resistive element 19 can be configured by laminating the same on the transmission conductor 11Y on the lower side substrate 16.

It is to be noted that, while such resistors 19 in FIG. 51 are configured as resistors each having a rectangular shape so as to be separate from each other about the individual cross point positions, in this instance also, the resistors 19 may be provided on the overall face of the substrate 16 and the substrate 17 commonly to the plural transmission conductors and the reception conductors. Further, the resistive elements 19 may be formed along the transmission conductors 11Y or the reception conductors 12X.

<Modification 3 to the Sensor Section>

In the example of the pressure sensitive member of the sensor section described above, the resistance value corresponding to the contact area between a resistor and another resistor or to the contact area between a resistor and an electric conductor can be obtained. However, the pressure sensitive member having a predetermined resistance characteristic for use with the sensor section is not limited to this configuration. The modification 3 to the sensor section is an example where a variable resistance elastic body, for example, variable resistance rubber, is used as an example of such a pressure sensitive member, as just described.

Figure 52:
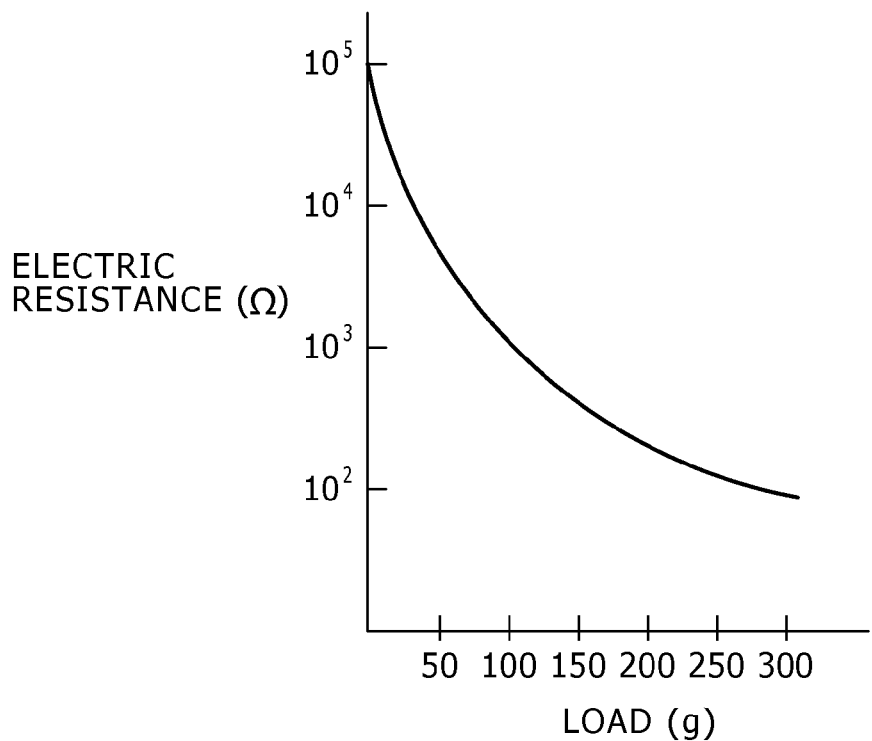
FIG. 52 is a view showing a modification 3 to the sensor section in an embodiment of the pointer detection apparatus according to the present invention.

For example, as disclosed in Patent Document 5 (Japanese Patent Laid-Open No. Hei 6-192485), the variable resistance elastic body used in the present example is a variable resistance rubber formed from porous rubber, in which conductive particles of, for example, carbon black, metal powder or the like are dispersed equally at very small intervals. A relationship between the electric resistance of the rubber and the load to the variable resistance rubber is illustrated in FIG. 52. Since, when no load is applied to the variable resistance rubber, the conductive particles are dispersed at very small intervals, the resistance value of the variable resistance rubber is very high as illustrated in FIG. 52.

Then, if a load is applied to the variable resistance rubber, then the variable resistance rubber is elastically displaced to render the conductive particles into chains or lumps such that they partially contact with each other and, consequently, the variable resistance rubber has conductivity. Then, since the degree in which the conductive particles are rendered into chains or lumps increases as the load increases, as shown in FIG. 52, the variable resistance rubber has a characteristic that its electric resistance value correspondingly decreases.

Figure 53A:
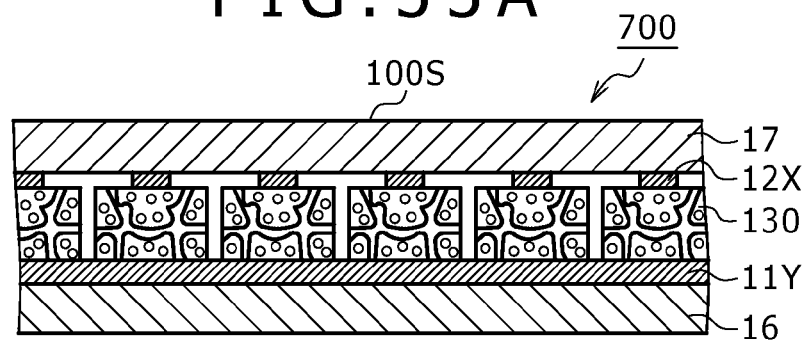
FIGS. 53A and 53B are views showing the modification 3 to the sensor section in an embodiment of the pointer detection apparatus according to the present invention.
Figure 53B:
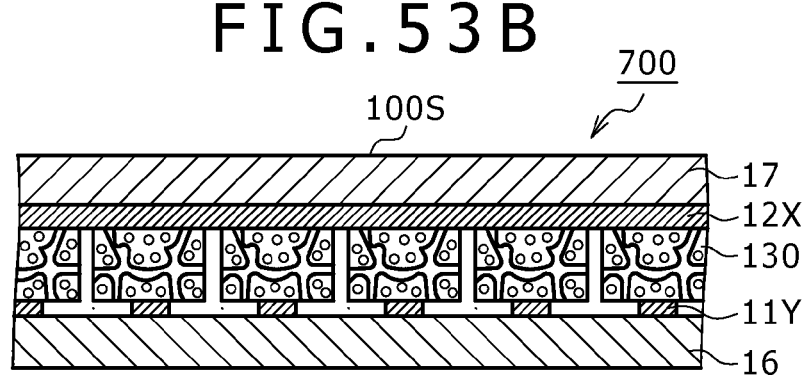

FIGS. 53(A) and (B) show an example of a sensor section 700 of the modification 3 and show a second example wherein the pressure sensitive member is configured from one resistor. FIG. 53(A) is a sectional view taken in an X-axis direction of the sensor section 700 and FIG. 53(B) is a sectional view in a Y-axis direction of the sensor section 700.

In the sensor section 700, a pressure sensitive resistive member formed from variable resistance rubber is used as the pressure sensitive member. Specifically, in place of a transmission resistive element 13Y and a reception resistive element 14X, a pressure sensitive resistive member 130 formed from a rectangular variable resistance rubber member is provided at a location of a cross point between a transmission conductor 11Y and a reception conductor 12X.

In this instance, the pressure sensitive resistive member 130 is configured such that, in a state in which a pressing load by a pointer 18 is not applied to the pointing input screen 100S, the pressure sensitive resistive member 130 is placed at the cross point between the transmission conductor 11Y and the reception conductor 12X.

In the sensor section 700 having such a configuration as described above, if a pressing load is applied to the pointing input screen 100S by a pointer 18 such as a finger, then the pressure sensitive resistive member 130 at the cross point position at which the pressing load is applied is elastically displaced to decrease the electric resistance value of the pressure sensitive resistive member 130.

Accordingly, in the present sensor section 700, since the electric resistance of the pressure sensitive resistive member 130 is very high in a state in which the pressing load by the pointer 18 is not applied to the pointing input screen 100S, a current hardly flows through the pressure sensitive resistive member 130. In particular, in a state in which the pressing load by the pointer 18 is not applied to the pointing input screen 100S of the sensor section 700, the pressure sensitive resistive member 130 functions as an insulating member for the insulation between the transmission conductor 11X and the reception conductor 12X.

Then, if a pressing load is applied to the pointing input screen 100S by the pointer 18, the electric resistance value of the pressure sensitive resistive member 130 decreases in response to the pressing load, and consequently, the current corresponding to the pressing load flows between the transmission conductor 11Y and the reception conductor 12X through the pressure sensitive member 130.

By monitoring the current, in the present modification 3 also, pointer detection by the resistance film method can be carried out similarly as in the embodiment described above.

It is to be noted that, while such pressure sensitive resistive members 130 in FIG. 53 are formed in a rectangular shape so as to be separate from each other about the cross point positions, in the present example also, the pressure sensitive resistance material 130 may be provided over an overall face of the substrate 16 and the substrate 17 commonly to the plural transmission conductors 11Y and the plural reception conductors 12X. Further, the pressure sensitive resistive member 130 may be formed along the transmission conductors 11Y or the reception conductors 12X.

<Modification 4 to the Sensor Section>

All of the sensor sections of the examples described above are configured such that the transmission conductors, reception conductors, and pressure sensitive members are provided between the two substrates including the lower side substrate 16 and the upper side substrate 17. However, it is also possible to apply another configuration wherein the transmission conductors, reception conductors, and pressure sensitive members are formed on a single substrate. The modification 4 to the sensor section is an example of a sensor section of a configuration wherein only one substrate is used.

Figure 54A:
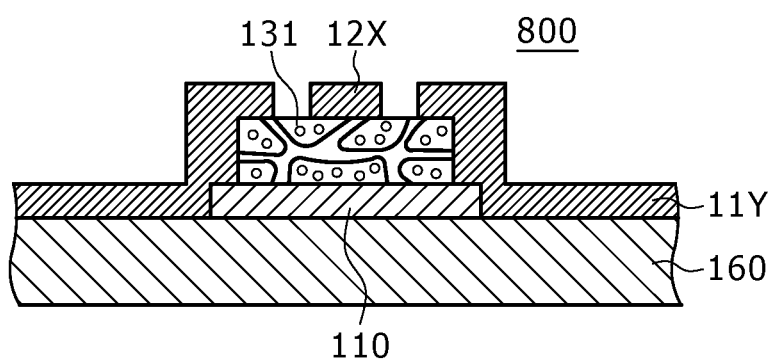
FIGS. 54A and 54B are views showing a modification 4 to the sensor section in an embodiment of the pointer detection apparatus according to the present invention.
Figure 54B:
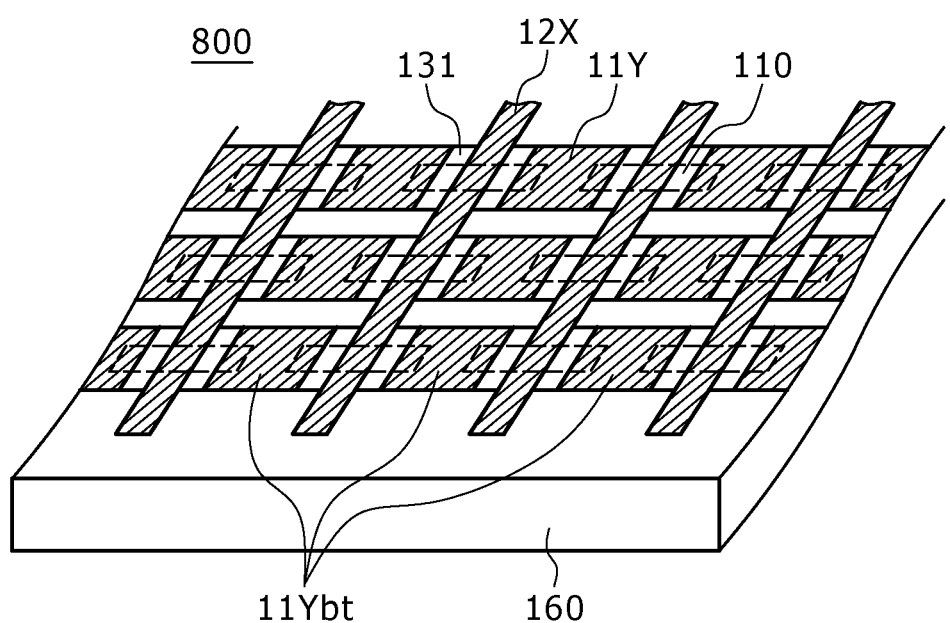

An example of a sensor section 800 of the present modification 4 is described with reference to FIG. 54. Here, FIG. 54(A) shows a sectional view taken in an X-axis direction at one cross point portion of the sensor section 800 and FIG. 54(B) shows a perspective view of the sensor section of the modification 4. It is to be noted that, in FIG. 54, illustration of a protective layer and a protective sheet for covering and protecting the transmission conductors, reception conductors, and pressure sensitive member formed on one of the faces of the substrate 160 is omitted.

As shown in FIG. 54(A), the sensor section 800 is configured from a substrate 160, a plurality of transmission conductors 11Y, and a plurality of reception conductors 12X, a pressure sensitive resistive member 131, and a metal layer 110.

The present sensor section 800 has a structure wherein the transmission conductors 11Y and the reception conductors 12X substantially cross with each other on one of the faces of the substrate 160. In this example, each reception conductor 12X is configured from a linear conductor extending in a Y-axis direction similarly as in the embodiment described above. However, each transmission conductor 11Y is not a linear conductor continuing in an X-axis direction but is structured such that transmission conductor pieces 11Ybt, which appear cut off at a location of each reception conductor 12X, are connected to each other by the metal layer 110. In particular, the individual transmission conductors 11Y have a configuration wherein one transmission conductor is formed by connecting the transmission conductor pieces 11Ybt juxtaposed linearly in the X-axis direction by means of the metal layer(s) 110.

The metal layer 110 and the transmission conductor pieces 11Ybt are formed from a printed pattern or the like on the substrate 160. Further, each reception conductor 12X is provided on the substrate 160, except a portion thereof which overlaps with the metal layer 110. Further, a pressure sensitive member formed from the pressure sensitive resistive member 131 similar to that of the sensor section 700 in the modification 3 is provided at a crossing portion between the reception conductor 12X and the metal layer 110.

The substrate 160, transmission conductors 11Y, and reception conductors 12X in the sensor section 800 of the modification 4 can be formed from materials similar to those in the first embodiment described above. In particular, similarly as in the first embodiment, not only a generally known glass board having permeability but also a sheet-like (film-like) medium formed from synthetic resin may be used for the substrate 160. The transmission conductors 11Y and the reception conductors 12X are individually formed from a transparent electrode film formed, for example, from an ITO film.

Further, the metal section 110 can be formed from a metal material having high conductivity, for example, Mo (molybdenum) or the like. Since the contact area between the metal layer 110 and the transmission conductor pieces is very small, in order to reduce the electric resistance of the components, it is preferable to use a metal material having high conductivity for the metal layer 110.

In the sensor section 800 of the modification 4 also, since the electric resistance of the pressure sensitive resistive member 131 is very high in a state in which a pressing load by a pointer is not applied to the pointing input screen of the sensor section, a current hardly flows through the pressure sensitive resistive member 130. In particular, in the state in which a pressing load by the pointer 18 is not applied to the pointing input screen 100S of the sensor section 800, the pressure sensitive resistive member 131 functions as an insulating material for the insulation between the transmission conductors 11Y and the reception conductors 12X.

Then, if a pressing load is applied to the pointing input screen 100S by a pointer 18, at the cross point to which the pressing load is applied, the electric resistance value of the pressure sensitive resistive member 130 decreases in response to the pressing load. Therefore, a current corresponding to the pressing load flows through the transmission conductor pieces 11Ybt of the transmission conductor 11Y, to the metal layer 110, to the pressure sensitive resistive member 131, and to the reception conductor 12X, in this order.

Accordingly, also in the sensor section 800 of the present modification 4, a working effect similar to that of the sensor section 700 of the modification 3 described above is obtained.

In the sensor section 800 of the present modification 4, the number of substrates formed from, for example a glass board, may be one, and the thickness of the sensor section can be further reduced. Further, since, in the sensor section 800, the transmission conductors 11Y and the reception conductors 12X can be configured substantially in one layer, a less expensive sensor section can be provided.

It is to be noted that, in the example of FIG. 54, while the transmission conductors 11Y are formed of the conductor pieces and the metal layer, the transmission conductors 11Y may be configured as linear conductors and the reception conductors 12X may be formed of conductor pieces and a metal layer.

It is to be noted that, while, in FIG. 54, the pressure sensitive resistive members 131 are formed in a rectangular shape so as to be separate from each other about the cross point positions, the pressure sensitive resistive members 131 may be formed along the transmission conductors 11Y or the reception conductors 12X.

<Modification 5 to the Sensor Section>

In a pointer detection apparatus which adopts the cross point electrostatic coupling method, normally when the sensor section is viewed from the face side on which a pointer is operated, that is, from above, the sensor section has a region in which a plurality of reception conductors and transmission conductors cross with each other to form conductor patterns and another region in which no conductor pattern exists. While the conductors are individually formed from a transparent electrode film such as an ITO film or the like, the light transmittance of the region in which conductor patterns exist is lower than that of the region in which no conductor pattern exists. As a result, non-uniformity of the light transmittance appears on the sensor section. Some user may be sensitive to such non-uniformity of the light transmittance. In the modification 5, a configuration is described which eliminates such non-uniformity of the light transmittance on the sensor section as just described.

Figure 55:
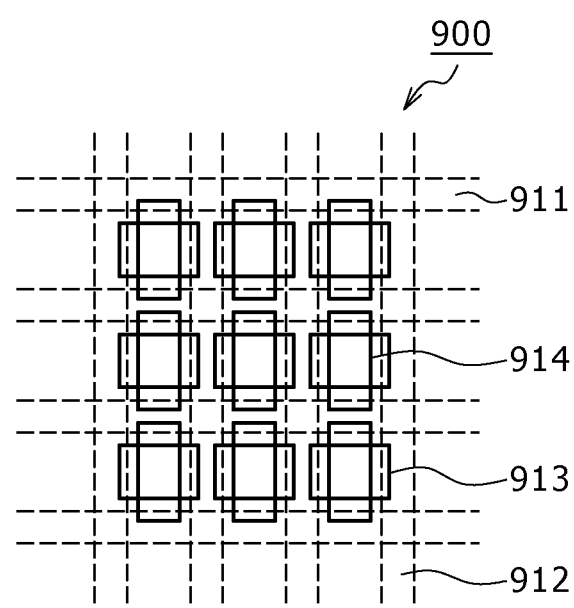
FIG. 55 is a view showing a modification 5 to the sensor section in an embodiment of the pointer detection apparatus according to the present invention.

A general configuration of a sensor section 900 of the present modification 5 is shown in FIG. 55. In the present sensor section 900, a first transparent electrode film 913 and a second transparent electrode film 914 made of a material which is, for example, the same as that of the conductors are provided in regions in which none of the transmission conductors 911 and the reception conductors 912 exist. Since the configuration of the other part is similar to that of the sensor section described above, description of the same is omitted.

Figure 56A:
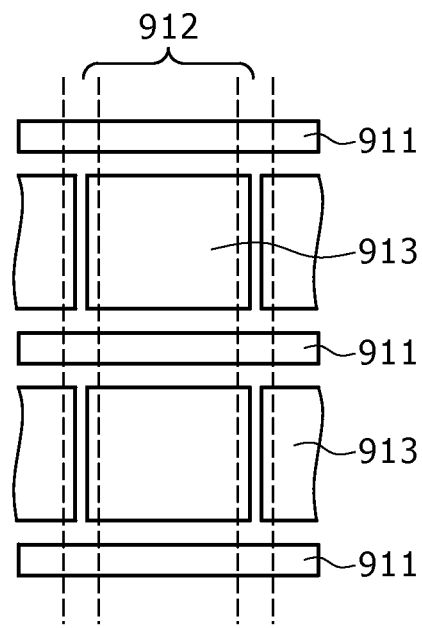
FIGS. 56A and 56B are views showing the modification 5 to the sensor section in an embodiment of the pointer detection apparatus according to the present invention.

A configuration of the transmission conductors 911 and the first transparent electrode film 913 of the sensor section 900 is shown in FIG. 56(A). In the present modification 5, rectangular pieces of the first transparent electrode film 913 are disposed between two transmission conductors 911 disposed in the proximity of each other on the same face as that on which the transmission conductors 911 are disposed. The pieces of the first transparent electrode film 913 have a dimension somewhat smaller than the dimension between the transmission conductors 911 so as to prevent contact thereof with the transmission conductors 911 and are spaced from the transmission conductors 911 with a small air gap left therebetween. On the other hand, the dimension of the pieces of the first transparent electrode film 913 in the extending direction of the transmission conductor 911 is set somewhat smaller than the dimension calculated by adding a conductor width of one reception conductor 912 to the dimension between the reception conductors 912 disposed in the proximity of each other. Then, each piece of the first transparent electrode film 913 is disposed in a positional relationship such that it extends to a position of substantially ½ the conductor width of the reception conductors 912 between the two reception conductors 912 positioned in the proximity of each other.

Figure 56B:
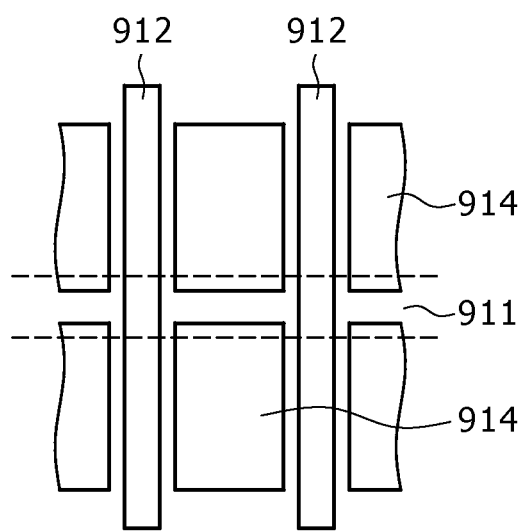

Further, a configuration of the reception conductors 912 and the second transparent electrode film 914 of the sensor section 900 is shown in FIG. 56(B). The second transparent electrode film 914 is disposed on the same face as that on which the reception conductors 912 are disposed, and an approach similar to that in the case in which the dimension of the pieces of the first transparent electrode film 913 is defined can be applied to the dimension of pieces of the second transparent electrode film 914. In particular, the pieces of the second transparent electrode film 914 have the dimension somewhat smaller than the dimension between the reception conductors 912 so as to prevent contact thereof with the reception conductors 912 and are spaced from the reception conductors 912 with a small air gap left therebetween. On the other hand, the dimension of the pieces of the second transparent electrode film 914 in a lengthwise direction of the reception conductors 912 is set such that they partially cover the transmission conductors 911 disposed in the proximity of each other.

The dimensions and the disposition of the pieces of the first transparent electrode film 913 and the second transparent electrode film 914 are configured such that, when the sensor section 900 is viewed, for example, from the face side (upper side) on which the pointer is operated, the superposed relationship among the transmission conductor 911, reception conductor 912, first transparent electrode film 913, and second transparent electrode film 914 is homogenized while electrical insulation is maintained, so that a homogenized optical characteristic can be maintained with respect to the entire sensor section 900 while suppressing non-uniformity of the transmittance.

If the conductors and the transparent electrode films to be formed on the faces of the substrates of the sensor section 900 are disposed as shown in FIGS. 56(A) and (B), then when the sensor section 900 is viewed from above, the first transparent electrode film 913 and the second transparent electrode film 914, which are made of a material that is the same as that of the conductors, are formed also in a region in which a conductor pattern does not exist as shown in FIG. 55. As a result, the non-uniformity of the transmittance on the sensor section 900 is suppressed.

It is to be noted that the shape of the pieces of the first transparent electrode film 913 and the second transparent electrode film 914 for suppressing the non-uniformity of the transmittance is not limited to the rectangular shape. When the sensor section 900 is viewed from above, it is only necessary for the superposition relationship between the conductor patterns formed from the transmission conductors 911 and reception conductors 912 and the first transparent electrode film 913 and second transparent electrode film 914 to be optically homogenized, and the shape of the pieces of the first transparent electrode film 913 and the second transparent electrode film 914 is suitably determined in connection with the shape of the conductor patterns formed from the transmission conductors 911 and the reception conductors 912. For example, while, in the sensor section 900 of the modification 5, a plurality of rectangular pieces of a transparent electrode film are disposed at predetermined intervals along a direction in which the transmission conductors 911 or the reception conductors 912, the plural pieces of the transparent electrode film may be formed as a single piece of the electrode film.

When the pieces of the first transparent electrode film 913 and the second transparent electrode film 914 are disposed between the transmission conductors 911 and between the reception conductors 912, respectively, capacitive coupling may appear between the transmission conductors 911 and the first transparent electrode film and between the reception conductors 912 and the second transparent electrode film, resulting in a problem that the transmission conductors 911 adjacent each other and the reception conductors 912 adjacent each other are bridged by the capacitive coupling. In order to moderate the problem just described, a plurality of slits parallel to the X-axis direction should be formed on the pieces of the first transparent electrode film 913 so that equivalently a plurality of capacitors exist in a serially connected relationship between the transmission conductors 911 adjacent each other. Further, a plurality of slits parallel to the Y-axis direction should be formed on the pieces of the second transparent electrode film 914 so that equivalently a plurality of capacitors exist in a serially connected relationship between the reception conductors 912 adjacent each other. Further, a plurality of slits parallel to the X-axis direction and a plurality of slits parallel to the Y-axis direction may be formed on the pieces of the first transparent electrode film 913 and the second transparent electrode film 914, respectively, so that the first transparent electrode film 913 and the second transparent electrode film 914 are divided into a matrix.

The configuration of the present modification 5 can be applied also to the sensor section of the embodiment described above and the modifications 1 to 6 of the sensor section. Further, it is also possible to separately prepare a substrate wherein a transparent electrode film is formed in a predetermined region for the prevention of non-uniformity of light transmittance, and to add the separately prepared substrate to the sensor section. Further, as described above, a film-like substrate may be adopted.

<Modification 6 to the Sensor Section>

Figure 57A:
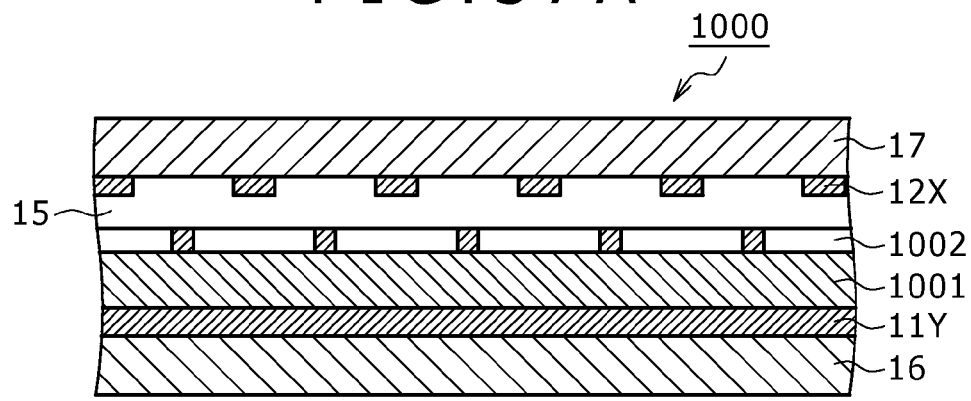
FIGS. 57A and 57B are views showing a modification 6 to the sensor section in an embodiment of the pointer detection apparatus according to the present invention.
Figure 57B:
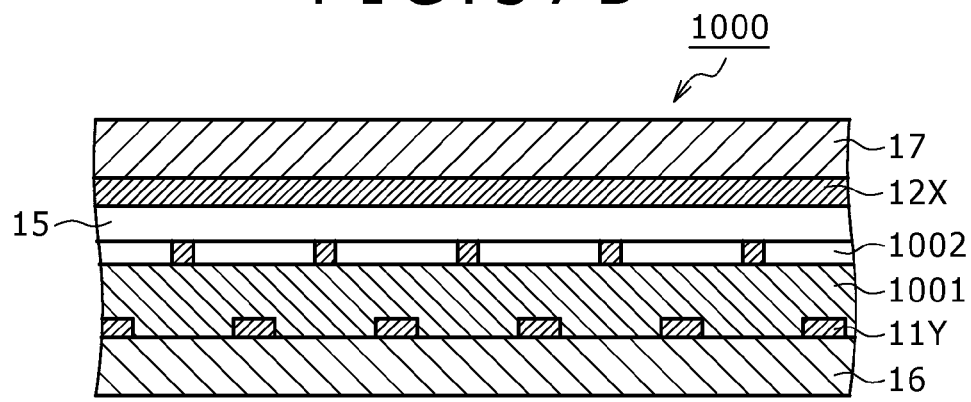

The pressure sensitive material of the sensor section 100 in the first embodiment described above has the configuration wherein the transmission resistors 13Y and the reception resistors 14X are disposed in a spaced relationship with the predetermined space 15 left therebetween in a direction orthogonal to the pointing input screen 100S as shown in FIG. 2. The present modification 6 to the sensor section is different from the example described above in configuration of the pressure sensitive material provided in the space 15. An example of a configuration of a sensor section 1000 in the modification 6 is described with reference to FIGS. 57 and 58. FIG. 57(A) is a sectional view taken in an X-axis direction of the sensor section 1000 in the modification 6, and FIG. 57(B) is a sectional view in a Y-axis direction of the sensor section 1000.

In the present modification 6, a gel-like resistive element 1001 is disposed on the lower side substrate 16 on which the transmission conductors 11Y are disposed in the space 15. A lattice-like slit member 1002 is disposed on the gel-like resistive element 1001. In this instance, the lattice-like slit member 1002 and the reception conductors 12X are placed in a state spaced by a predetermined distance from each other in the Z-axis direction.

Figure 58:
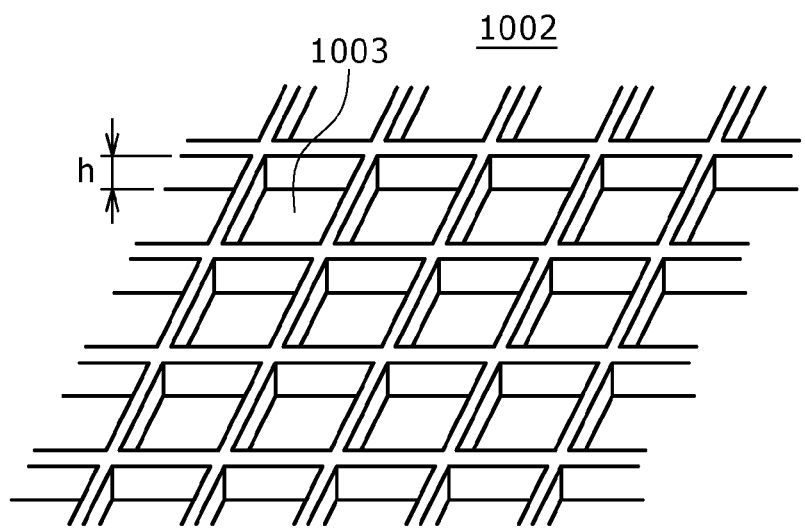
FIG. 58 is a view showing the modification 6 to the sensor section in an embodiment of the pointer detection apparatus according to the present invention.
Figure 59:
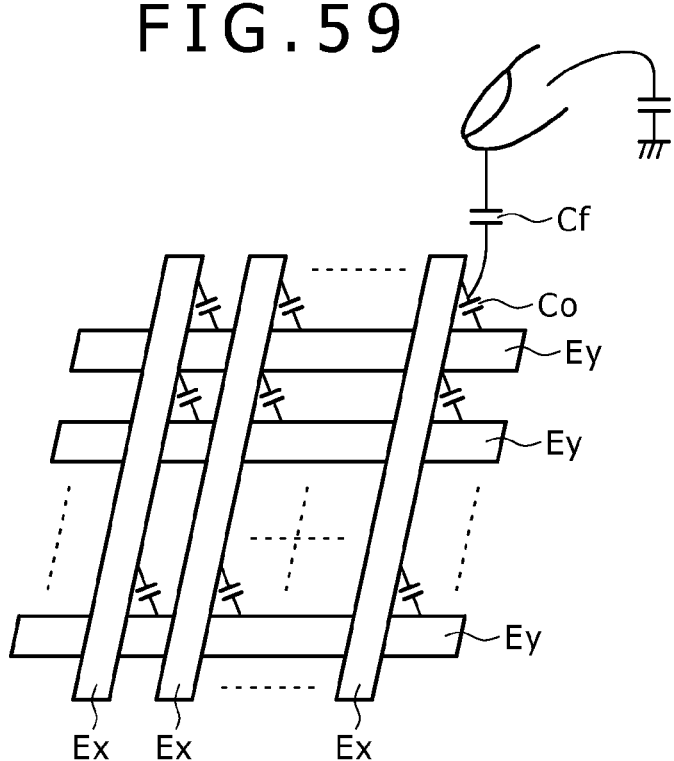
FIG. 59 is a view showing a sensor section of a pointer detection apparatus of the electrostatic coupling method.

As shown in a perspective view of FIG. 58, the lattice-like slit member 1002 has rectangular slits 1003 having a height h in the Z-axis direction. The rectangular slits 1003 are formed in accordance with an arrangement interval of the transmission conductors 11Y and the reception conductors 12X. Further, the lattice-like slit member 1002 is disposed such that a central position of each rectangular slit 1003 is placed just below a cross point between a transmission conductor 11Y and a reception conductor 12X.

In the sensor section 1000 of the present modification 6, a processing operation for detecting a position at which a pointer 18 contacts the pointing input screen 100S is similar to that of the example described above.

In the sensor section 1000 of the modification 6, if a pressing force is applied to the pointing input screen 100S by a pointer 18, then a portion of the pointing input screen 100S to which the pressing force is applied is deformed such that the upper side substrate 17 presses and displaces the lattice-like slit member 1002 to the gel-like resistive element 1001 side at the location.

Then, at the cross point corresponding to the location at which the pressing force is applied, the gel-like resistive element 1001 varies in such a manner as to swell through the rectangular slit 1003 and is brought into contact with the reception conductor 12X at the cross point. The contact area between the gel-like resistive element 1001 and the reception conductor 12X varies corresponding to the pressing force applied to the pointing input screen 100S by the pointer 18.

Accordingly, also in the sensor section 1000 of the present modification 6, detection of a pointer (including detection of a pressing force) can be carried out similarly as in the sensor section 100 of the first embodiment.

The various embodiments described above can be combined to provide further embodiments. All of the U.S. patents, foreign patents, and U.S. and foreign patent publications referred to in this specification and/or listed in the Application Data Sheet are incorporated herein by reference, in their entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pointer detection apparatus capable of detecting a pointed position of and a pressure applied by a pointer, comprising:
a detection sensor including a plurality of first conductors disposed in a first direction, a plurality of second conductors disposed in a second direction crossing with the first direction, and a pressure sensitive material disposed between the plurality of first conductors and the plurality of second conductors and having a variable resistance characteristic;
a signal supplying circuit configured to supply signals to the plurality of first conductors; and
a signal detection circuit configured to carry out signal detection based on reception signals received from the plurality of second conductors and based on a reference signal level defined as a reception signal level in case a pointer is not positioned in the proximity of the detection sensor, the signal detection circuit including a switch circuit configured to selectively couple the reception signals from the plurality of second conductors to the signal detection circuit operating in a capacitive touch detection mode, and to the signal detection circuit operating in a resistive touch detection mode;
wherein the switch circuit is configured to control the signal detection circuit to detect, in case the pointer is positioned in the proximity of said detection sensor or the pointer is in contact with said detection sensor, a level of the reception signal(s) received from the second conductor(s) that is decreased relative to said reference signal level to indicate variation in electrostatic capacity between the plurality of first conductors and the plurality of second conductors, and to detect, in case the pointer is pressed against said detection sensor, the level of the reception signal(s) received from the second conductor(s) that is increased, according to an amount of pressure applied by the pointer against said detection sensor, relative to said reference signal level to indicate variation in resistance characteristic between the plurality of first conductors and the plurality of second conductors.

2. The pointer detection apparatus according to claim 1, wherein:
the resistance characteristic of said pressure sensitive material varies depending upon an engagement state between said pressure sensitive material and the plurality of first conductors or the plurality of second conductors.

3. The pointer detection apparatus according to claim 2, wherein:
said pressure sensitive material has at least first and second members, and the first or second member is configured to engage with the plurality of first conductors or the plurality of second conductors in response to the pressure from the pointer.

4. The pointer detection apparatus according to claim 2, wherein:
said pressure sensitive material has at least first and second members; and
the first member and the second member are configured to engage with each other in response to the pressure from the pointer.

5. The pointer detection apparatus according to claim 1, wherein:
said pressure sensitive material includes a plurality of conductive particles, which are arranged to be coupled to each other in response to application of the pressure from the pointer to vary the resistance characteristic between the plurality of first conductors and the plurality of second conductors.

6. The pointer detection apparatus according to claim 1, wherein:
the plurality of first conductors and the plurality of second conductors are disposed on one face of a substantially flat substrate, and said pressure sensitive material is provided at least in cross point regions between the plurality of first conductors and the plurality of second conductors and is disposed as an insulating member for the insulation between the plurality of first conductors and the plurality of second conductors when no pressure is applied from the pointer.

7. The pointer detection apparatus according to claim 1, wherein:
said pressure sensitive material is formed at least along the plurality of first conductors or along the plurality of second conductors.

8. The pointer detection apparatus according to claim 1, wherein:
said detection sensor has a substantially flat substrate having transparency and said pressure sensitive material has transparency;
the plurality of first conductors disposed in the first direction, the plurality of second conductors disposed in the second direction, and said pressure sensitive material are provided on the substrate; and said detection sensor further includes a member having transparency disposed in an opening region formed by the plurality of first conductors disposed in the first direction and the plurality of second conductors disposed in the second direction.

9. The pointer detection apparatus according to claim 8, wherein:
the member having transparency is formed of the same material as that of said pressure sensitive material.

10. The pointer detection apparatus according to claim 1, wherein:
the signals supplied from said signal supplying circuit to the plurality of first conductors are supplied as voltage signals while signals from the plurality of second conductors are detected as a current variation, and said signal detection circuit includes a current/voltage conversion circuit for converting the current variation into a voltage.

11. The pointer detection apparatus according to claim 10, wherein:
said current/voltage conversion circuit includes a first detection mode for obtaining a signal corresponding to variation in electrostatic capacity between the plurality of first conductors and the plurality of second conductors, and a second detection mode for obtaining a signal corresponding to variation in resistance characteristic between the plurality of first conductors and the plurality of second conductors.

12. The pointer detection apparatus according to claim 11, wherein:
said current/voltage conversion circuit is configured from a resistor, a capacitor, and the switch circuit configured to selectively switch between said resistor and said capacitor; and
said switch circuit is further configured to connect said detection sensor to said capacitor in the first detection mode and to connect said detection sensor to said resistor in the second detection mode.

13. The pointer detection apparatus according to claim 1, wherein:
the signals supplied from said signal supplying circuit to the plurality of first conductors are signals which can be discriminated from each other.

14. The pointer detection apparatus according to claim 13, wherein:
said signals supplied from said signal supplying circuit to the plurality of first conductors are codes that are orthogonal to each other.

15. The pointer detection apparatus according to claim 14, wherein:
said signal supplying circuit is configured to supply a calibration signal directly to said signal detection circuit.

16. The pointer detection apparatus according to claim 15, wherein:
the codes supplied from said signal supplying circuit to the plurality of first conductors are Hadamard codes; and
in an Hadamard matrix of the Hadamard codes, nth chips which are all "1s" in the matrix are used as the calibration signal for carrying out correction of the signals in said signal detection circuit.

17. A detection sensor for obtaining a signal corresponding to a pointed position of and a pressure applied by a pointer on the detection sensor, comprising:

a plurality of first conductors disposed in a first direction and configured to receive signals;
a plurality of second conductors disposed in a second direction crossing with the first direction; and
a pressure sensitive material disposed between said plurality of first conductors and said plurality of second conductors and having a variable resistance characteristic;
wherein the detection sensor is configured to output from said plurality of second conductors, when a pointer is positioned in the proximity of said detection sensor or the pointer is in contact with said detection sensor, signals whose level is decreased relative to a reference signal level defined as a detection signal level in case the pointer is not positioned in the proximity of the detection sensor, the decreased signal level corresponding to variation in electrostatic capacity between the plurality of first conductors and the plurality of second conductors,
whereas said detection sensor is further configured to output from said plurality of second conductors, when the pointer is pressed against said detection sensor, signals whose level is increased according to an amount of pressure applied by the pointer against said detection sensor relative to said reference signal level, the increased signal level corresponding to variation in resistance characteristic between the plurality of first conductors and the plurality of second conductors.

18. A method of detecting a pointed position of and a pressure applied by a pointer on a detection sensor, wherein the detection sensor includes a plurality of first conductors disposed in a first direction, a plurality of second conductors disposed in a second direction crossing with the first direction, and a pressure sensitive material disposed between said plurality of first conductors and said plurality of second conductors and having a variable resistance characteristic, the method comprising:
supplying signals to the plurality of first conductors;
detecting signals corresponding to variation in electrostatic capacity from said plurality of second conductors when a pointer is positioned in the proximity of said detection sensor or the pointer is in contact with said detection sensor, wherein a level of the detected signals is decreased relative to a reference signal level defined as a detected signal level in case the pointer is not positioned in the proximity of said detection sensor; and
detecting signals corresponding to variation in resistance characteristic from said plurality of second conductors when the pointer is pressed against said detection sensor, wherein the level of the detected signals is increased according to an amount of pressure applied by the pointer against said detection sensor relative to said reference signal level.

19. The method of claim 18, wherein the signals corresponding to variation in electrostatic capacity and the signals corresponding to variation in resistance characteristic are concurrently detected.

20. The method of claim 18, wherein the signals corresponding to variation in electrostatic capacity and the signals corresponding to variation in resistance characteristic are time-divisionally detected.

* * * * *